(12) United States Patent
Yu et al.

(10) Patent No.: US 11,265,832 B2
(45) Date of Patent: Mar. 1, 2022

(54) DATA PROCESSING METHOD AND APPARATUS

(71) Applicant: Huawei Technologies Co., Ltd., Shenzhen (CN)

(72) Inventors: Jian Yu, Shenzhen (CN); Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 107 days.

(21) Appl. No.: 16/537,219

(22) Filed: Aug. 9, 2019

(65) Prior Publication Data

US 2019/0364525 A1 Nov. 28, 2019

Related U.S. Application Data

(63) Continuation of application No. PCT/CN2018/094577, filed on Jul. 4, 2018.

(30) Foreign Application Priority Data

Jul. 4, 2017 (CN) .......................... 201710537942.7

(51) Int. Cl.
*H04L 12/28* (2006.01)
*H04W 56/00* (2009.01)
(Continued)

(52) U.S. Cl.
CPC ......... *H04W 56/001* (2013.01); *H04L 1/0003* (2013.01); *H04W 72/0453* (2013.01); *H04W 80/02* (2013.01)

(58) Field of Classification Search
CPC ....................................................... H04L 12/28
(Continued)

(56) References Cited

U.S. PATENT DOCUMENTS 9,351,333 B1   5/2016  Zhang et al.
10,158,474 B2  12/2018 Cherian et al.
(Continued)

FOREIGN PATENT DOCUMENTS

CN   102761390 A   10/2012
CN   102948101 A   2/2013
(Continued)

OTHER PUBLICATIONS

IEEE P802.11ax/D1.3, "Draft Standard for Information technology—Telecommunications and information exchange between systems Local and metropolitan area networks-Specific requirements, Part 11: Wireless LAN Medium Access Control (MAC) and Physical Layer (PHY) Specifications, Amendment 6: Enhancements for High Efficiency WLAN," Jun. 2017, 522 pages.
(Continued)

*Primary Examiner* — Dang T Ton
(74) *Attorney, Agent, or Firm* — Slater Matsil, LLP

(57) ABSTRACT

Embodiments of the present invention disclose a data processing method and apparatus, and belong to the field of communications technologies. The method includes: generating a physical layer protocol data unit PPDU, where the PPDU includes a preamble field, a data field, and a middle preamble field, and the preamble in the PPDU includes information used to indicate an insertion frequency of the middle preamble in the data field in the PPDU; and sending the PPDU. The insertion frequency of the middle preamble in the data field is indicated by using a specified field in the preamble. In this way, in different scenarios, the middle preamble may be inserted into the data field at different frequency, thereby reducing overheads of an inserted pilot and improving data transmission performance.

18 Claims, 31 Drawing Sheets

(51) Int. Cl.
*H04L 1/00* (2006.01)
*H04W 72/04* (2009.01)
*H04W 80/02* (2009.01)

(58) Field of Classification Search
USPC .............................................................. 370/329
See application file for complete search history.

(56) References Cited

U.S. PATENT DOCUMENTS

| | | | |
|---|---|---|---|
| 10,608,720 B2* | 3/2020 | Verma | H04L 1/0025 |
| 2012/0269142 A1 | 10/2012 | Porat et al. | |
| 2012/0327871 A1 | 12/2012 | Ghosh et al. | |
| 2013/0279379 A1 | 10/2013 | Yang et al. | |
| 2013/0286961 A1 | 10/2013 | Vermani et al. | |
| 2016/0323426 A1* | 11/2016 | Hedayat | H04W 28/0268 |
| 2016/0329989 A1 | 11/2016 | Li et al. | |
| 2020/0229090 A1* | 7/2020 | Kim | H04L 27/02 |

FOREIGN PATENT DOCUMENTS

| | | | |
|---|---|---|---|
| CN | 103209043 A | 7/2013 | |
| CN | 104363192 A | 2/2015 | |
| CN | 106063147 A | 10/2016 | |
| CN | 106576020 A | 4/2017 | |
| CN | 106576033 A | 4/2017 | |
| JP | 2017055399 A | 3/2017 | |
| KR | 20180004136 A | 1/2018 | |
| WO | 2012158557 A1 | 11/2012 | |
| WO | 2015154213 A1 | 10/2015 | |
| WO | 2016033386 A1 | 3/2016 | |

OTHER PUBLICATIONS

Uwai, Tatsumi, et al., "Adaptive Backoff Mechanism for OFDMA Random Access with Finite Service Period in EEE802.11ax," 2016 IEEE Conference on Standards for Communications and Networking (CSCN), 6 pages.

Verma, Lochan, (Qualcomm), et al., "Thoughts on Doppler Design in 802.11ax," IEEE 802.11-17/0773r2, May 9, 2017, 9 pages.

Osama, Aboul-Magd (Huawei Technologies) et al., "Status of Project IEEE 802.11ax", IEEE P802.11—Task Group XX—Group Information Update, High Efficiency (HE) Wireless LAN Task Group, Feb. 4, 2021, 110 pages.

* cited by examiner

| UL PPDU Length | RU Allocation | DL Tx Power | UL Target RSSI | UL MCS | Reserved |

| UL PPDU Length | RU Allocation/M | DL TX Power | ULTarget RSSI | UL MCS | Reserved |

DATA PROCESSING METHOD AND APPARATUS

CROSS-REFERENCE TO RELATED APPLICATIONS

This application is a continuation of International Application No. PCT/CN2018/094577, filed on Jul. 4, 2018, which claims priority to Chinese Patent Application No. 201710537942.7, filed on Jul. 4, 2007. The disclosures of the aforementioned applications are hereby incorporated by reference in their entireties.

TECHNICAL FIELD

The present invention relates to the field of communications technologies, and in particular, to a data processing method and apparatus.

BACKGROUND

In a wireless local area network (WLAN), starting from 802.11a/g, an orthogonal frequency division multiplexing (OFDM) modulation scheme is used for a data packet (also referred to as a physical layer protocol data unit (PPDU)), and an entire transmission bandwidth is allocated to one station (STA).

In 802.11x, orthogonal frequency division multiple access (OFDMA) is further introduced based on OFDM, so that an entire bandwidth may be allocated to a plurality of STAs. 802.11ax defines four data packet types, including a single user (SU) data packet, an extended range single user (ER SU) data packet, a trigger-based (TB) data packet, and a multi-user (MU) data packet.

In a data transmission process in the wireless local area network, to resolve a problem of an excessively fast channel change caused by a Doppler scenario (a high-speed movement scenario), a middle preamble (Midamble) is inserted into a data field in the PPDU. To be specific, a midamble is inserted always every M symbols.

However, such a manner of inserting a midamble always every M symbols is difficult to accommodate different Doppler scenarios and data modulation and coding schemes.

SUMMARY

Embodiments of the present invention provide a data processing method and apparatus, to resolve a problem that an existing manner of inserting a midamble always every M symbols is difficult to accommodate different Doppler scenarios and data modulation and coding schemes.

According to a first aspect, an embodiment of the present invention provides a data processing method, including: generating a physical layer protocol data unit PPDU, where the PPDU includes a preamble field, a data field, and a middle preamble field, and the preamble in the PPDU includes information used to indicate an insertion frequency of the middle preamble in the data field in the PPDU; and sending the PPDU. The insertion frequency of the middle preamble in the data field is indicated by using a specified field in the preamble. In this way, in different scenarios, the middle preamble may be inserted into the data field at different frequency, thereby reducing overheads of an inserted pilot and improving data transmission performance.

In a possible implementation, the information used to indicate the insertion frequency of the middle preamble in the data field in the PPDU is added in one of the following fields: an SR field used to indicate a parameter related to spatial reuse in a high efficient signal field A HE-SIG-A, an MCS field used to indicate a modulation and coding scheme in the HE-SIG-A, an MCS field in a high efficient signal field B HE-SIG-B, a SIGB MCS field used to indicate a high efficient signal field B modulation and coding scheme in the HE-SIG-A, a combination of an MCS field and a DCM field in the HE-SIG-A, a combination of an MCS field and a DCM field in the HE-SIG-B, a combination of a SIGB MCS field and a SIGB DCM field in the HE-SIG-A, an NSTS field used to indicate a quantity of space time streams of a single user in the HE-SIG-B, a combination of an MCS field and an NSTS field, or an RU allocation field used to indicate a resource unit in the HE-SIG-B.

In a possible implementation, the insertion frequency of the middle preamble is indicated by using one or more of reserved values of the SR field.

In a possible implementation, the insertion frequency of the middle preamble is indicated by using one or more of reserved values of the MCS field or the SIGB MCS field.

In a possible implementation, the insertion frequency of the middle preamble is implicitly indicated by using a parameter used to indicate an MCS in the MCS field.

In a possible implementation, the insertion frequency of the middle preamble is indicated by using the combination of the MCS field and the DCM field.

In a possible implementation, the insertion frequency of the middle preamble is indicated by using the combination of the SIGB MCS field and the SIGB DCM field.

In a possible implementation, the insertion frequency of the middle preamble is implicitly indicated by using a parameter used to indicate an NSTS in the NSTS field.

In a possible implementation, the insertion frequency of the middle preamble is indicated by using the combination of the MCS field and the NSTS field.

In a possible implementation, the insertion frequency of the middle preamble is indicated by using a reserved value of the RU allocation field.

According to a second aspect, an embodiment of the present invention provides a data processing method, including: generating a trigger frame, where the trigger frame is used to instruct to generate and send a physical layer protocol data unit PPDU, the PPDU includes a data field and a middle preamble field, and the trigger frame includes information used to indicate an insertion frequency of the middle preamble in the data field in the PPDU; and sending the trigger frame. The insertion frequency of the middle preamble in the data field is indicated by using a specified field in the trigger frame. Based on the trigger frame, the TB PPDU may be triggered and the insertion frequency of the middle preamble in the data field in the TB PPDU may be indicated. In this way, in different scenarios, the middle preamble may be inserted into the data field at different frequency, thereby reducing overheads of an inserted pilot and improving data transmission performance in a PPDU transmission process.

In a possible implementation, the information used to indicate the insertion frequency of the middle preamble in the data field in the PPDU is added in one of the following fields: a Trigger Type field used to indicate a trigger frame type, a Doppler field used to indicate whether a Doppler mode is used for a data packet, an HE-SIG-A field, a Trigger Dependent Common Info field for indicating common information based on a trigger frame type, an MCS field, a combination of an MCS field and a DCM field, an RU allocation field, an SS allocation field used to indicate a quantity of space time streams, or a combination of an SS allocation field and an MCS field in the trigger frame.

In a possible implementation, one or more of reserved values of the Trigger Type field in the trigger frame are set to indicate that the trigger frame is a Doppler trigger frame, and to indicate that the trigger-based TB PPDU uses a middle preamble structure, and the insertion frequency of the middle preamble is indicated by using one or more of reserved values of the HE-SIG-A field.

In a possible implementation, one or more of reserved values of the Trigger Type field in the trigger frame are set to indicate that the trigger frame is a Doppler trigger frame, a midamble frequency indication field is added to the Trigger Dependent Common Info field in the trigger frame, and the insertion frequency of the middle preamble is indicated by using the midamble frequency indication field.

In a possible implementation, one or more of reserved values of the Trigger Type field in the trigger frame are set to indicate that the trigger frame is a Doppler trigger frame, and the insertion frequency of the middle preamble is indicated by using one or more of reserved values of the MCS field.

In a possible implementation, one or more of reserved values of the Trigger Type field in the trigger frame are set to indicate that the trigger frame is a Doppler trigger frame, and the insertion frequency of the middle preamble is indicated by using the combination of the MCS field and the DCM field.

In a possible implementation, one or more of reserved values of the Trigger Type field in the trigger frame are set to indicate that the trigger frame is a Doppler trigger frame, and the insertion frequency of the middle preamble is indicated by using a reserved value of the RU allocation field.

In a possible implementation, one or more of reserved values of the Trigger Type field in the trigger frame are set to indicate that the trigger frame is a Doppler trigger frame, and the insertion frequency of the middle preamble is implicitly indicated by using a parameter used to indicate an SS in the SS allocation field.

In a possible implementation, one or more of reserved values of the Trigger Type field in the trigger frame are set to indicate that the trigger frame is a Doppler trigger frame, and the insertion frequency of the middle preamble is implicitly indicated by using a parameter used to indicate an SS in the combination of the SS allocation field and the MCS field.

In a possible implementation, the Doppler field in the trigger frame is set to 1 to indicate that the TB PPDU uses a midamble structure, and the insertion frequency of the middle preamble is indicated by using one or more of reserved values of the HE-SIG-A field in a common field.

In a possible implementation, the Doppler field in the trigger frame is set to 1, a midamble frequency indication field is added to the Trigger Dependent Common Info field in the trigger frame in a common field, and the insertion frequency of the middle preamble is indicated by using the midamble frequency indication field.

In a possible implementation, the Doppler field in the trigger frame is set to 1, and the insertion frequency of the middle preamble is indicated by using one or more of reserved values of the MCS field.

In a possible implementation, the Doppler field in the trigger frame is set to 1, and the insertion frequency of the middle preamble is indicated by using the combination of the MCS field and the DCM field.

In a possible implementation, the Doppler field in the trigger frame is set to 1, and the insertion frequency of the middle preamble is indicated by using a reserved value of the RU allocation field.

In a possible implementation, the Doppler field in the trigger frame is set to 1, and the SS allocation field is used to indicate the insertion frequency of the middle preamble while indicating an SS parameter.

In a possible implementation, the Doppler field in the trigger frame is set to 1, and the insertion frequency of the middle preamble is implicitly indicated by using a parameter used to indicate an SS in the combination of the SS allocation field and the MCS field.

In a possible implementation, the insertion frequency of the middle preamble is indicated by using one or more of reserved values of the HE-SIG-A field.

In a possible implementation, the insertion frequency of the middle preamble is indicated by using a reserved value of a Reserved field in a User Info field.

According to a third aspect, an embodiment of the present invention provides a data processing method, including: generating a Media Access Control MAC frame, where the MAC frame is used to instruct to generate and send a physical layer protocol data unit PPDU, the PPDU includes a data field and a middle preamble field, and the MAC frame includes information used to indicate an insertion frequency of the middle preamble in the data field in the PPDU; and sending the MAC frame. The insertion frequency of the middle preamble is indicated by using a specified field in the MAC frame. Based on the MAC frame, the TB PPDU may be triggered and the insertion frequency of the middle preamble in the data field in the TB PPDU may be indicated. In this way, in different scenarios, the middle preamble may be inserted into the data field at different frequency, thereby reducing overheads of an inserted pilot and improving data transmission performance in a PPDU transmission process.

In a possible implementation, the information used to indicate the insertion frequency of the middle preamble in the data field in the PPDU is added in a high throughput control field HTC in the MAC frame, and the HTC field includes an RU allocation field used to indicate a resource unit, a UL MCS field used to indicate an uplink modulation and coding scheme, and a reserved value field Reserved.

In a possible implementation, the insertion frequency of the middle preamble in the data field in the TB PPDU is indicated by using a reserved value of the RU allocation field.

In a possible implementation, the insertion frequency of the middle preamble in the data field in the TB PPDU is indicated by using one or more of reserved values of the UL MCS

FIELD

In a possible implementation, the insertion frequency of the middle preamble in the data field in the TB PPDU is indicated by using one or more of reserved values of the Reserved field.

According to a fourth aspect, an embodiment of the present invention provides a data processing method, including: receiving a physical layer protocol data unit PPDU. The PPDU includes a preamble field, a data field, and a middle preamble field, and the preamble in the PPDU includes information used to indicate an insertion frequency of the middle preamble in the data field in the PPDU.

In a possible implementation, the information used to indicate the insertion frequency of the middle preamble in the data field in the PPDU is added in one of the following fields: an SR field used to indicate a parameter related to spatial reuse in a high efficient signal field A HE-SIG-A, an MCS field used to indicate a modulation and coding scheme in the HE-SIG-A, an MCS field in a high efficient signal field B HE-SIG-B, a SIGB MCS field used to indicate a high efficient signal field B modulation and coding scheme in the HE-SIG-A, a combination of an MCS field and a DCM field in the HE-SIG-A, a combination of an MCS field and a DCM field in the HE-SIG-B, a combination of a SIGB MCS field and a SIGB DCM field in the HE-SIG-A, an NSTS field used to indicate a quantity of space time streams of a single user in the HE-SIG-B, a combination of an MCS field and an NSTS field, or an RU allocation field used to indicate a resource unit in the HE-SIG-B.

According to a fifth aspect, an embodiment of the present invention provides a data processing method, including: receiving a trigger frame, where the trigger frame is used to instruct to generate and send a physical layer protocol data unit PPDU, the trigger frame includes information used to indicate an insertion frequency of a middle preamble in a data field in the PPDU, and the PPDU includes the data field and the middle preamble field; generating the PPDU based on the trigger frame; and sending the PPDU.

In a possible implementation, the information used to indicate the insertion frequency of the middle preamble in the data field in the PPDU is added in one of the following fields: a Trigger Type field used to indicate a trigger frame type, a Doppler field used to indicate whether a Doppler mode is used for a data packet, a high efficient signal field A HE-SIG-A, a Trigger Dependent Common Info field for indicating common information based on a trigger frame type, an MCS field used to indicate a modulation and coding scheme, a combination of an MCS field and a DCM field, an RU allocation field used to indicate a resource unit, an SS allocation field used to indicate a quantity of space time streams, or a combination of an SS allocation field and an MCS field in the trigger frame.

According to a sixth aspect, an embodiment of the present invention provides a data processing method, including: receiving a Media Access Control MAC frame, where the MAC frame is used to instruct to generate and send a physical layer protocol data unit PPDU, the PPDU includes a data field and a middle preamble field, and the MAC frame includes information used to indicate an insertion frequency of the middle preamble in the data field in the PPDU; and generating and sending the PPDU based on the MAC frame.

In a possible implementation, the information used to indicate the insertion frequency of the middle preamble in the data field in the PPDU is added in a high throughput control field HTC in the MAC frame, and the HTC field includes an RU allocation field used to indicate a resource unit, a UL MCS field used to indicate an uplink modulation and coding scheme, and a reserved value field Reserved.

According to a seventh aspect, an embodiment of the present invention provides a data processing apparatus, including: a PPDU generation unit, configured to generate a physical layer protocol data unit PPDU, where the PPDU includes a preamble field, a data field, and a middle preamble field, and the preamble in the PPDU includes information used to indicate an insertion frequency of the middle preamble in the data field in the PPDU; and a sending unit, configured to send the PPDU.

In a possible implementation, the information used to indicate the insertion frequency of the middle preamble in the data field in the PPDU is added in one of the following fields: an SR field used to indicate a parameter related to spatial reuse in a high efficient signal field A HE-SIG-A, an MCS field used to indicate a modulation and coding scheme in the HE-SIG-A, an MCS field in a high efficient signal field B HE-SIG-B, a SIGB MCS field used to indicate a high efficient signal field B modulation and coding scheme in the HE-SIG-A, a combination of an MCS field and a DCM field in the HE-SIG-A, a combination of an MCS field and a DCM field in HE-SIG-B, a combination of a SIGB MCS field and a SIGB DCM field in the HE-SIG-A, an NSTS field used to indicate a quantity of space time streams of a single user in the HE-SIG-B, a combination of an MCS field and an NSTS field, or an RU allocation field used to indicate a resource unit in the HE-SIG-B.

According to an eighth aspect, an embodiment of the present invention provides a data processing apparatus, including: a trigger frame generation unit, configured to generate a trigger frame, where the trigger frame is used to instruct to generate and send a physical layer protocol data unit PPDU, the PPDU includes a data field and a middle preamble field, and the trigger frame includes information used to indicate an insertion frequency of the middle preamble in the data field in the PPDU; and a sending unit, configured to send the trigger frame.

In a possible implementation, the information used to indicate the insertion frequency of the middle preamble in the data field in the PPDU is added in one of the following fields: a Trigger Type field used to indicate a trigger frame type, a Doppler field used to indicate whether a Doppler mode is used for a data packet, a high efficient signal field A HE-SIG-A, a Trigger Dependent Common Info field for indicating common information based on a trigger frame type, an MCS field used to indicate a modulation and coding scheme, a combination of an MCS field and a DCM field, an RU allocation field used to indicate a resource unit, an SS allocation field used to indicate a quantity of space time streams, or a combination of an SS allocation field and an MCS field in the trigger frame.

According to a ninth aspect, an embodiment of the present invention provides a data processing apparatus, including: a MAC frame generation unit, configured to generate a Media Access Control MAC frame, where the MAC frame is used to instruct to generate and send a physical layer protocol data unit PPDU, the PPDU includes a data field and a middle preamble field, and the MAC frame includes information used to indicate an insertion frequency of the middle preamble in the data field in the PPDU; and a sending unit, configured to send the MAC frame.

In a possible implementation, the information used to indicate the insertion frequency of the middle preamble in the data field in the PPDU is added in a high throughput control field HTC in the MAC frame, and the HTC field includes an RU allocation field used to indicate a resource unit, a UL MCS field used to indicate an uplink modulation and coding scheme, and a reserved value field Reserved.

According to a tenth aspect, an embodiment of the present invention provides a data processing apparatus, including a receiving unit, configured to receive a physical layer protocol data unit PPDU. The PPDU includes a preamble field, a data field, and a middle preamble field, and the preamble in the PPDU includes information used to indicate an insertion frequency of the middle preamble in the data field in the PPDU.

In a possible implementation, the information used to indicate the insertion frequency of the middle preamble in the data field in the PPDU is added in one of the following fields: an SR field used to indicate a parameter related to spatial reuse in a high efficient signal field A HE-SIG-A, an MCS field used to indicate a modulation and coding scheme in the HE-SIG-A, an MCS field in a high efficient signal field B HE-SIG-B, a SIGB MCS field used to indicate a high efficient signal field B modulation and coding scheme in the HE-SIG-A, a combination of an MCS field and a DCM field in the HE-SIG-A, a combination of an MCS field and a DCM field in the HE-SIG-B, a combination of a SIGB MCS field and a SIGB DCM field in the HE-SIG-A, an NSTS field used to indicate a quantity of space time streams of a single user in the HE-SIG-B, a combination of an MCS field and an NSTS field, or an RU allocation field used to indicate a resource unit in the HE-SIG-B.

According to an eleventh aspect, an embodiment of the present invention provides a data processing apparatus, including: a receiving unit, configured to receive a trigger frame, where the trigger frame is used to instruct to generate and send a physical layer protocol data unit PPDU, the trigger frame includes information used to indicate an insertion frequency of a middle preamble in a data field in the PPDU, and the PPDU includes the data field and the middle preamble field; a PPDU generation unit, configured to generate the PPDU based on the trigger frame; and a sending unit, configured to send the PPDU.

In a possible implementation, the information used to indicate the insertion frequency of the middle preamble in the data field in the PPDU is added in one of the following fields: a Trigger Type field used to indicate a trigger frame type, a Doppler field used to indicate whether a Doppler mode is used for a data packet, a high efficient signal field A HE-SIG-A, a Trigger Dependent Common Info field for indicating common information based on a trigger frame type, an MCS field used to indicate a modulation and coding scheme, a combination of an MCS field and a DCM field, an RU allocation field used to indicate a resource unit, an SS allocation field used to indicate a quantity of space time streams, or a combination of an SS allocation field and an MCS field in the trigger frame.

According to a twelfth aspect, an embodiment of the present invention provides a data processing apparatus, including: a receiving unit, configured to receive a Media Access Control MAC frame, where the MAC frame is used to instruct to generate and send a physical layer protocol data unit PPDU, the PPDU includes a data field and a middle preamble field, and the MAC frame includes information used to indicate an insertion frequency of the middle preamble in the data field in the PPDU; a PPDU generation unit, configured to generate the PPDU based on the MAC frame; and a sending unit, configured to send the PPDU.

In a possible implementation, the information used to indicate the insertion frequency of the middle preamble in the data field in the PPDU is added in a high throughput control field HTC in the MAC frame, and the HTC field includes an RU allocation field used to indicate a resource unit, a UL MCS field used to indicate an uplink modulation and coding scheme, and a reserved value field Reserved.

According to a thirteenth aspect, an embodiment of the present invention provides a computer-readable storage medium. The computer-readable storage medium stores an instruction. When running on a computer, the instruction enables the computer to perform the methods according to the foregoing aspects.

According to a fourteenth aspect, an embodiment of the present invention provides a computer program product including an instruction. When running on a computer, the computer program product enables the computer to perform the methods according to the foregoing aspects.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

To facilitate understanding of the embodiments of the present invention, the following further explains the specific embodiments with reference to the accompanying drawings, and the embodiments do not constitute a limitation on the embodiments of the present invention.

Figure 1:
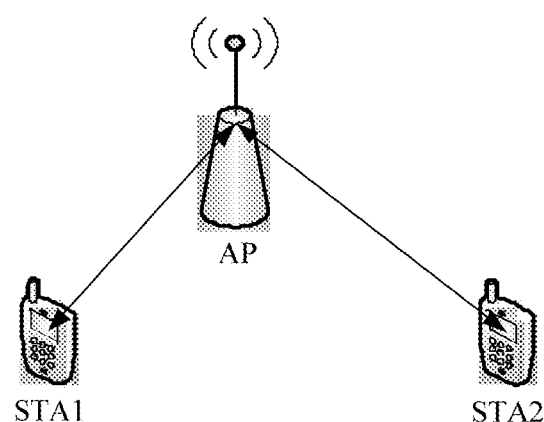
FIG. 1 is a diagram of an application scenario according to an embodiment of the present invention.
Figure 2:
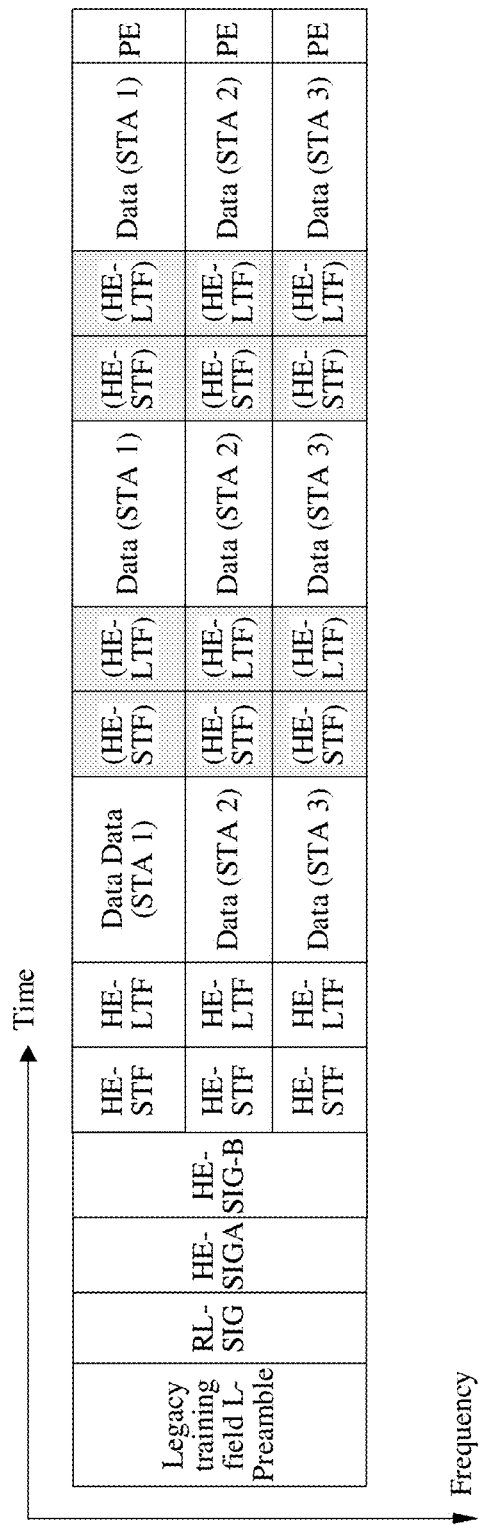
FIG. 2 is a schematic structural diagram of an MU PPDU in the prior art.

The embodiments of the present invention are mainly applied to data communication between one node and one or more other nodes, and in a data communication process, a Doppler scenario or a high-speed movement scenario occurs. For example, communication between an AP and a STA shown in FIG. 1 is also applicable between an AP and an AP or between a STA and a STA. The data communication in FIG. 1 includes two types of data: uplink data (data sent by the STA to the AP) and downlink data (data sent by the AP to the STA). An 802.11ax standard defines four data packet structures. For uplink and downlink single-user data transmission, an SU PPDU or an ER SU PPDU is usually used for transmission. For downlink multi-user data transmission, an MU PPDU is used for transmission. For uplink multi-user data transmission, first, the AP needs to send a trigger frame to the STA, and then the STA sends a TB PPDU to the AP based on the trigger frame. FIG. 2 shows a form of an MU PPDU in the prior art. As shown in FIG. 2, the MU PPDU includes a preamble field, a data field Data, a middle preamble field Midamble, and a data packet extension field PE.

In a less desirable implementation, to resolve a problem of an excessively fast channel change caused by the Doppler scenario (the high-speed movement scenario), a middle preamble field (Midamble) is usually inserted into the data field Data always every M symbols. The middle preamble field (Midamble field) may be a combination of HE-STF and HE-LTF or only HE-LTF. In a data receiving process, a midamble may enable a receive end to re-estimate a channel after receiving data Data of every M symbols, and then continue to receive data Data of next M symbols, so as to effectively resolve the problem of the excessively fast channel change caused by Doppler. In the MU PPDU shown in FIG. 2, two midambles are inserted.

The preamble field includes a legacy preamble (L-Preamble), a repeated legacy signal field (RL-SIG), a high efficient signal field A (HE-SIG-A), a high efficient signal field B (HE-SIG-B), a high efficient short training field (HE-STF), and a high efficient long training field (HE-LTF). It should be noted that, HE in the foregoing fields represents a reference number of the 802.11ax standard. In the solutions of the present invention, these fields may alternatively use another reference number to represent signal fields in a PPDU in another standard, such as next generation (NG) and very high efficient (VHE).

TABLE 1

| Field | Full Name | Meaning |
|---|---|---|
| UL/DL | Uplink/Downlink | Used to indicate whether a data packet is used for uplink transmission or downlink transmission |
| SIGB | HE-SIG-B | High efficient signal field B modulation and coding scheme |
| MCS | Modulation and Coding Scheme | |

TABLE 1-continued

| Field | Full Name | Meaning |
|---|---|---|
| SIGB DCM | HE-SIG-B Dual Coding Modulation | Used to indicate whether dual carrier modulation is used for a high efficient signal field B |
| BSS color | Basic Service Set Color | Used to identify a color of a basic service set |
| Spatial reuse | | Used to indicate a parameter related to spatial reuse |
| Bandwidth | | Used to indicate a bandwidth of a data packet |
| Number of HE-SIG-B symbols or MU-MIMO users | MU MIMO: Multiple User Multiple Input Multiple Output | Used to indicate a quantity of symbols in a high efficient signal field B or a quantity of users for multi-user multiple-input multiple-output |
| SIGB compression | | Used to indicate whether a high efficient signal field B is compressed |
| GI + LTF size | Guard Interval + High Efficient Long Training Field size | Used to indicate a guard interval and a size of a high efficient long training field |
| Doppler | | Used to indicate whether a Doppler mode is used for a data packet |
| TXOP | Transmit Opportunity | Used to indicate a transmit opportunity |
| Reserved | | Reserved bit, which is set to 1 |
| Number of HE-LTF Symbols | | Used to indicate a quantity of symbols in a high efficient long training field |
| LDPC Extra Symbol Segment | LDPC: Low Density Parity Code | Used to indicate whether an extra symbol segment exists in a case of a low density parity code |
| STBC | Space Time Block Code | Indicate whether space time coding is used |
| Pre-FEC Padding Factor | FEC: forward error control | Used to indicate a padding factor before forward error control |
| PE Disambiguity | PE: Packet Extension | Data packet extension disambiguation bit |
| CRC | Cyclic redundancy code | Cyclic redundancy code |
| Tail | | Tail bit |

Referring to Table 1, Table 1 shows fields included in the HE-SIG-A in the MU PPDU. The fields included in the HE-SIG-A include common information, for example, identification information of a basic service set, indication information of a transmit opportunity, indication information of a spatial reuse parameter, and allocation information of some resources on a physical layer. The allocation information of some resources on the physical layer includes related indication information of a size of the HE-LTF, a quantity of HE-LTFs, a size of a guard interval, an LDPC, and an STBC, and related information of the HE-SIG-B. The related information of the HE-SIG-B includes an MCS and a length of the HE-SIG-B.

The HE-SIG-B following the HE-SIG-A includes a common field and a User Info field. The common field is used to indicate resource unit allocation (RU Allocation). The RU allocation is used to indicate allocation of all resource units in frequency domain and a quantity of STAs in each resource unit. In 802.11ax, if the quantity of STAs in the resource unit is 1, a non-MU-MIMO mode is used, and if the quantity of STAs in the resource unit is greater than 1, a MU-MIMO mode is used. Depending on whether MU-MIMO is used for a resource unit, two different indication methods are used for the User Info field in the HE-SIG-B.

TABLE 2

| STA-ID | STA Identifier | The station identifier is usually used to indicate an association identifier of a STA. |
|---|---|---|
| NSTS | Number of Space Time Stream | Used to indicate a quantity of space time streams of a single user |
| Tx Beamforming | Transmit Beamforming | Used to indicate whether a beamforming technology is used |
| MCS | Modulation and Coding Scheme | Modulation and coding scheme |
| DCM | Dual Coding Modulation | Dual carrier modulation |
| Coding | | Indicate a coding type |

Table 2 shows fields included in the User Info field in the HE-SIG-B in a case of the non-MU-MIMO mode.

TABLE 3

| STA-ID | STA Identifier | The station identifier is usually used to indicate an association identifier of a STA. |
|---|---|---|
| Spatial Configuration | Number of Spatial Stream | A table is used to indicate a quantity of space time streams of an MU-MIMO unit. |
| MCS | Modulation and Coding Scheme | Modulation and coding scheme |
| DCM | Dual Coding Modulation | Dual carrier modulation |
| Coding | | Indicate a coding type |

Table 3 shows fields included in the User Info field in the HE-SIG-B in a case of the MU-MIMO mode.

TABLE 4

| | MCS | | | |
|---|---|---|---|---|
| Doppler Condition | MCS0 | MCS1 | MCS3 | MCS5 |
| 60 Km/h on 2nd/3rd tap | 50 | 30 | 15 | 8 |
| 60 Km/h on all taps | 30 | 20 | 10 | 5 |
| 30 Km/h on all taps | 60 | 40 | 20 | 10 |
| 15 Km/h on all taps | 120 | 80 | 40 | 20 |

Table 4 shows suggested midamble insertion frequency in cases of different rates and different MCSs. It can be learned from Table 4 that in different Doppler scenarios and MCSs, a manner of inserting a midamble always every M symbols cannot be applied to different scenarios.

TABLE 5

| Field | Full Name | Meaning in Chinese |
|---|---|---|
| Format | | Used to indicate whether a format of a data packet is an SU format or a TB format |
| Beam change | | Indicate whether a beam change is used |
| UL/DL | Uplink/Downlink | Used to indicate whether a data packet is used for uplink transmission or downlink transmission |
| MCS | Modulation and Coding Scheme | Modulation and coding scheme for a data part |

TABLE 5-continued

| Field | Full Name | Meaning in Chinese |
|---|---|---|
| DCM | Dual Coding Modulation | Used to indicate whether dual carrier modulation is used for a data part |
| BSS color | Basic Service Set Color | Used to identify a color of a basic service set |
| Reserved | | Reserved bit, which is set to 1 |
| Spatial reuse | | Used to indicate a parameter related to spatial reuse |
| Bandwidth | | Used to indicate a bandwidth of a data packet |
| GI + LTF size | Guard Interval + High Efficient Long Training Field size | Used to indicate a guard interval and a size of a high efficient long training field |
| NSTS | Number of Space Time Stream | Used to indicate a quantity of space time streams |
| TXOP | Transmit Opportunity | Used to indicate a transmit opportunity |
| Coding | | Indicate a coding type |
| LDPC Extra Symbol Segment | LDPC: Low Density Parity Code | Used to indicate whether an extra symbol segment exists in a case of a low density parity code |
| STBC | Space Time Block Code | Indicate whether space time coding is used |
| Pre-FEC Padding Factor | FEC: forward error control | Used to indicate a padding factor before forward error control |
| PE Disambiguity | PE: Packet Extension | Data packet extension disambiguation bit |
| Reserved | | Reserved bit, which is set to 1 |
| Doppler | | Used to indicate whether a Doppler mode is used for a data packet |
| CRC | Cyclic redundancy code | Cyclic redundancy code |
| Tail | | Tail bit |

Comparing with a format of the MU PPDU, formats of the SU PPDU, the ER SU PPDU, and the TB PPDU lack the HE-SIG-B field. For example, Table 5 shows fields included in the HE-SIG-A in the SU PPDU or the ER SU PPDU. For details, refer to the foregoing descriptions of the MU PPDU, and details are not described herein again.

Figure 3:
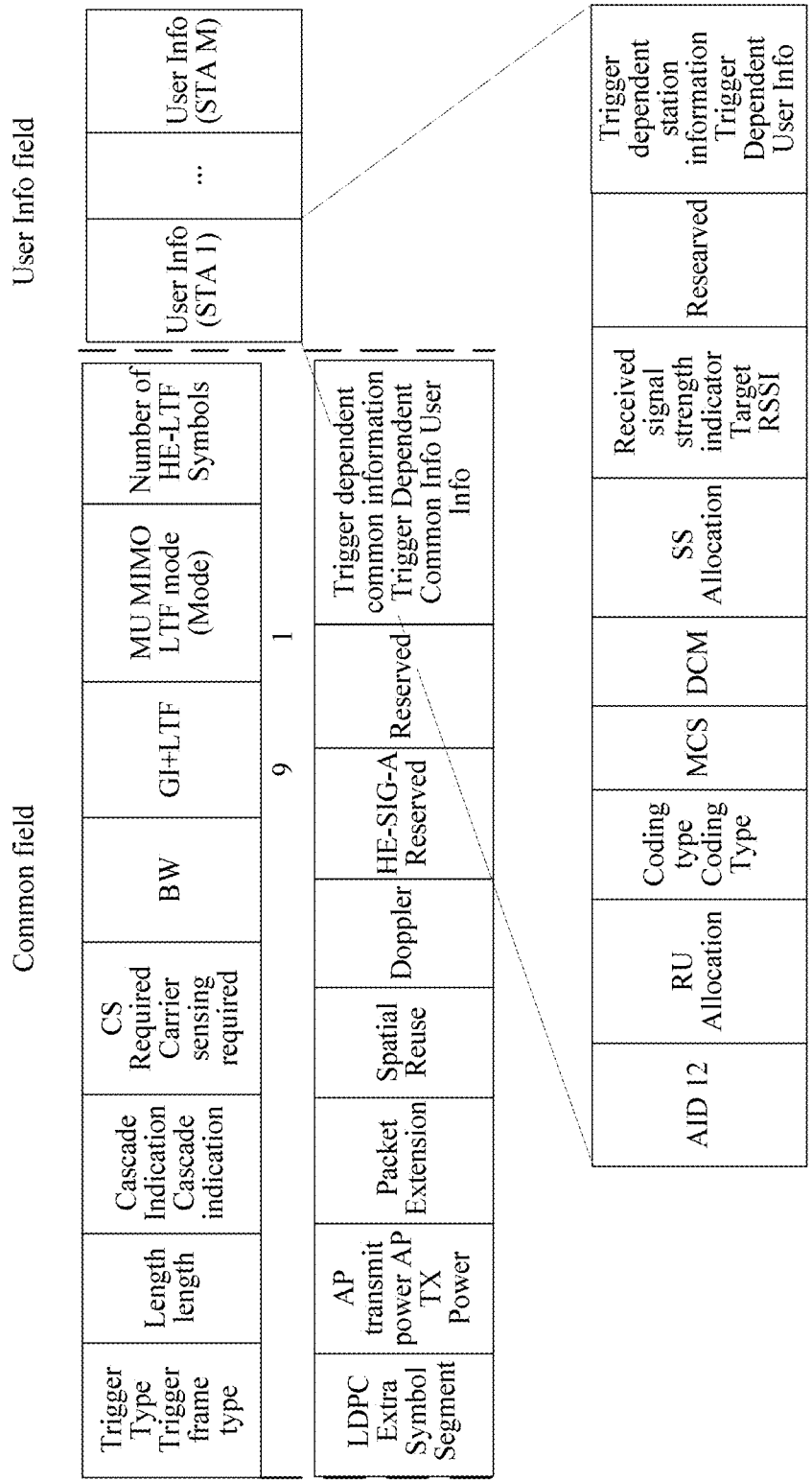
FIG. 3 is a schematic diagram of a frame structure of a trigger frame in the prior art.

FIG. 3 is a schematic diagram of a frame structure of a trigger frame in the prior art. For uplink multi-user transmission, first, an AP sends a trigger frame to a plurality of STAs. The trigger frame may indicate resource for performing uplink transmission by a STA. After receiving the trigger frame, the STA performs uplink multi-user transmission based on the resource indication information in the trigger frame. The uplink multi-user transmission is performed based on the trigger frame. Therefore, a PPDU sent by the STA is referred to as a trigger-based data packet structure (TB PPDU). The frame structure of the trigger frame defined in 802.11x is shown in FIG. 3, and includes a common field and a User Info field. The common field includes a trigger frame type used to indicate trigger frames of different subtypes and carrier sensing (CS) required used to indicate whether the STA needs to perform carrier sensing after receiving a trigger frame. Data is sent when a channel is idle. Depending on different trigger frame types, common information or station information based on the trigger frame type carries corresponding indication information. The User Info field includes RU Allocation, MCS, DCM, and SS Allocation.

Figure 4A:
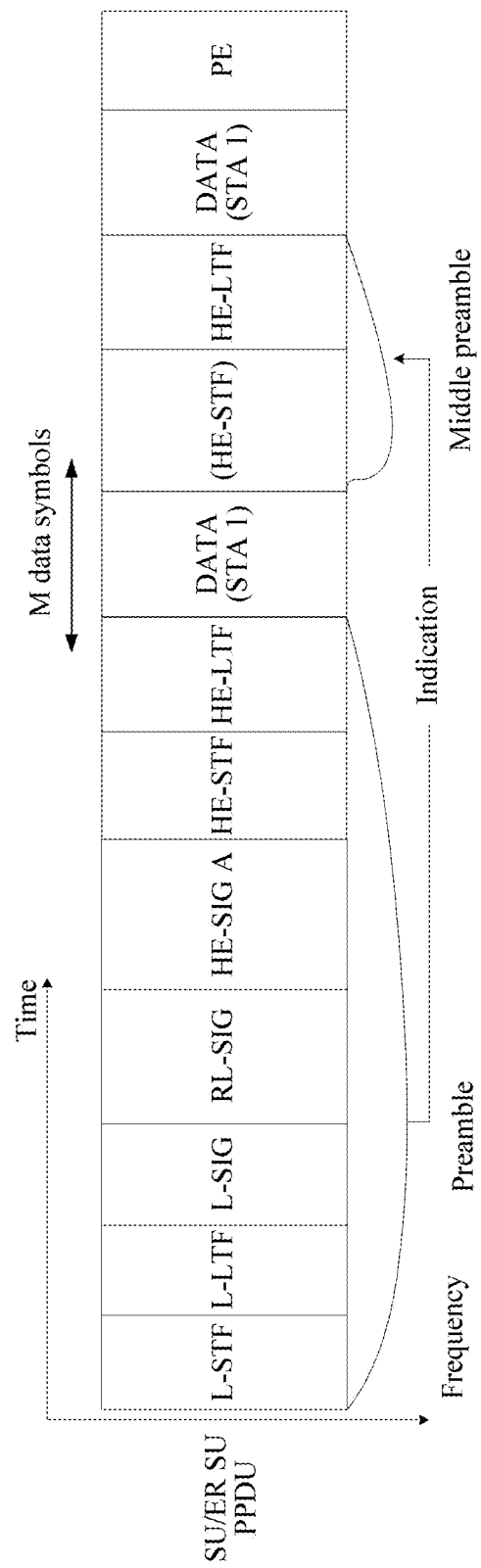
FIG. 4a is a schematic structural diagram of an SU/ER SU PPDU according to an embodiment of the present invention.
Figure 5:
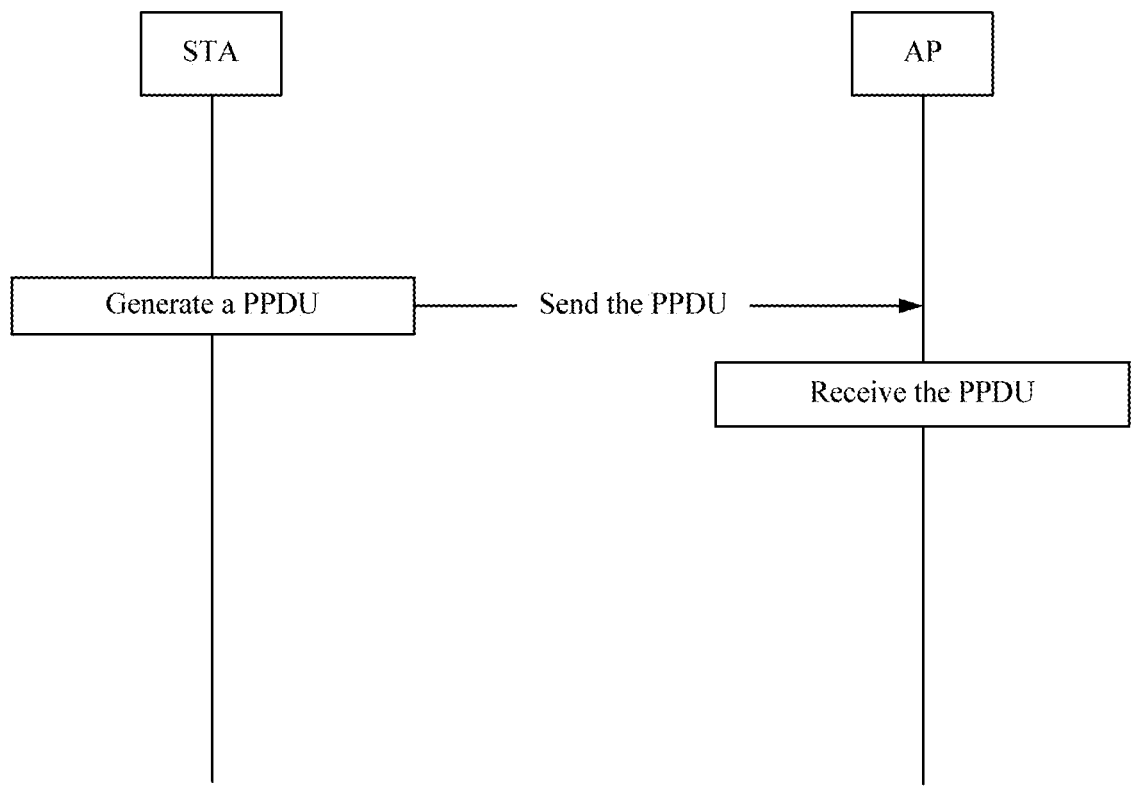
FIG. 5 is an interaction diagram of a data processing method according to an embodiment of the present invention.

The embodiments of the present invention provide a data processing method. The method relates to PPDU transmission. The method is applicable to downlink data transmission (for example, the AP transmits data to the STA in FIG. 1) and uplink single user transmission (for example, one STA transmits data to the AP in FIG. 1), and more specifically, to transmission of an HE SU PPDU, an HE ER SU PPDU, and an HE MU SU PPDU. Specifically, the following content is included:

FIG. 5 is an interaction diagram of a data processing method according to an embodiment of the present invention. The method is applicable to a Doppler scenario or a high-speed movement scenario. A STA generates a PPDU (a Doppler bit field in a preamble in the PPDU needs to be set to 1 in a PPDU generation process). FIG. 4a is a schematic structural diagram of an SU/ER SU PPDU according to an embodiment of the present invention. The PPDU includes a preamble field, a data field, and a middle preamble field, and the preamble field in the PPDU includes information used to indicate an insertion frequency of the middle preamble field inserted in the data field in the PPDU. In this embodiment of the present invention, a midamble is inserted every M symbols (herein, the M symbols do not include the midamble) in the data field. In the PPDU generation process, the STA first generates a preamble field part of the PPDU, and generates a data field part in the foregoing manner of inserting a midamble every M symbols in the data field, so as to generate the entire PPDU. The STA sends the generated PPDU to an AP. The AP receives the PPDU sent by the STA. When the AP receives the PPDU, the AP first receives the preamble field part of the PPDU, next obtains information M of the insertion frequency of the middle preamble field inserted in the data field based on the preamble field part, and then receives the data field part based on M. Specifically, the AP first receives data of M symbols in the data field based on HE-STF and HE-LTF in the last part of the preamble field, and then re-estimates a channel based on the midamble (HE-LTF or a combination of HE-STF and HE-LTF), and further receives data of next M symbols. In this way, the AP receives the data field in the entire PPDU.

Figure 4B:
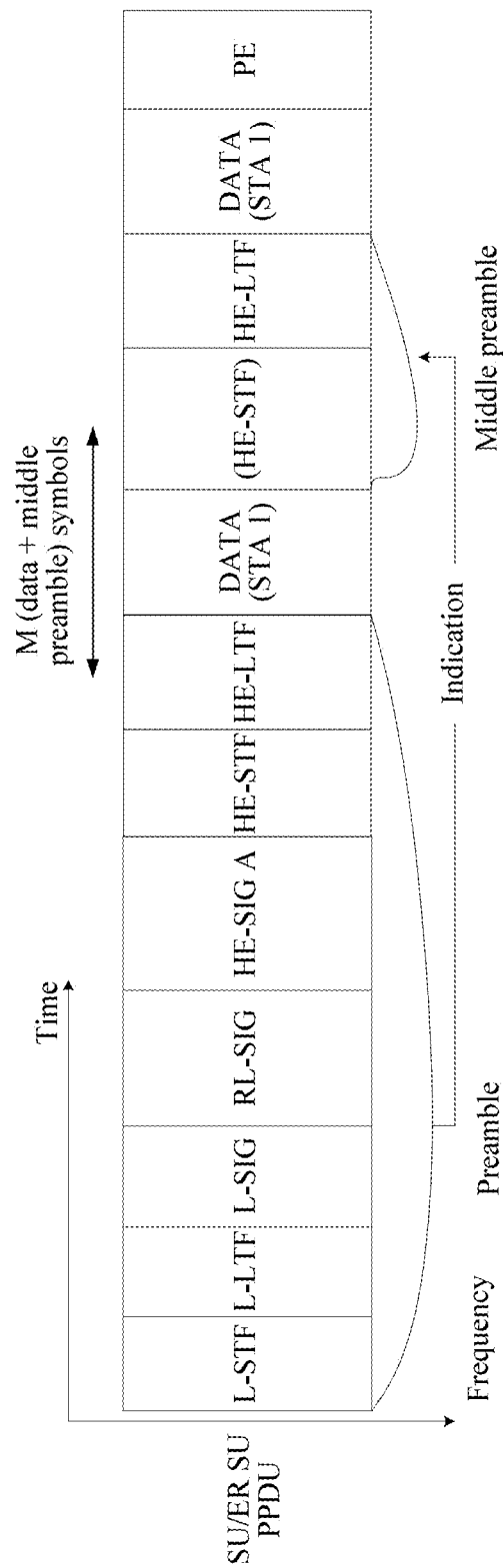
FIG. 4b is another schematic structural diagram of an SU/ER SU PPDU according to an embodiment of the present invention.

FIG. 4b is another schematic structural diagram of an SU/ER SU PPDU according to an embodiment of the present invention. The PPDU includes a preamble field, a data field, and a middle preamble field. In the data field Data, for every M symbols (herein, the M symbols include a midamble), that is, the M symbols include data and a midamble, the midamble has two formats: HE-LTF or a combination of HE-STF and HE-LTF. HE-LTF is one symbol, and a quantity of symbol in HE-STF is determined based on the preamble. In this embodiment, it is assumed that HE-STF is N symbols. When the midamble is HE-LTF, the M symbols include data of M−1 symbols and HE-LTF of one symbol. When the midamble is a combination of HE-STF and HE-LTF, the M symbols include data of M−N−1 symbols, HE-STF of N symbols, and HE-LTF of one symbol.

Figure 4C:
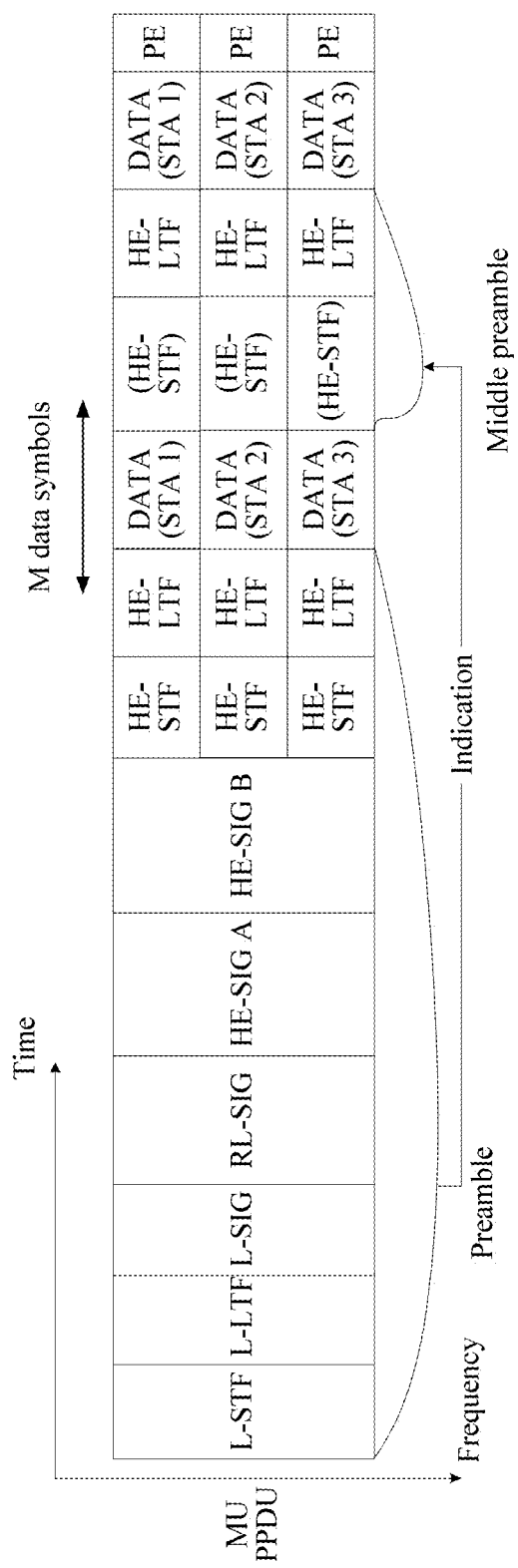
FIG. 4c is a schematic structural diagram of an MU PPDU according to an embodiment of the present invention.

FIG. 4c is a schematic structural diagram of an MU PPDU according to an embodiment of the present invention. For the PPDU, a midamble is inserted every M symbols (herein, the M symbols do not include the midamble) in the data field Data. For details, refer to related descriptions of FIG. 4a, and details are not described herein again.

Figure 4D:
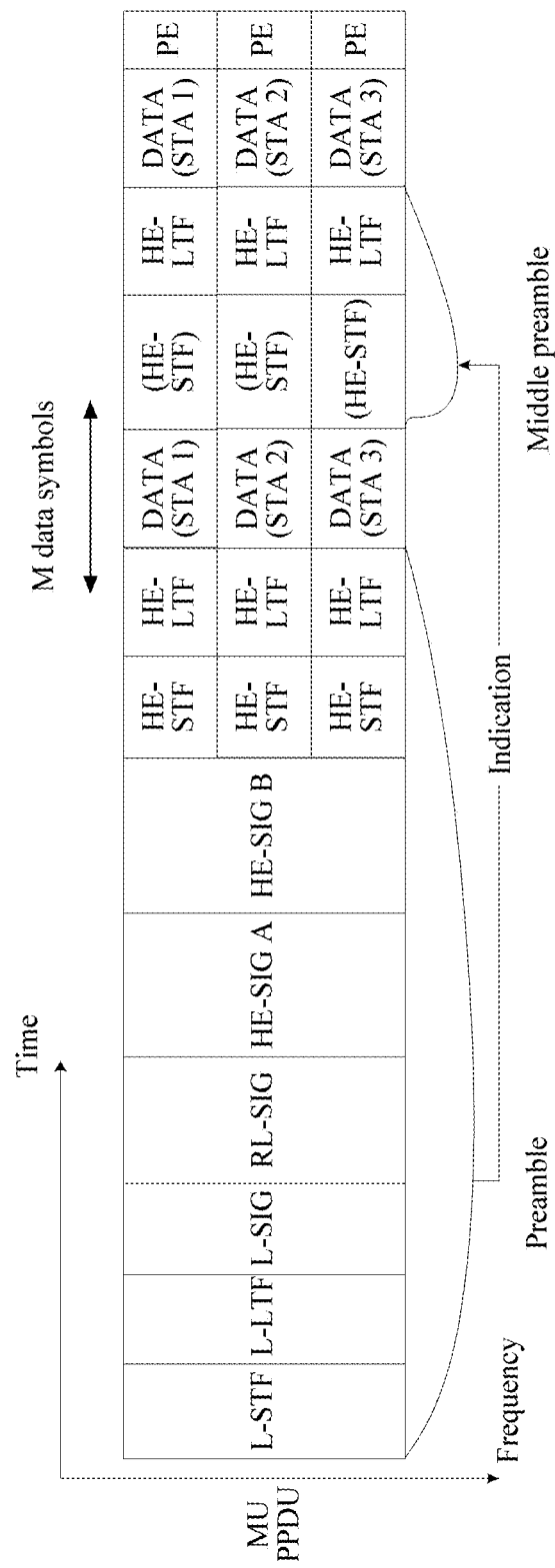
FIG. 4d is another schematic structural diagram of an MU PPDU according to an embodiment of the present invention.

FIG. 4d is another schematic structural diagram of an MU PPDU according to an embodiment of the present invention. For the PPDU, a midamble is inserted every M symbols (herein, the M symbols include the midamble) in the data field Data. For details, refer to related descriptions of FIG. 4b, and details are not described herein again.

It should be noted that in this embodiment of the present invention, insertion of the middle preamble into the data field Data based on symbols is described. Herein, in addition to symbol-based division, the middle preamble may be inserted into the data field according to another rule, and details are not further described in this embodiment.

The information used to indicate the insertion frequency of the middle preamble in the data field in the PPDU may be added in a spatial reuse (SR for short below) field in the HE-SIG-A (the HE SU PPDU, the HE ER SU PPDU, and the HE MU SU PPDU). For details, refer to Table 6. In an 802.11ax standard, the SR field includes four bits, and may indicate 16 cases (SR values are 0 to 15). When an SR value is 0, it indicates SRP_DISALLOW, representing that SR transmission based on a spatial reuse parameter (Spatial Reuse Parameter, SRP) is prohibited. When SR values are 1 to 12, the values are reserved values. When an SR value is 13, it indicates SR_RESTRICTED, representing that SR transmission is restricted. When an SR value is 14, it indicates SR_DELAY, representing that SR transmission is delayed. When an SR value is 15, it indicates SRP_AND_NON-SRG_OBSS-PD_PROHIBITED, representing that overlapping basic service set (OBSS)-data packet detection for SRP and a non-SR group (Group) is prohibited.

TABLE 6

| SR Value | Meaning |
|---|---|
| 0 | SRP_DISALLOW |
| 1-12 | Reserved |
| 13 | SR_RESTRICTED |
| 14 | SR_DELAY |
| 15 | SRP_AND_NON-SRG_OBSS-PD_PROHIBITED |

Optionally, in an example of the present invention, the insertion frequency of the middle preamble in the data field in the PPDU is indicated by using one or more of reserved values of the SR field. That is, the insertion frequency of the middle preamble is indicated by using one or more of the reserved values (1 to 12) of the SR field. This may be applicable to a downlink data transmission solution (for example, the AP transmits data to the STA in FIG. 1).

TABLE 7

| SR Value | Meaning |
|---|---|
| 0 | SRP_DISALLOW |
| 1 | M = M1 |
| 2 | M = M2 |
| 3-12 | Reserved |
| 13 | SR_RESTRICTED |
| 14 | SR_DELAY |
| 15 | SRP_AND_NON-SRG_OBSS-PD_PROHIBITED |

For example, Table 7 is an example of the foregoing indication method. The SR value 1 indicates M (the insertion frequency of the middle preamble in the data field, that is, a middle preamble is inserted every M symbols)=M1. The SR value 2 indicates M=M2. For example, M1=5, and M2=10. A specific quantity of values in the SR values 1 to 12 that are used to indicate M and a specific numerical value of M may be set according to a specific Doppler scenario or high-speed movement scenario, and this embodiment imposes no specific limitation thereon.

Optionally, in an example of the present invention, the insertion frequency of the middle preamble in the data field in the PPDU is implicitly indicated by using a parameter used to indicate SR in SR. This may be applicable to a downlink data transmission solution (for example, the AP transmits data to the STA in FIG. 1).

TABLE 8

| SR Value | Meaning |
|---|---|
| 0 | SRP_DISALLOW, M = M1 |
| 1 | SRP_DISALLOW, M = M2 |
| 2 | M = M1 |
| 3 | M = M2 |
| 4-9 | Reserved |
| 10 | SR_RESTRICTED, M = M2 |
| 11 | SR_DELAY, M = M2 |
| 12 | SRP_AND_NON-SRG_OBSS-PD_PROHIBITED, M = M2 |
| 13 | SR_RESTRICTED, M = M1 |
| 14 | SR_DELAY, M = M1 |
| 15 | SRP_AND_NON-SRG_OBSS-PD_PROHIBITED, M = M1 |

For example, Table 8 is an example of the foregoing indication method. When the SR value is 0, 13, 14, or 15, the SR value indicates M=M1 while indicating a corresponding SR parameter. Four values are randomly selected from the SR values 1 to 12, and the four values each are used to indicate M while indicating a corresponding parameter M=when the SR values are 0, 13, 14, and 15. For example, when the SR value is 1, it indicates SRP_DISALLOW and M=M2. The SR value 2 indicates M=M1. The SR value 3 indicates M=M2. When the SR value is 2 or 3 only M is indicated, and the SR parameter is not indicated. When the SR value is 10, it indicates SR_RESTRICTED and M=M2. When the SR value is 11, it indicates SR_DELAY and M=M2. When the SR value is 12, it indicates SRP_AND_NON-SRG_OBSS-PD_PROHIBITED and M=M2. A specific quantity of values in the SR values 0 to 15 that are used to indicate M and a specific numerical value of M may be set according to a specific Doppler scenario or high-speed movement scenario, and this embodiment imposes no specific limitation thereon.

In this embodiment of the present invention, the information used to indicate the insertion frequency of the middle preamble in the data field in the PPDU may be added in one of the following fields: an MCS field in the HE-SIG-A (the HE SU PPDU), an MCS field in the HE-SIG-B (the HE MU SU PPDU), or a SIGB MCS field in the HE-SIG-A (the HE MU SU PPDU). The MCS field includes four bits, and may indicate 16 cases (MCS values are 0 to 15). Currently, 802.11ax supports 12 MCSs: MCS0 to MCS11. MCS12 to MCS15 are reserved values. For details, refer to Table 9.

TABLE 9

| MCS Value | Meaning |
|---|---|
| 0-11 | Indicate MCS0 to MCS11 respectively |
| 12-15 | Reserved |

Optionally, in an example of the present invention, the insertion frequency of the middle preamble in the data field in the PPDU is indicated by using one or more of reserved values of the MCS field. This may be applicable to a downlink data transmission solution (for example, the AP transmits data to the STA in FIG. 1).

TABLE 10

| MCS Value | Meaning |
| --- | --- |
| 0-11 | Indicate MCS0 to MCS11 respectively |
| 12 | M = M1 |
| 13 | M = M2 |
| 14-15 | Reserved |

For example, Table 10 is an example of the foregoing indication method. When the MCS values are 0 to 11, the MCS values indicate corresponding MCS parameters. One or more values are randomly selected from the MCS values 12 to 15 to indicate M. For example, the MCS value 12 indicates M=M1, and the MCS value 13 indicates M=M2. A specific quantity of values in the MCS values 12 to 15 that are used to indicate M and a specific numerical value of M may be set according to a specific Doppler scenario or high-speed movement scenario, and this embodiment imposes no specific limitation thereon.

Optionally, in an example of the present invention, the insertion frequency of the middle preamble in the data field in the PPDU is implicitly indicated by using a parameter used to indicate an MCS in the MCS field. This may be applicable to a downlink data transmission solution (for example, the AP transmits data to the STA in FIG. 1).

TABLE 11

| MCS Value | Meaning |
| --- | --- |
| 0-11 | Indicate MCS0 to MCS11 respectively, and M = M1 |
| 12 | MCS0, M = M2 |
| 13 | MCS1, M = M2 |
| 14 | MCS2, M = M2 |
| 15 | MCS3, M = M2 |

For example, Table 11 is an example of the foregoing indication method. When the MCS values are 0 to 11, the MCS values indicate M=M1 while indicating corresponding MCS parameters. One or more values are randomly selected from the MCS values 12 to 15 to indicate M. For example, when the MCS value is 12, it indicates MCS0 and M=M2. When the MCS value is 13, it indicates MCS1 and M=M2. When the MCS value is 14, it indicates MCS2 and M=M2. When the MCS value is 15, it indicates MCS3 and M=M2. A specific quantity of values in the MCS values 12 to 15 that are used to indicate MCS0 to MCS11, M, and a specific numerical value of M may be set according to a specific Doppler scenario or high-speed movement scenario, and this embodiment imposes no specific limitation thereon.

It should be noted that the MCS field in the HE-SIG-A in the HE ER SU PPDU has only MCS0 to MCS2 used. One or more of the reserved values 3 to 15 of the MCS field may be used to indicate M. For details, refer to the foregoing descriptions of the HE SU PPDU. For brevity of description, details are not described herein again.

Optionally, in an example of the present invention, the insertion frequency of the middle preamble in the data field in the PPDU is indicated by using one or more of the reserved values of the SIGB MCS field. This may be applicable to a downlink data transmission solution (for example, the AP transmits data to the STA in FIG. 1).

TABLE 12

| SIGB MCS Value | Meaning |
| --- | --- |
| 0-5 | Indicate MCS0 to MCS5 respectively |
| 6 | M = M1 |
| 7 | M = M2 |

For example, Table 12 is an example of the foregoing indication method. The HE-SIG-A of the HE MU PPDU further includes SIGB MCS and SIGB DCM. SIG-B MCS has three bits, and may indicate eight cases. SIG-B MCS values 0 to 5 are used. SIG-B MCS values 6 and 7 are reserved values, and may be used to indicate M. The SIGB MCS values 0 to 5 indicate corresponding MCS parameters. One or two values are selected from the MCS values 6 and 7 to indicate M. For example, the SIGB MCS value 6 indicates M=M1. For example, the SIGB MCS value 7 indicates M=M2. A specific quantity of values in the SIGB MCS values 6 and 7 that are used to indicate M and a specific numerical value of M may be set according to a specific Doppler scenario or high-speed movement scenario, and this embodiment imposes no specific limitation thereon.

In this embodiment of the present invention, the information used to indicate the insertion frequency of the middle preamble in the data field in the PPDU may be added in one of the following fields: a combination of an MCS field and a DCM field in the HE-SIG-A (the HE SU PPDU or the HE ER SU PPDU), a combination of an MCS field and a DCM field in the HE-SIG-B (the HE MU SU PPDU), or a combination of a SIGB MCS field and a SIGB DCM field in the HE-SIG-A (the HE MU SU PPDU). In 802.11ax, the DCM field/the SIGB DCM field is applicable to only MCS0, MCS1, MCS3, and MCS4. Other MCS values or SIGB MCS values cannot be indicated simultaneously. An unsupported combination may be escaped to indicate M.

Optionally, in an example of the present invention, the insertion frequency of the middle preamble in the data field in the PPDU is indicated by using the combination of the MCS field and the DCM field. This may be applicable to a downlink data transmission solution (for example, the AP transmits data to the STA in FIG. 1).

TABLE 13

| MCS Value | DCM Value | Meaning |
| --- | --- | --- |
| 0, 1, 3, 4 | 0/1 | Indicate MCS0, MCS1, MCS3, and MCS4 respectively for which DCM is not used/used |
| 2, 5-11 | 0 | Indicate MCS2 and MCS5 to MCS11 for which DCM is not used |
| 2 | 1 | Indicate M = M1 |
| 5 | 1 | Indicate M = M2 |
| ... | ... | ... |
| 11 | 1 | Indicate M = M8 |
| Other | | Reserved |

For example, Table 13 is an example of the foregoing indication method. (MCS0, DCM0/MCS1, DCM0/MCS3, DCM0/MCS4, DCM0) indicate MCS0, MCS1, MCS3, and MCS4 for which dual carrier modulation is not used. (MCS0, DCM1/MCS1, DCM1/MCS3, DCM1/MCS4, DCM1) indicate MCS0, MCS1, MCS3, and MCS4 for which dual carrier modulation is used. (MCS2/MCS5 to MCS11, DCM0) indicate MC2 and MCS5 to MCS11 for which dual carrier modulation is not used. (MCS2, DCM1) indicates M=M1. (MCS5, DCM1) only indicates M=M2 (and does not indicate any other meaning than this). A specific quantity of values in combinations of MCS values and DCM values (MC2/MCS5 to MCS11, DCM1) that are used to indicate M and a specific numerical value of M may be set according to a specific Doppler scenario or high-speed movement scenario, and this embodiment imposes no specific limitation thereon.

Optionally, in an example of the present invention, the insertion frequency of the middle preamble in the data field in the PPDU is indicated by using the combination of the SIGB MCS field and the SIGB DCM field. This may be applicable to a downlink data transmission solution (for example, the AP transmits data to the STA in FIG. 1).

TABLE 14

| SIGB MCS Value | SIGB DCM Value | Meaning |
| --- | --- | --- |
| 0, 1, 3, 4 | 0/1 | Indicate MCS0, MCS1, MCS3, and MCS4 respectively for which DCM is not used/used |
| 2, 5-7 | 0 | Indicate MCS2 and MCS5 for which DCM is not used |
| 2, 5-7 | 1 | Indicate M |
| Other | | Reserved |

For example, Table 14 is an example of the foregoing indication method. (SIGB MCS0, SIGB DCM0/SIGB MCS1, SIGB DCM0/SIGB MCS3, SIGB DCM0/SIGB MCS4, SIGB DCM0) indicate SIGB MCS0, SIGB MCS1, SIGB MCS3, and SIGB MCS4 for which dual carrier modulation is not used. (SIGB MCS0, SIGB DCM1/SIGB MCS1, SIGB DCM1/SIGB MCS3, SIGB DCM1/SIGB MCS4, SIGB DCM1) indicates SIGB MCS0, SIGB MCS1, SIGB MCS3, and SIGB MCS4 for which dual carrier modulation is used. (SIGB MC2/SIGB MCS5 to SIGB MCS7, SIGB DCM0) indicate SIGB MC2 and SIGB MCS5 to SIGB MCS7 for which dual carrier modulation is not used. (SIGB MC2/SIGB MCS5 to SIGB MCS7, SIGB DCM0) indicate M. A specific quantity of values in combinations of SIGB MCS values and SIGB DCM values (SIGB MC2/SIGB MCS5 to SIGB MCS7, SIGB DCM1) that are used to indicate M and a specific numerical value of M may be set according to a specific Doppler scenario or high-speed movement scenario, and this embodiment imposes no specific limitation thereon.

In this embodiment of the present invention, the information used to indicate the insertion frequency of the middle preamble in the data field in the PPDU may be added in an NSTS field in the HE-SIG-B (the HE MU SU PPDU). The NSTS field includes three bits, and indicates one space time stream (STS) to eight STSs. For details, refer to Table 15.

TABLE 15

| NSTS | Corresponding Quantity of Space Time Streams |
| --- | --- |
| 0 | A quantity of space time streams is equal to 1. |
| 1 | A quantity of space time streams is equal to 2. |
| 2 | A quantity of space time streams is equal to 3. |
| 3 | A quantity of space time streams is equal to 4. |
| 4 | A quantity of space time streams is equal to 5. |
| 5 | A quantity of space time streams is equal to 6. |
| 6 | A quantity of space time streams is equal to 7. |
| 7 | A quantity of space time streams is equal to 8. |

Optionally, in an example of the present invention, the insertion frequency of the middle preamble in the data field in the PPDU is implicitly indicated by using a parameter used to indicate an NSTS in the NSTS field. This may be applicable to a downlink data transmission solution (for example, the AP transmits data to the STA in FIG. 1).

TABLE 16

| NSTS | Corresponding Quantity of Space Time Streams and M |
| --- | --- |
| 0 | A quantity of space time streams is equal to 1, and M = M1. |
| 1 | A quantity of space time streams is equal to 2, and M = M1. |
| 2 | A quantity of space time streams is equal to 1, and M = M2. |
| 3 | A quantity of space time streams is equal to 2, and M = M2. |
| 4 | A quantity of space time streams is equal to 1, and M = M3. |
| 5 | A quantity of space time streams is equal to 2, and M = M3. |
| 6 | A quantity of space time streams is equal to 1, and M = M4. |
| 7 | A quantity of space time streams is equal to 2, and M = M4. |

For example, Table 16 is an example of the foregoing indication method. The NSTS value 0 indicates that the quantity of space time streams is equal to 1 and M=M1. The NSTS value 1 indicates that the quantity of space time streams is equal to 2 and M=M1. The NSTS value 2 indicates that the quantity of space time streams is equal to 1 and M=M2. The NSTS value 3 indicates that the quantity of space time streams is equal to 1 and M=M2. The NSTS value 4 indicates that the quantity of space time streams is equal to 1 and M=M3. The NSTS value 5 indicates that the quantity of space time streams is equal to 3 and M=M3. The NSTS value 6 indicates that the quantity of space time streams is equal to 1 and M=M4. The NSTS value 7 indicates that the quantity of space time streams is equal to 2 and M=M4.

In the Doppler scenario or the high-speed movement scenario, a channel condition is relatively poor. Usually, the scenario is a light of sight scenario (LOS), and does not allow a relatively large quantity of space time streams. In this embodiment, the quantity of space time streams may be limited to 1 or 2, and four types of M are limited. In addition, a plurality of cases such as four quantities (1, 2, 3 or 4) of space time streams and two types of M (M1 or M2) may alternatively be set. The quantity of space time streams and M may be set according to a specific Doppler scenario or high-speed movement scenario. This is not specifically limited in this embodiment.

In this embodiment of the present invention, the information used to indicate the insertion frequency of the middle preamble in the data field in the PPDU may be added in a combination of an MCS field and an NSTS field. The combination of the MCS field and the NSTS field may be a function of an MCS value and an NSTS value. In addition, the MCS value and the NSTS value have an association mapping table. It should be noted that in this embodiment, an NSTS and an MCS respectively indicate a quantity of space time streams and a modulation and coding scheme used for the data part. In addition, a corresponding mapping relationship is used to implicitly indicate the insertion frequency of the middle preamble.

Optionally, in an example of the present invention, the insertion frequency of the middle preamble in the data field in the PPDU is indicated by using the combination of the MCS field and the NSTS field. This may be applicable to a downlink data transmission solution (for example, the AP transmits data to the STA in FIG. 1).

When data is downlink data (for example, the AP transmits data to the STA in FIG. 1) and the Doppler scenario or the high-speed movement scenario occurs, the Doppler field in the HE-SIG-A is set to 1 (that is, a transmission scenario of the PPDU is the Doppler scenario or the high-speed movement scenario). The function of the MCS value and the NSTS value is used to indicate the insertion frequency of the middle preamble. For example, a function of an MCS value and an NSTS value in the HE SU PPDU, the HE ER SU PPDU, or the HE MU SU PPDU is used to indicate the insertion frequency of the middle preamble in the corresponding data field.

TABLE 17

| NSTS | MCS | | | | | |
|---|---|---|---|---|---|---|
| | 0 | 1 | 2 | 3 | 4 | 5 |
| 0 | M1 | M1 | M1 | M1 | M2 | M2 |
| 1 | M1 | M1 | M1 | M2 | M2 | M2 |
| 2 | M1 | M1 | M2 | M2 | M2 | M2 |

For example, Table 17 is an example of a mapping table in the foregoing indication method. (NSTS0, MCS0) indicates M=M1, (NSTS0, MCS1) indicates M=M1, (NSTS0, MCS2) indicates M=M1, (NSTS0, MCS3) indicates M=M1, (NSTS0, MCS4) indicates M=M2, (NSTS0, MCS5) indicates M=M2, and so on. A specific function relationship between an MCS value and an NSTS value used to indicate M and a specific numerical value of M may be set according to a specific Doppler scenario or high-speed movement scenario, and this embodiment imposes no specific limitation thereon.

In this embodiment of the present invention, the information used to indicate the insertion frequency of the middle preamble in the data field in the PPDU may be added in an RU allocation field in the HE-SIG-B (the HE MU SU PPDU). The RU allocation field includes a plurality of reserved parts. For details, refer to Table 18.

TABLE 18

| 8-bit RU Allocation Indication | RU Distribution | Quantity of Entries |
|---|---|---|
| ... | | |
| 01110100-01110111 | Reserved value | 4 |
| 01111000-01111111 | Reserved value | 8 |
| ... | | |
| 11100000-11111111 | Reserved value | 32 |

Optionally, in an example of the present invention, the insertion frequency of the middle preamble in the data field in the PPDU is indicated by using a reserved value of the RU allocation field. This may be applicable to a downlink data transmission solution (for example, the AP transmits data to the STA in FIG. 1).

242) means that an entire bandwidth is divided into two resource blocks each having 242 subcarriers, and M=M1 is indicated. If the RU Allocation is 01111000, (242, 242) means that an entire bandwidth is divided into two resource blocks each having 242 subcarriers, and M=M2 is indicated.

According to the data transmission method provided in this embodiment of the present invention, the insertion frequency of the middle preamble in the data field is indicated by using a specified field in the preamble, so as to generate and send the PPDU. In this way, in different scenarios, the middle preamble may be inserted into the data field at different frequency, thereby reducing overheads of an inserted pilot and improving data transmission performance.

Figure 6:
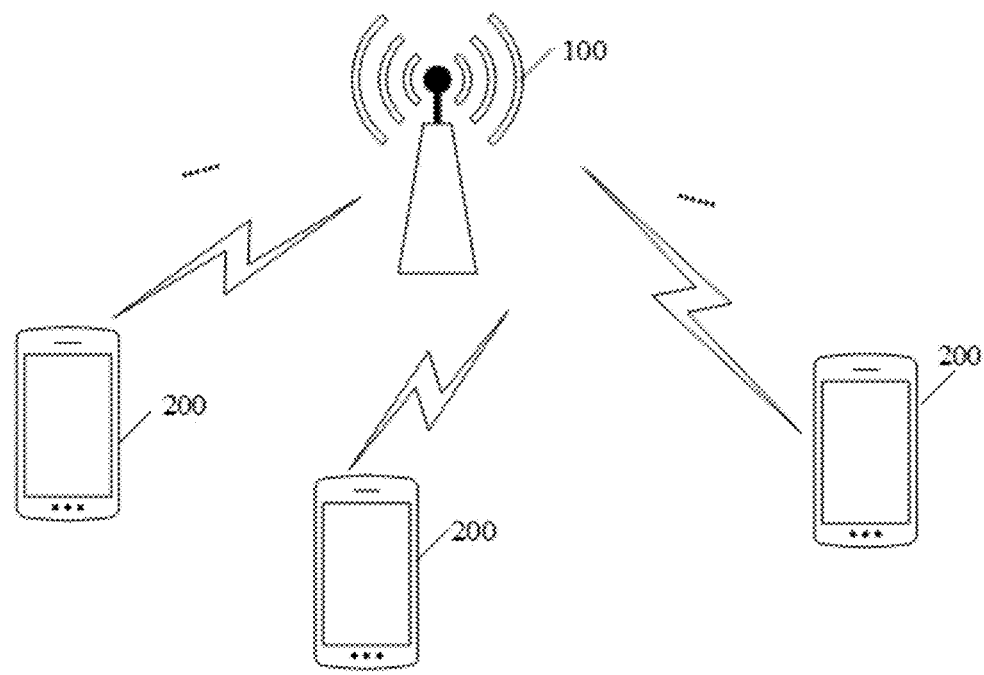
FIG. 6 is a schematic diagram of a communications system according to an embodiment of the present invention.

FIG. 6 is a schematic diagram of a communications system according to an embodiment of the present invention. The communications system may include at least one network device 100 (only one network device is shown) and one or more terminal devices 200 connected to the network device 100.

The network device 100 may be a device that can communicate with the terminal device 200. The network device 100 may be any device having a wireless transmission and receiving function. The network device 100 includes, but is not limited to, a base station (for example, a NodeB, an evolved NodeB, eNodeB, a base station in a fifth-generation (5G) communications system, a base station or a network device in a future communications system, or an access node, a wireless relay node, or a wireless backhaul node in a Wi-Fi system) or the like. Alternatively, the network device 100 may be a radio controller in a cloud radio access network (CRAN) scenario. Alternatively, the network device 100 may be a network device in a 5G network or a network device in a future evolved network, and may also be a wearable device, an in-vehicle device, or the like. Alternatively, the network device 100 may be a small cell, a transmission reference point (transmission reference point, TRP), or the like. Certainly, this application is not limited thereto.

The terminal device 200 is a device having a wireless transmission and receiving function. The terminal device 200 may be deployed on land, including an indoor or outdoor device, a handheld device, a wearable device, or an in-vehicle device, may be deployed at a water surface (for example, in a ship), or may be deployed in air (for example, on an airplane, in a balloon, or on a satellite). The terminal device may be a mobile phone, a tablet computer (Pad), a computer having a wireless transmission and receiving function, a virtual reality (VR) terminal device, an aug-

TABLE 19

| 8-bit RU Allocation Indication | RU Distribution | | | | | | | | M | Quantity of Entries |
|---|---|---|---|---|---|---|---|---|---|---|
| ... | | | | | | | | | | |
| 01110100 | | | 242 | | | | 242 | | M = M1 | 1 |
| 01110101 | | 242 | | 242 | | 242 | | 242 | M = M1 | 1 |
| 01110110 | 242 | 242 | 242 | 242 | 242 | 242 | 242 | 242 | M = M1 | 1 |
| 01110111 | | | | Reserved value | | | | | | 1 |
| 01111000 | | | 242 | | | | 242 | | M = M2 | 1 |
| 01111001 | | 242 | | 242 | | 242 | | 242 | M = M2 | 1 |
| 01111010 | 242 | 242 | 242 | 242 | 242 | 242 | 242 | 242 | M = M2 | 1 |
| 01111011-01111111 | | | | Reserved value | | | | | | 8 |
| ... | | | | | | | | | | |
| 11100000-11111111 | | | | Reserved value | | | | | | 32 |

For example, Table 19 is an example of the foregoing indication method. If the RU Allocation is 01110100, (242, mented reality (AR) terminal device, a wireless terminal related to industrial control, a wireless terminal related to self-driving, a wireless terminal related to remote medical, a wireless terminal related to a smart grid, a wireless terminal related to transportation safety, a wireless terminal related to a smart city, a wireless terminal related to a smart home, or the like. This embodiment of this application imposes no limitation on an application scenario. The terminal device sometimes may also be referred to as user equipment (UE), an access terminal device, a UE unit, a UE station, a mobile station, a mobile console, a remote station, a remote terminal device, a mobile device, a UE terminal device, a terminal device, a wireless communications device, a UE agent, a UE apparatus, or the like.

It should be noted that in this embodiment of the present invention, terms "system" and "network" may be used interchangeably. "A plurality of" refers to two or more. In view of this, "the plurality of" in this embodiment of the present invention may also be understood as "at least two". The term "and/or" describes an association relationship for describing associated objects and represents that three relationships may exist. For example, A and/or B may represent the following three cases: Only A exists, both A and B exist, and only B exists. In addition, the character "/" usually indicates an "or" relationship between the associated objects unless specified otherwise.

The foregoing describes the solutions provided in the embodiments of the present invention mainly from the perspective of interaction between the STA and the AP. It may be understood that to implement the foregoing functions, the STA/AP or the like includes corresponding hardware structures and/or software modules for implementing the various functions. A person of ordinary skill in the art should be easily aware that, with reference to the units and algorithm steps in the examples described in the embodiments disclosed in this specification, the present invention may be implemented by hardware or a combination of hardware and computer software. Whether a function is performed by hardware or computer software driving hardware depends on particular applications and design constraint conditions of the technical solutions. A person skilled in the art may use different methods to implement the described functions for each particular application, but it should not be considered that the implementation goes beyond the scope of the present invention.

In the embodiments of the present invention, functional unit division may be performed on the STA and the AP according to the examples of the foregoing method. For example, various functional units may be divided according to the corresponding functions, or two or more functions may be integrated into one processing unit. The integrated unit may be implemented in a form of hardware, or may be implemented in a form of a software functional unit. It should be noted that the unit division in the embodiments of the present invention is an example, and is merely logical function division. There may be another division manner in an actual implementation.

Figure 7:
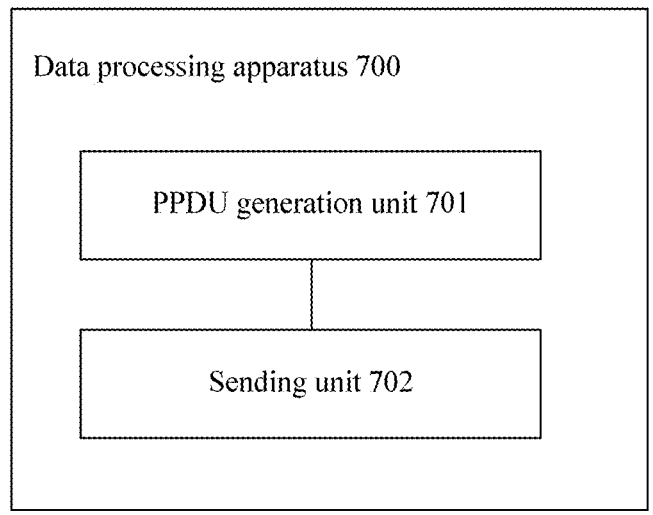
FIG. 7 is a structural diagram of a data processing apparatus according to an embodiment of the present invention.

When an integrated unit is used, FIG. 7 is a possible schematic structural diagram of a data processing apparatus in the foregoing embodiments. As shown in FIG. 7, a data processing apparatus 700 may include a PPDU generation unit 701 and a sending unit 702.

The PPDU generation unit 701 is configured to generate a physical layer protocol data unit PPDU. The PPDU includes a preamble field, a data field, and a middle preamble field, and the preamble in the PPDU includes information used to indicate an insertion frequency of the middle preamble in the data field in the PPDU. The sending unit 702 is configured to send the PPDU.

The data processing apparatus 700 in this embodiment has a function of the STA in FIG. 5, and may implement an action completed by the STA in FIG. 5, so as to achieve a technical effect of the corresponding data processing method. For details, refer to related descriptions of FIG. 5. For brevity of description, details are not described herein again.

Figure 8:
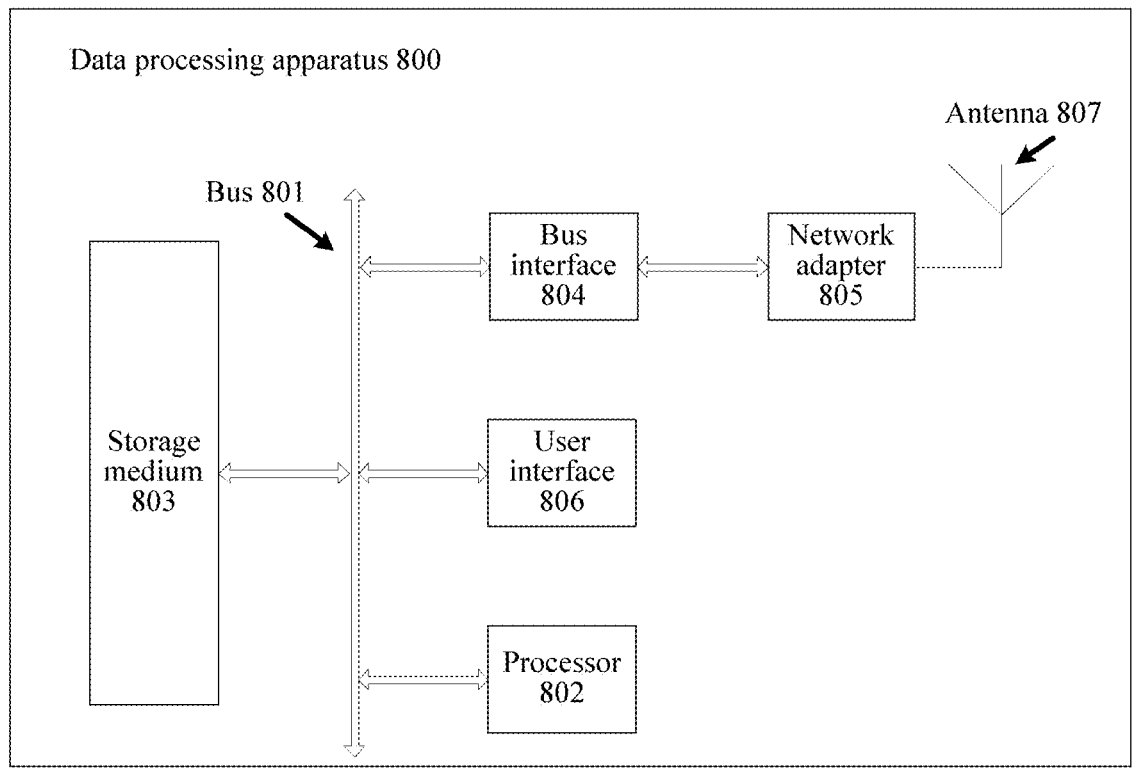
FIG. 8 is a structural diagram of hardware of a data processing apparatus according to an embodiment of the present invention.

FIG. 8 is a schematic structural diagram of a data processing apparatus (for example, a communications apparatus such as an access point, a base station, a station, or a terminal, or a chip in the foregoing communications apparatus) according to an implementation of the present invention. As shown in FIG. 8, a data processing apparatus 800 may be implemented by using a bus 801 as a general bus system structure. Depending on specific application and an overall design constraint condition of the data processing apparatus 800, the bus 801 may include any quantity of interconnection buses and bridges. The bus 801 connects various circuits together. The circuits include a processor 802, a storage medium 803, and a bus interface 804. Optionally, the data processing apparatus 800 connects a network adapter 8o5 and the like by using the bus interface 804 and the bus 801. The network adapter 805 may be configured to: implement a signal processing function of a physical layer in a wireless communications network, and send and receive a radio frequency signal by using an antenna 807. A user interface 806 may connect to a user terminal, such as a keyboard, a display, a mouse, or a joystick. The bus 801 may also connect other various circuits, such as a timing source, a peripheral device, a voltage regulator, or a power management circuit. The circuits are well-known in the art, and are not described in detail.

Alternatively, the data processing apparatus 800 may also be configured as a general-purpose processing system, for example, known as a chip. The general-purpose processing system includes one or more microprocessors providing a processor function and a peripheral memory providing at least a part of the storage medium 803. All the circuits are connected to other supporting circuits by using a peripheral bus system structure.

Alternatively, the data processing apparatus 800 may be implemented by an ASIC (application-specific integrated circuit) having the processor 802, the bus interface 804, and the user interface 806 and at least a part of the storage medium 803 that is integrated into a single chip. Alternatively, the data processing apparatus 800 may be implemented by one or more FPGAs (field programmable gate array), PLDs (programmable logic device), controllers, status machines, logic gates, discrete hardware components, any other suitable circuits, or any combination of circuits that can implement various functions described in the present invention.

The processor 802 is responsible for bus management and general processing (including executing software stored in the storage medium 803). The processor 802 may be implemented by one or more general-purpose processors and/or special-purpose processors. Examples of the processor include a microprocessor, a microcontroller, a DSP processor, and another circuit that can execute the software. Software shall be construed broadly to mean instructions, data, or any combination thereof, whether referred to as software, firmware, middleware, microcode, hardware description language, or otherwise.

In the following figure, the storage medium 803 is separate from the processor 802. However, a person skilled in the art will readily appreciate that the storage medium 803 or any part of the storage medium 803 may be located outside the data processing apparatus 800. For example, the storage medium 803 may include a transmission line, a carrier waveform modulated by using data, and/or a computer product separate from a wireless node. The media may be accessed by the processor 802 through the bus interface 804. Alternatively, the storage medium 803 or any part of the storage medium 803 may be integrated into the processor 802. For example, the storage medium 803 may be a cache and/or a general-purpose register.

The processor 802 may perform the following step: generating a physical layer protocol data unit PPDU. The PPDU includes a preamble field, a data field, and a middle preamble field, and the preamble in the PPDU includes information used to indicate an insertion frequency of the middle preamble in the data field in the PPDU.

The antenna 807 may perform the following step: sending the PPDU.

Alternatively, all or some of the procedures or functions may be implemented by using software, hardware, firmware, or any combination thereof. When software is used for implementation, all or some of the procedures or functions may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk, (SSD)), or the like.

Figure 9:
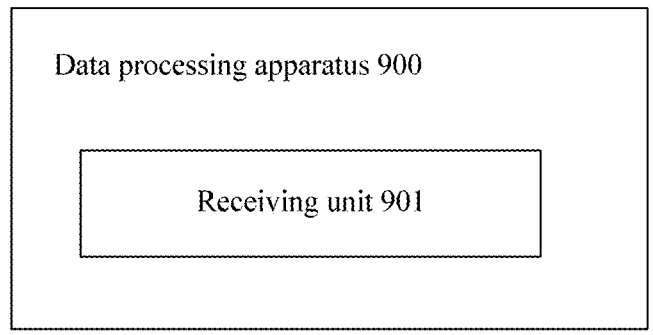
FIG. 9 is a structural diagram of another data processing apparatus according to an embodiment of the present invention.

When an integrated unit is used, FIG. 9 is a possible schematic structural diagram of a data processing apparatus in the foregoing embodiments. As shown in FIG. 9, a data processing apparatus 900 may include a receiving unit 901.

The receiving unit 901 is configured to receive a physical layer protocol data unit PPDU. The PPDU includes a preamble field, a data field, and a middle preamble field, and the preamble in the PPDU includes information used to indicate an insertion frequency of the middle preamble in the data field in the PPDU.

The data processing apparatus 900 in this embodiment has a function of the STA in FIG. 5, and may implement an action completed by the STA in FIG. 5, so as to achieve a technical effect of the corresponding data processing method. For details, refer to related descriptions of FIG. 5. For brevity of description, details are not described herein again.

Figure 10:
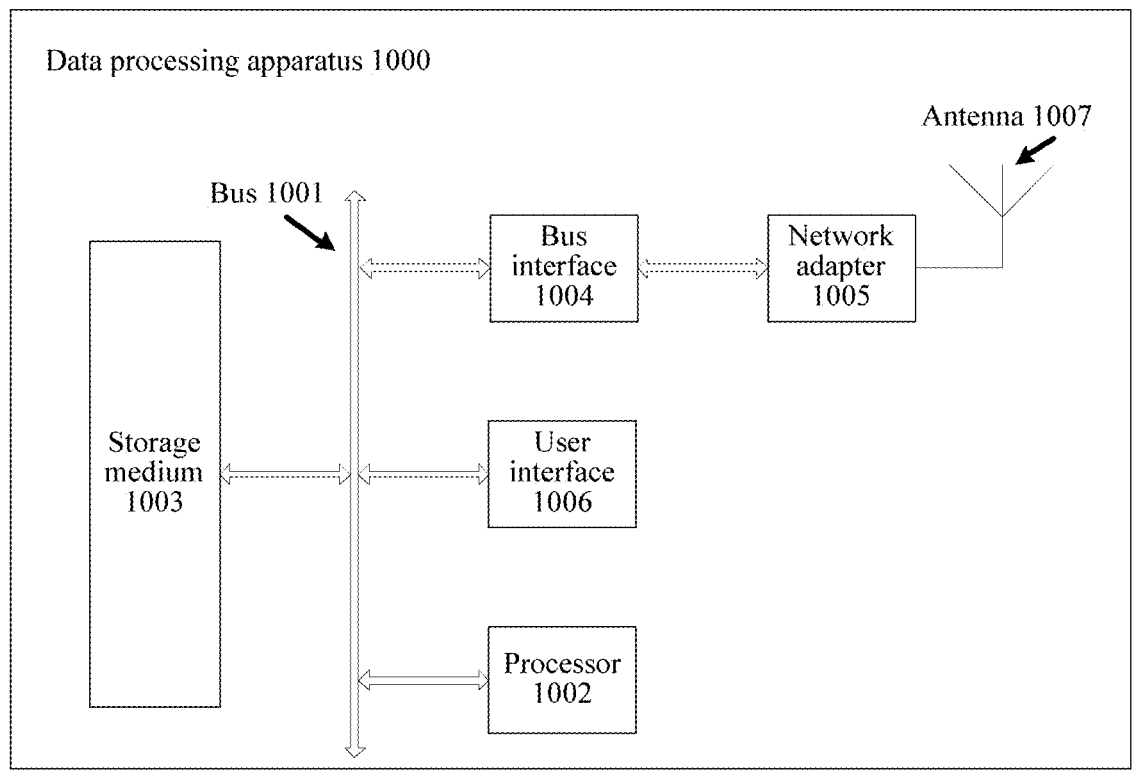
FIG. 10 is a structural diagram of hardware of another data processing apparatus according to an embodiment of the present invention.

FIG. 10 is a schematic structural diagram of a data processing apparatus (for example, a communications apparatus such as an access point, a base station, a station, or a terminal, or a chip in the foregoing communications apparatus) according to an implementation of the present invention. As shown in FIG. 10, a data processing apparatus moo may be implemented by using a bus 1001 as a general bus system structure. Depending on specific application and an overall design constraint condition of the data processing apparatus moo, the bus 1001 may include any quantity of interconnection buses and bridges. The bus 1001 connects various circuits together. The circuits include a processor 1002, a storage medium 1003, and a bus interface 1004. Optionally, the data processing apparatus 1000 connects a network adapter 1005 and the like by using the bus interface 1004 and the bus 1001. The network adapter 1005 may be configured to: implement a signal processing function of a physical layer in a wireless communications network, and send and receive a radio frequency signal by using an antenna 1007. A user interface 1006 may connect to a user terminal, such as a keyboard, a display, a mouse, or a joystick. The bus 1001 may also connect other various circuits, such as a timing source, a peripheral device, a voltage regulator, or a power management circuit. The circuits are well-known in the art, and are not described in detail.

Alternatively, the data processing apparatus 1000 may also be configured as a general-purpose processing system, for example, known as a chip. The general-purpose processing system includes one or more microprocessors providing a processor function and a peripheral memory providing at least a part of the storage medium 1003. All the circuits are connected to other supporting circuits by using a peripheral bus system structure.

Alternatively, the data processing apparatus 1000 may be implemented by an ASIC (application-specific integrated circuit) having the processor 1002, the bus interface 1004, and the user interface 1006 and at least a part of the storage medium 1003 that is integrated into a single chip. Alternatively, the data processing apparatus 1000 may be implemented by one or more FPGAs (field programmable gate array), PLDs (programmable logic device), controllers, status machines, logic gate, discrete hardware components, any other suitable circuits, or any combination of circuits that can implement various functions described in the present invention.

The processor 1002 is responsible for bus management and general processing (including executing software stored in the storage medium 1003). The processor 1002 may be implemented by one or more general-purpose processors and/or special-purpose processors. Examples of the processor include a microprocessor, a microcontroller, a DSP processor, and another circuit that can execute the software. Software shall be construed broadly to mean instructions, data, or any combination thereof, whether referred to as software, firmware, middleware, microcode, hardware description language, or otherwise.

In the following figure, the storage medium 1003 is separate from the processor 1002. However, a person skilled in the art will readily appreciate that the storage medium 1003 or any part of the storage medium 1003 may be located outside the data processing apparatus moo. For example, the storage medium 1003 may include a transmission line, a carrier waveform modulated by using data, and/or a computer product separate from a wireless node. The media may be accessed by the processor 1002 through the bus interface 1004. Alternatively, the storage medium 1003 or any part of the storage medium 1003 may be integrated into the processor 1002. For example, the storage medium 1003 may be a cache and/or a general-purpose register.

The antenna 1007 may perform the following step: receiving a physical layer protocol data unit PPDU. The PPDU includes a preamble field, a data field, and a middle preamble field, and the preamble in the PPDU includes information used to indicate an insertion frequency of the middle preamble in the data field in the PPDU.

Alternatively, all or some of the procedures or functions may be implemented by using software, hardware, firmware, or any combination thereof. When software is used for implementation, all or some of the procedures or functions may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk, (SSD)), or the like.

An embodiment of the present invention provides a data processing method. Transmission related to a PPDU in the method may be applicable to a Doppler scenario or a high-speed movement scenario (for example, the STA transmits data to the AP in FIG. 1) occurred during uplink multi-user data transmission. That is, a trigger frame is needed to trigger and instruct TB PPDU transmission.

Figure 11:
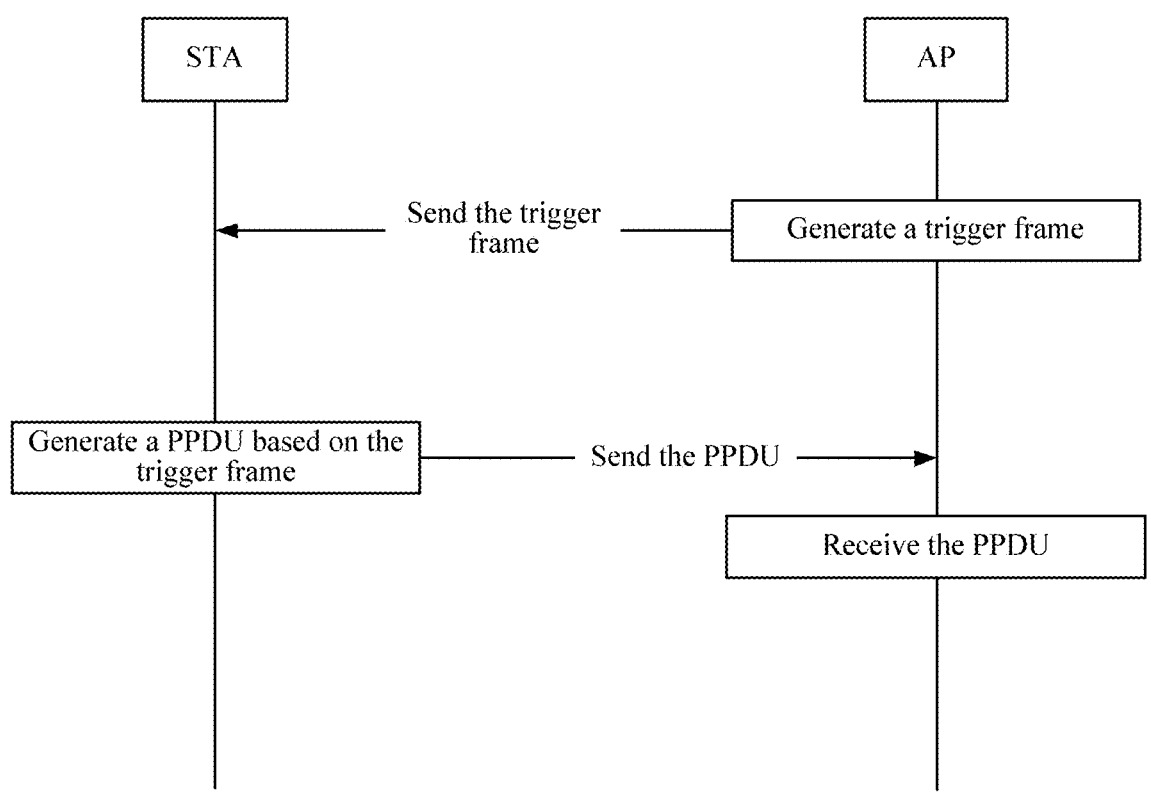
FIG. 11 is an interaction diagram of a data processing method according to an embodiment of the present invention.

FIG. 11 is an interaction diagram of the data processing method according to this embodiment of the present invention. The method is applicable to the Doppler scenario or the high-speed movement scenario. An AP generates a trigger frame. The trigger frame is used to instruct to generate and send a physical layer protocol data unit PPDU. The PPDU includes a data field and a middle preamble field, and the trigger frame includes information used to indicate an insertion frequency of the middle preamble in the data field in the PPDU. The AP sends the trigger frame to a STA. The AP receives the PPDU sent by the STA.

For a manner of generating the trigger frame by the AP, refer to the foregoing manner of generating the PPDU by the STA. That is, information indicating M is added to the trigger frame when the trigger frame is generated. Further, after receiving the trigger frame, the STA may generate the PPDU based on the information indicating M, and further send the PPDU to the AP.

In this embodiment, the information used to indicate the insertion frequency of the middle preamble in the data field in the PPDU may be added in one of the following fields: a Trigger Type field, a Doppler field, an HE-SIG-A field, a Trigger Dependent Common Info field, an MCS field, a combination of an MCS field and a DCM field, an RU allocation field, or an SS allocation field.

A core idea of this embodiment is setting the trigger frame as a trigger frame used in the Doppler scenario or the high-speed movement scenario. Therefore, the Trigger Type field or the Doppler field is mainly used to set a type of the trigger frame, and then another specified field is used to indicate M.

Figure 12:
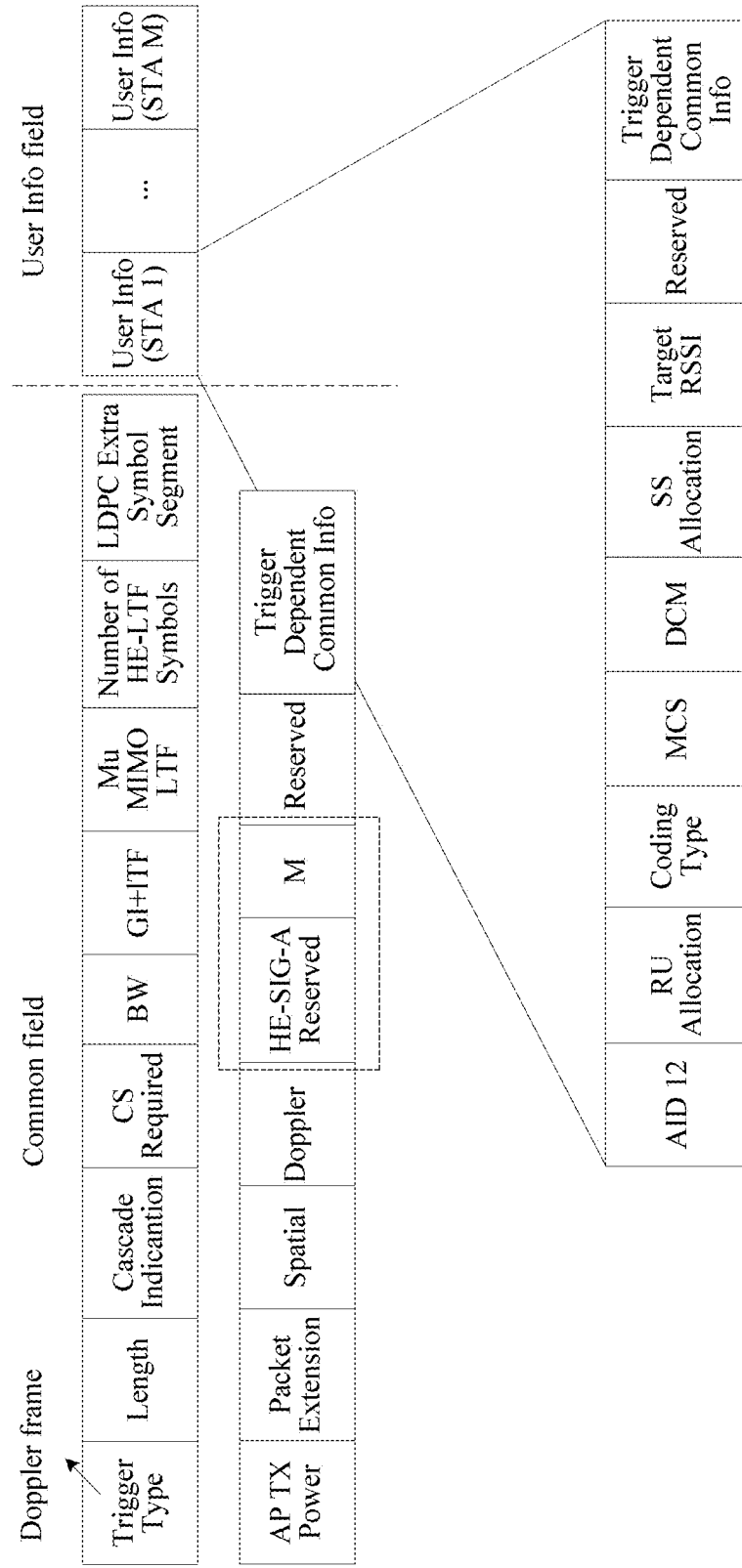
FIG. 12 is a schematic diagram of a first frame structure of a trigger frame according to an embodiment of the present invention.

Optionally, in an example of the present invention, referring to FIG. 12, one or more of reserved values of the Trigger Type field in the trigger frame are set to indicate that the trigger frame is a Doppler trigger frame (the Trigger Type field includes four bits, and may indicate 16 cases, where currently values 0 to 7 have been used, values 8 to 15 are reserved values, and any one or more of the values 8 to 15 may be set to indicate that the trigger frame is a Doppler trigger frame), and to indicate that the TB PPDU uses a midamble structure. The insertion frequency of the middle preamble in the data field in the TB PPDU is indicated by using one or more of reserved values of the HE-SIG-A field in a common field. For example, two bits 00 are used to indicate M=M1, 01 are used to indicate M=M2, 10 are used to indicate M=M3, and 11 are used to indicate M=M4.

For another example, two bits 00 are used to indicate M=M1, 01 are used to indicate M=M2, 10 are used to indicate M=M3, and 11 are used to indicate that no midamble is inserted. In a default state, a bit in the Reserved field in the HE-SIG-A is set to 1. Therefore, if all bits are set to 1, it indicates a default state. That is, no midamble is inserted.

Figure 13:
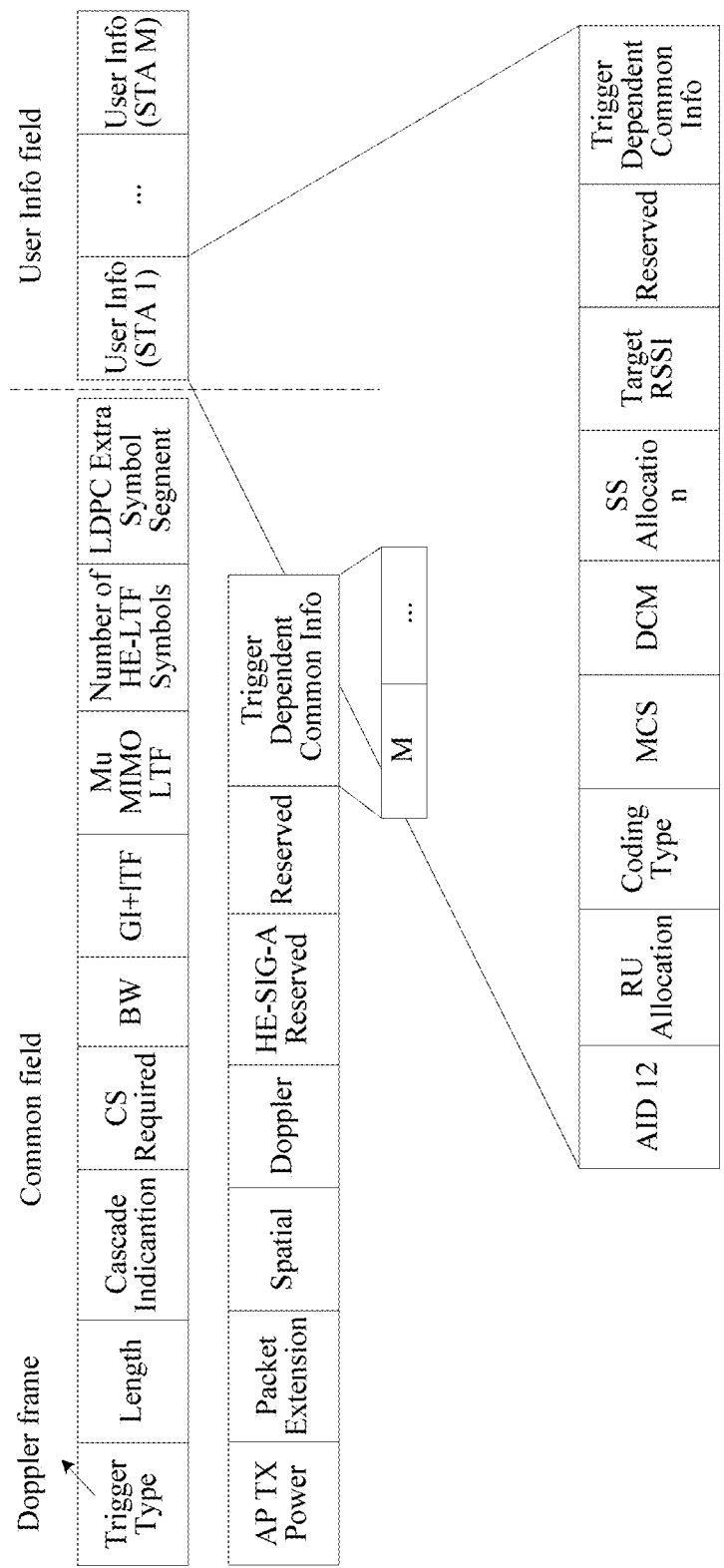
FIG. 13 is a schematic diagram of a second frame structure of a trigger frame according to an embodiment of the present invention.

Optionally, in an example of the present invention, referring to FIG. 13, one or more of reserved values of the Trigger Type field in the trigger frame are set to indicate that the trigger frame is a Doppler trigger frame, a midamble frequency indication field is added to the Trigger Dependent Common Info field in the trigger frame in a common field, and the insertion frequency of the middle preamble in the data field in the TB PPDU is indicated by using the midamble frequency indication field. Similarly, the midamble frequency indication field may be added to a Trigger Dependent User Info field in a User Info field, to indicate the insertion frequency of the middle preamble in the data field in the TB PPDU. The foregoing two manners are similar. For brevity of description, details are not described herein again.

Figure 14:
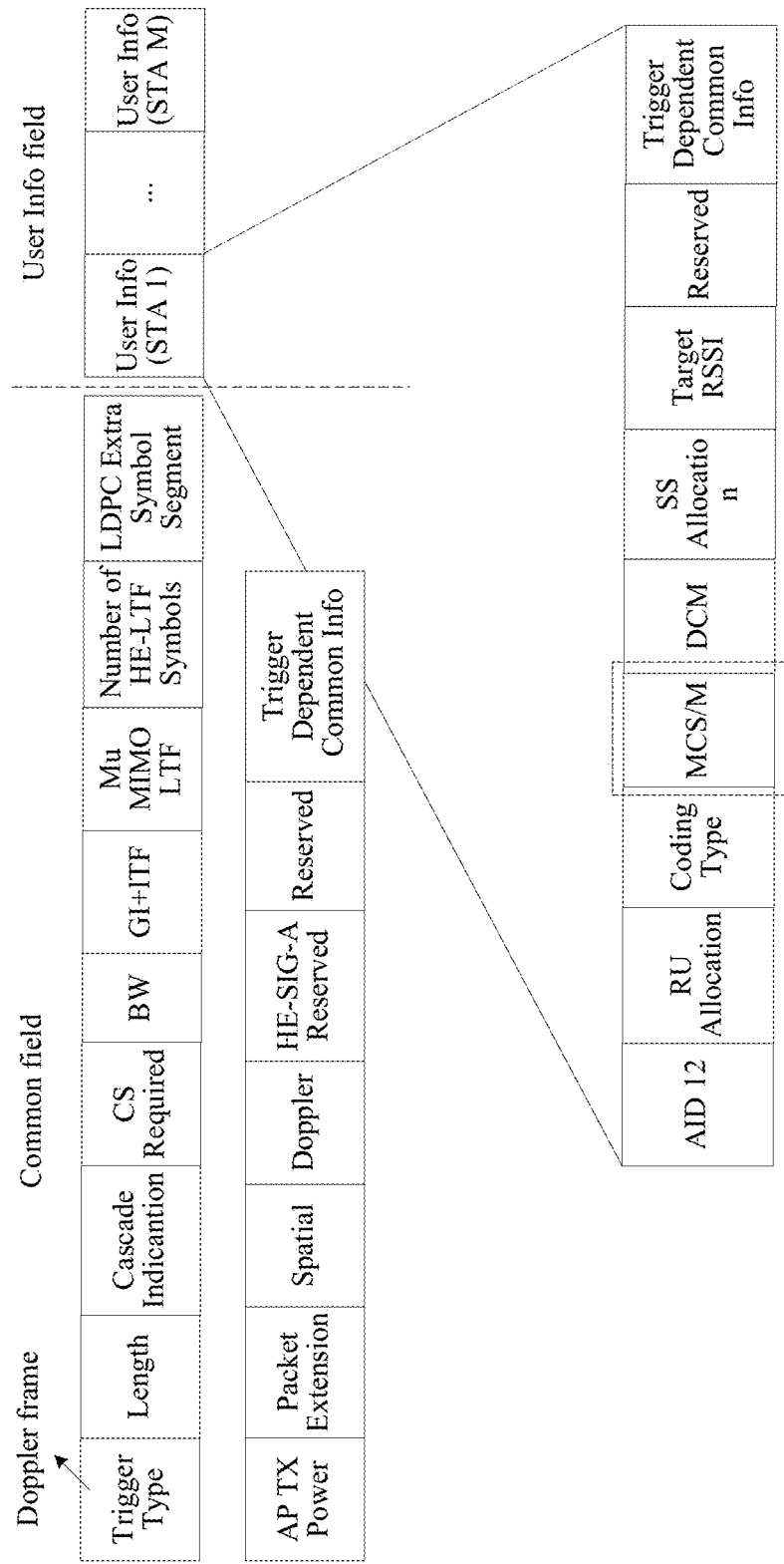
FIG. 14 is a schematic diagram of a third frame structure of a trigger frame according to an embodiment of the present invention.

Optionally, in an example of the present invention, referring to FIG. 14, one or more of reserved values of the Trigger Type field in the trigger frame are set to indicate that the trigger frame is a Doppler trigger frame, and the insertion frequency of the middle preamble in the data field in the TB PPDU is indicated by using one or more of reserved values of the MCS field. For details, refer to related descriptions of Table 10, and details are not described herein again.

Figure 15:
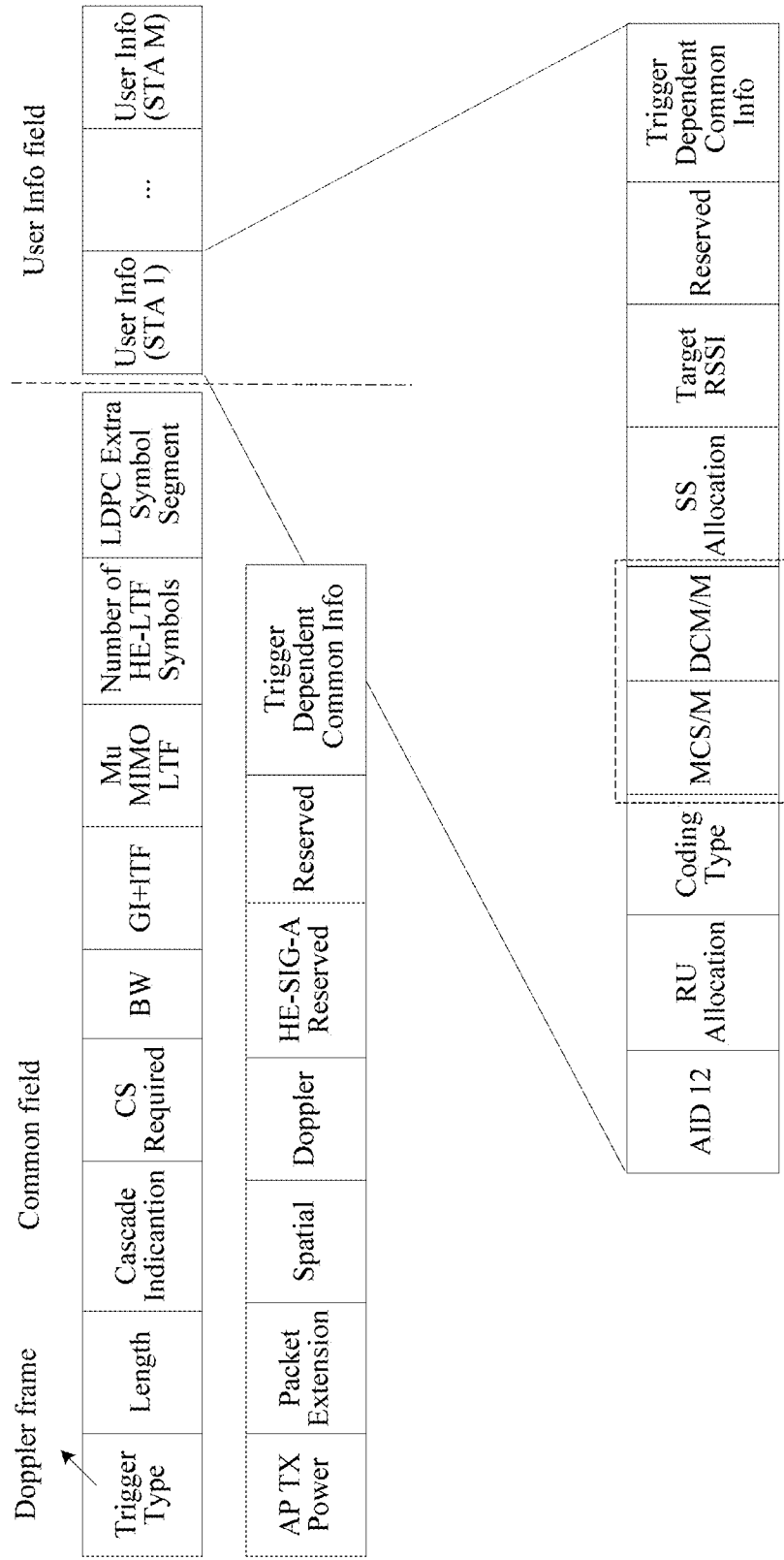
FIG. 15 is a schematic diagram of a fourth frame structure of a trigger frame according to an embodiment of the present invention.

Optionally, in an example of the present invention, referring to FIG. 15, one or more of reserved values of the Trigger Type field in the trigger frame are set to indicate that the trigger frame is a Doppler trigger frame, and the insertion frequency of the middle preamble in the data field in the TB PPDU is indicated by using the combination of the MCS field and the DCM field. For details, refer to related descriptions of Table 13, and details are not described herein again.

Figure 16:
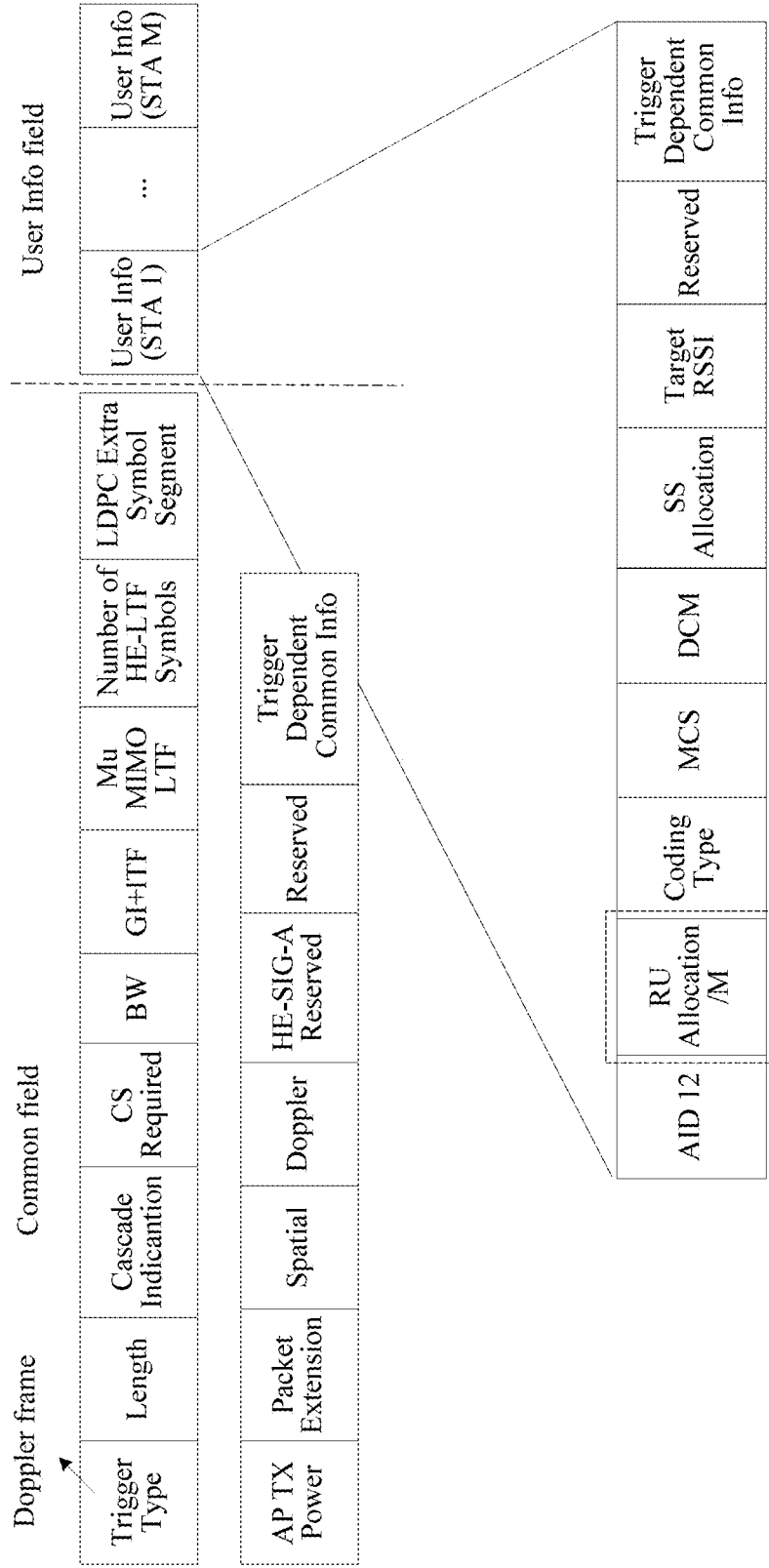
FIG. 16 is a schematic diagram of a fifth frame structure of a trigger frame according to an embodiment of the present invention.

Optionally, in an example of the present invention, referring to FIG. 16, one or more of reserved values of the Trigger Type field in the trigger frame are set to indicate that the trigger frame is a Doppler trigger frame, and the insertion frequency of the middle preamble in the data field in the TB PPDU is indicated by using a reserved value of the RU allocation field. For details, refer to related descriptions of Table 19, and details are not described herein again.

Figure 17:
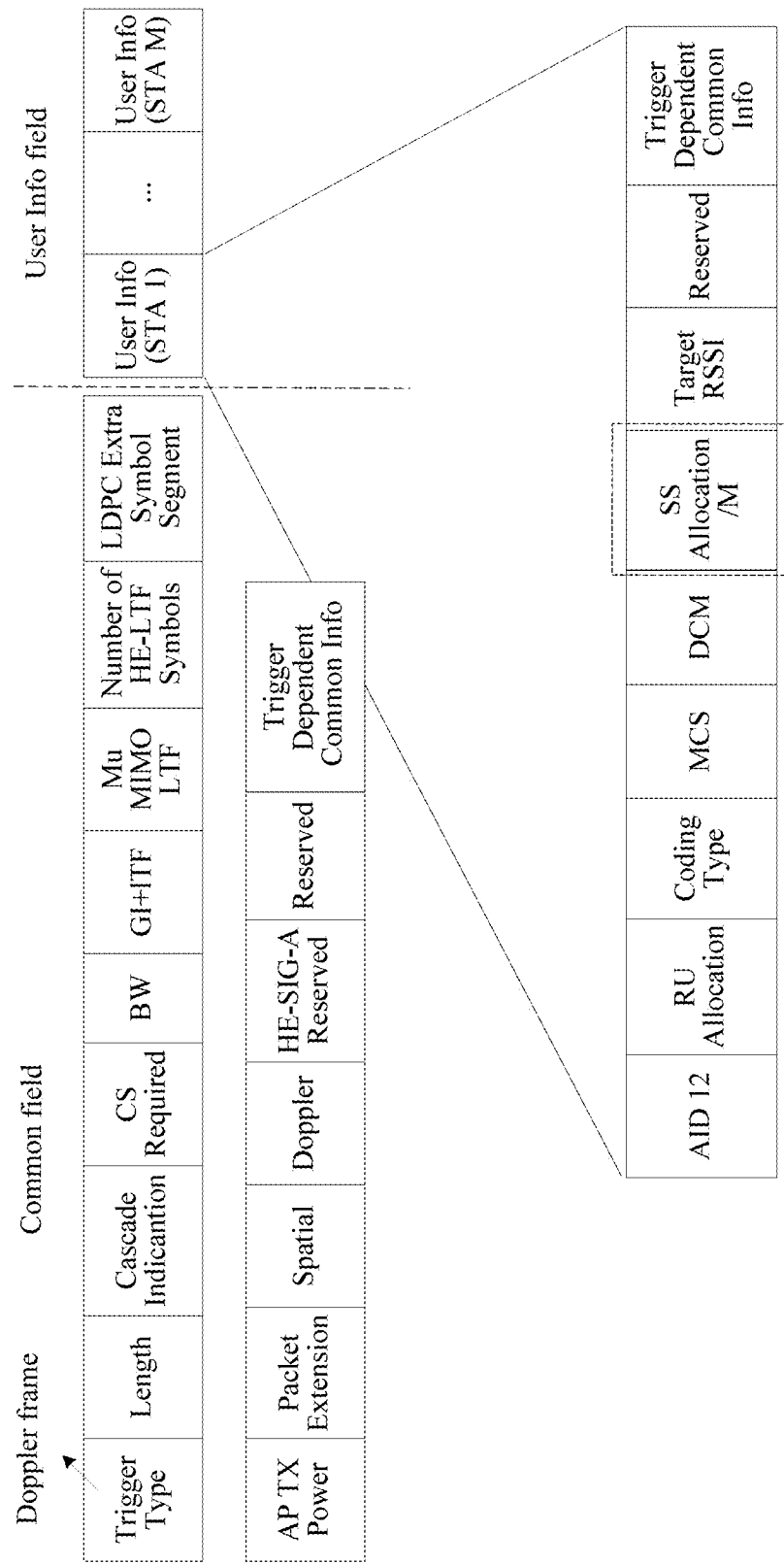
FIG. 17 is a schematic diagram of a sixth frame structure of a trigger frame according to an embodiment of the present invention.

Optionally, in an example of the present invention, referring to FIG. 17, one or more of reserved values of the Trigger Type field in the trigger frame are set to indicate that the trigger frame is a Doppler trigger frame, and the insertion frequency of the middle preamble in the data field in the TB PPDU is implicitly indicated by using a parameter used to indicate an SS in the SS allocation field. The SS allocation field has three bits, and indicates 8 SSs. For details, refer to Table 20.

TABLE 20

| Number of SS | Corresponding Quantity of Space Time Streams |
| --- | --- |
| 0 | A quantity of space time streams is equal to 1. |
| 1 | A quantity of space time streams is equal to 2. |
| 2 | A quantity of space time streams is equal to 3. |
| 3 | A quantity of space time streams is equal to 4. |
| 4 | A quantity of space time streams is equal to 5. |
| 5 | A quantity of space time streams is equal to 6. |
| 6 | A quantity of space time streams is equal to 7. |
| 7 | A quantity of space time streams is equal to 8. |

Table 20 shows indication parameters and indicated meanings of the SS allocation field. An SS value in the SS allocation field is used to indicate a quantity of space time streams. A function of the SS allocation field is similar to a function of the NSTS field (Table 15), and both are used to indicate a quantity of space time streams in a standard. In this embodiment of the present invention, the SS allocation field is escaped to indicate the insertion frequency of the middle preamble. This is similar to the NSTS field. The SS value indicates the insertion frequency of the middle preamble while indicating the quantity of space time streams. For details, refer to Table 21.

TABLE 21

| Number of SS | Corresponding Quantity of Space Time Streams and M |
| --- | --- |
| 0 | A quantity of space time streams is equal to 1, and M = M1. |
| 1 | A quantity of space time streams is equal to 2, and M = M1. |
| 2 | A quantity of space time streams is equal to 1, and M = M2. |
| 3 | A quantity of space time streams is equal to 2, and M = M2. |
| 4 | A quantity of space time streams is equal to 1, and M = M3. |
| 5 | A quantity of space time streams is equal to 2, and M = M3. |
| 6 | A quantity of space time streams is equal to 1, and M = M4. |
| 7 | A quantity of space time streams is equal to 2, and M = M4. |

For example, Table 21 is an example of the foregoing indication method. The SS value 0 indicates that the quantity of space time streams is equal to 1 and M=M1. The SS value 1 indicates that the quantity of space time streams is equal to 2 and M=M1. The SS value 2 indicates that the quantity of space time streams is equal to 1 and M=M2. The SS value 3 indicates that the quantity of space time streams is equal to 1 and M=M2. The SS value 4 indicates that the quantity of space time streams is equal to 1 and M=M3. The SS value 5 indicates that the quantity of space time streams is equal to$_3$ and M=M3. The SS value 6 indicates that the quantity of space time streams is equal to 1 and M=M4. The SS value 7 indicates that the quantity of space time streams is equal to 2 and M=M4.

In the Doppler scenario or the high-speed scenario, a channel condition is relatively poor. Usually, the scenario is a light of sight scenario (LOS), and does not allow a relatively large quantity of space time streams. In this embodiment, the quantity of space time streams may be limited to 1 or 2, and four types of M are limited. In addition, a plurality of cases such as two quantities (1 or 2) of space time streams and two types of M (M1 or M2) may alternatively be set. The quantity of space time streams and M may be set based on a specific Doppler scenario or high-speed movement scenario. This is not specifically limited in this embodiment.

Optionally, in an example of the present invention, one or more of reserved values of the Trigger Type field in the trigger frame are set to indicate that the trigger frame is a Doppler trigger frame, and the insertion frequency of the middle preamble in the data field in the TB PPDU is implicitly indicated by using a parameter used to indicate an SS in the combination of the SS allocation field and the MCS field. The SS allocation field and the NSTS field are substantially the same. For details, refer to related descriptions of Table 17, and details are not described herein again.

Figure 18:
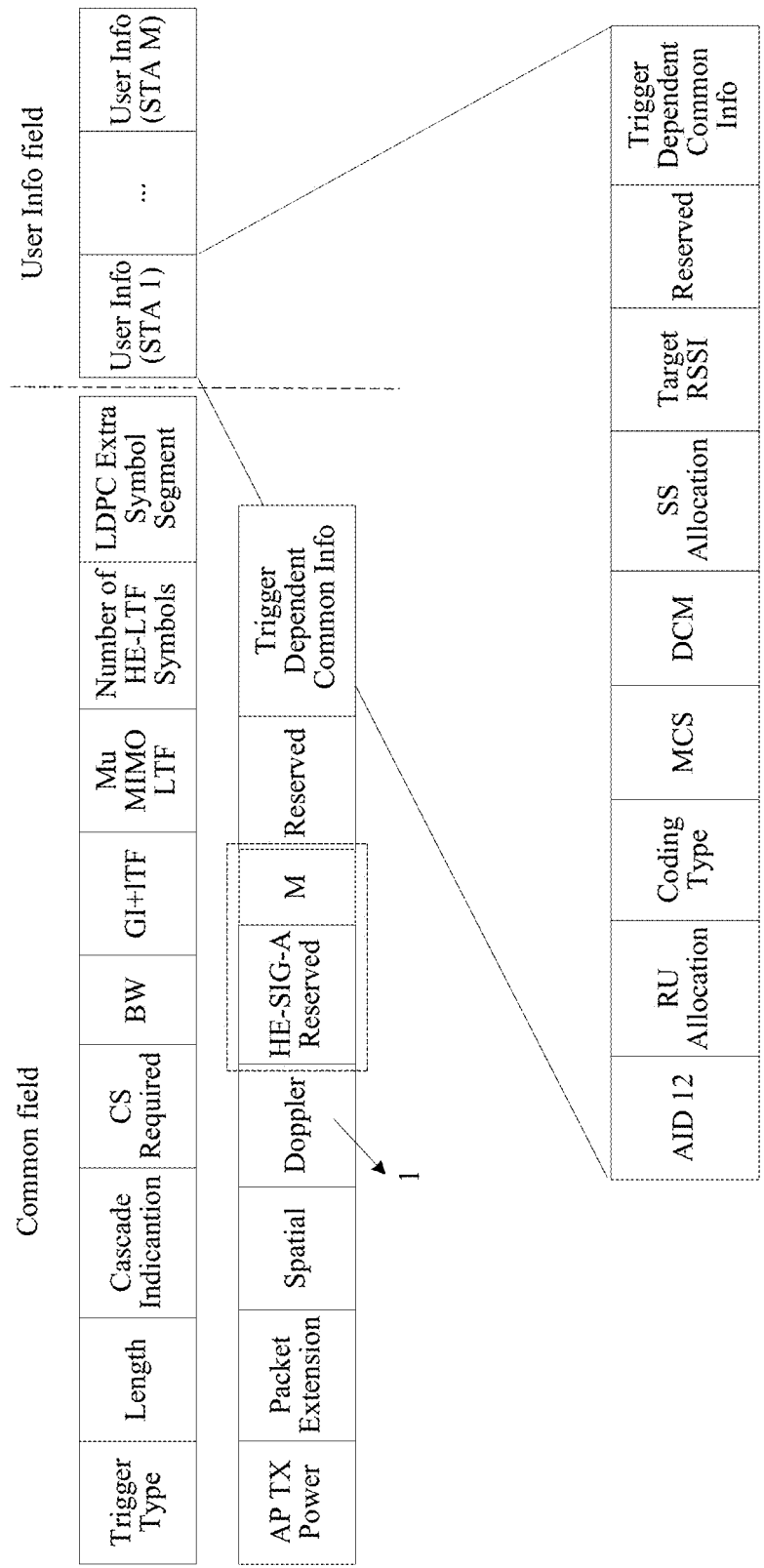
FIG. 18 is a schematic diagram of a seventh frame structure of a trigger frame according to an embodiment of the present invention.

Optionally, in an example of the present invention, referring to FIG. 18, the Doppler field in the trigger frame is set to 1 to indicate that the TB PPDU uses a midamble structure, and the insertion frequency of the middle preamble in the data field in the TB PPDU is indicated by using one or more of reserved values of the HE-SIG-A field in a common field. For example, two bits 00 are used to indicate M=M1, 01 are used to indicate M=M2, 10 are used to indicate M=M3, and 11 are used to indicate M=M4 (or ii are used to indicate that no midamble is inserted).

Figure 19:
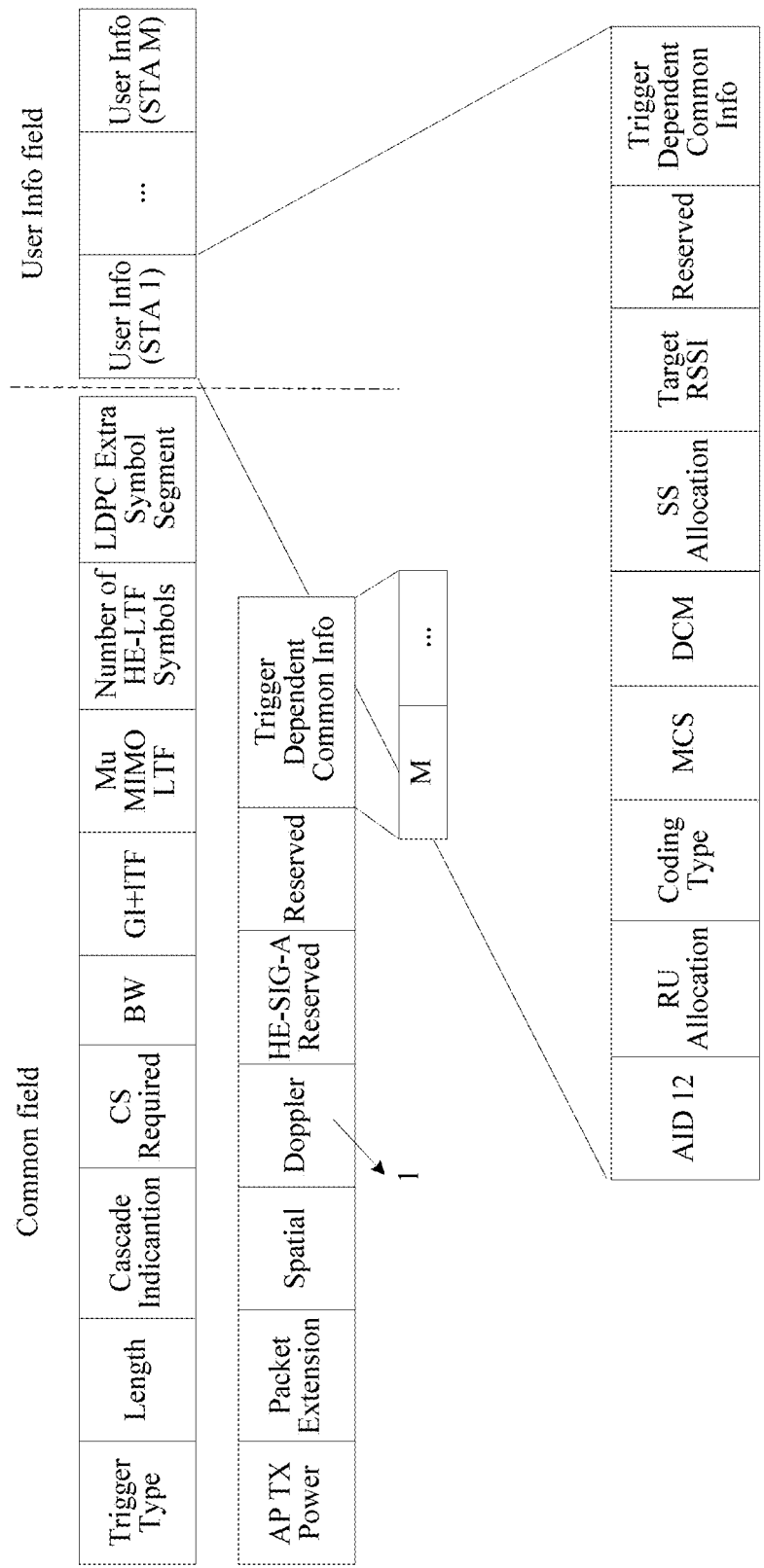
FIG. 19 is a schematic diagram of an eighth frame structure of a trigger frame according to an embodiment of the present invention.

Optionally, in an example of the present invention, referring to FIG. 19, the Doppler field in the trigger frame is set to 1, a midamble frequency indication field is added to the Trigger Dependent Common Info field in the trigger frame in a common field, and the insertion frequency of the middle preamble is indicated by using the midamble frequency indication field.

Figure 20:
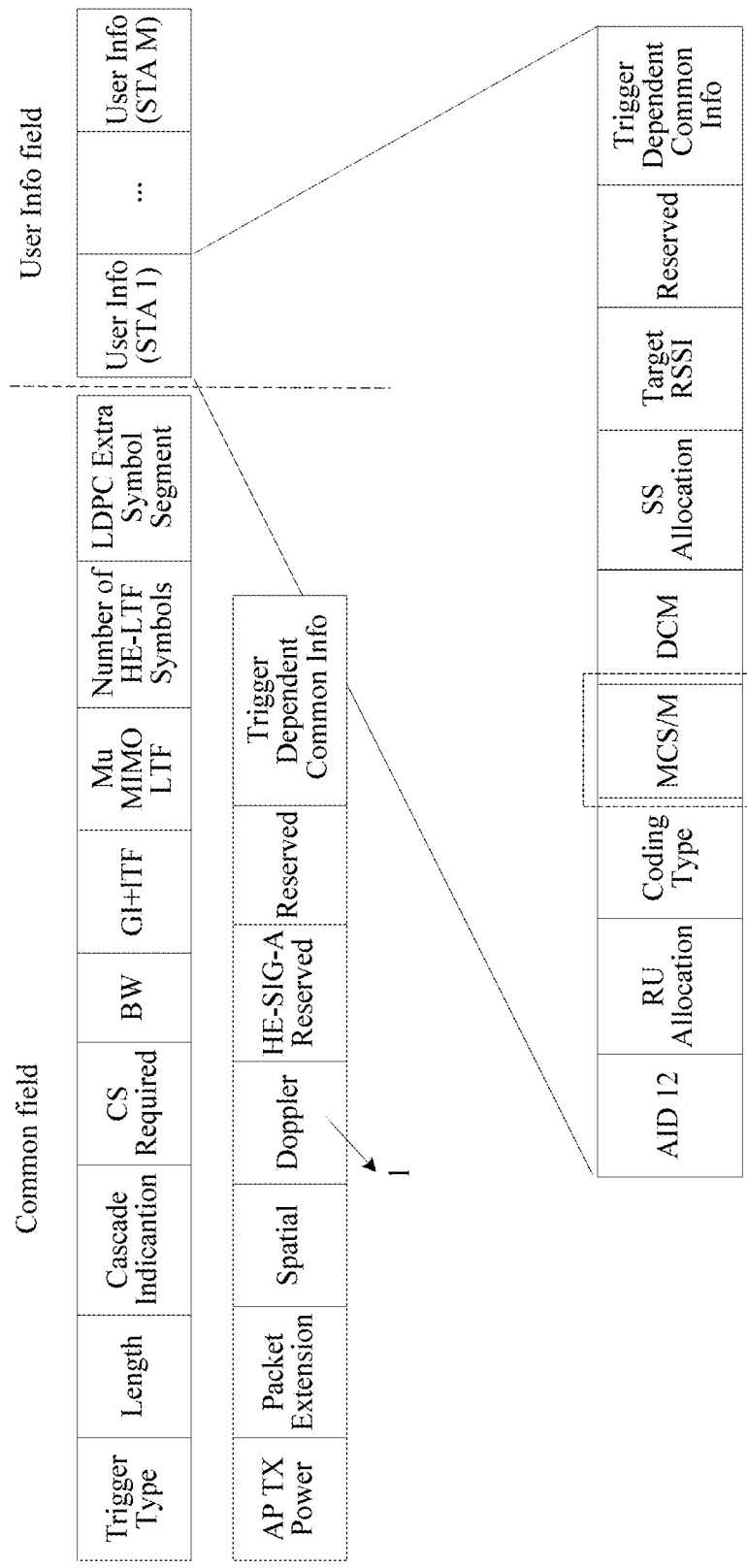
FIG. 20 is a schematic diagram of a ninth frame structure of a trigger frame according to an embodiment of the present invention.

Optionally, in an example of the present invention, referring to FIG. 20, the Doppler field in the trigger frame is set to 1, and the insertion frequency of the middle preamble in the data field in the TB PPDU is indicated by using one or more of reserved values of the MCS field. For details, refer to related descriptions of Table 10, and details are not described herein again.

Figure 21:
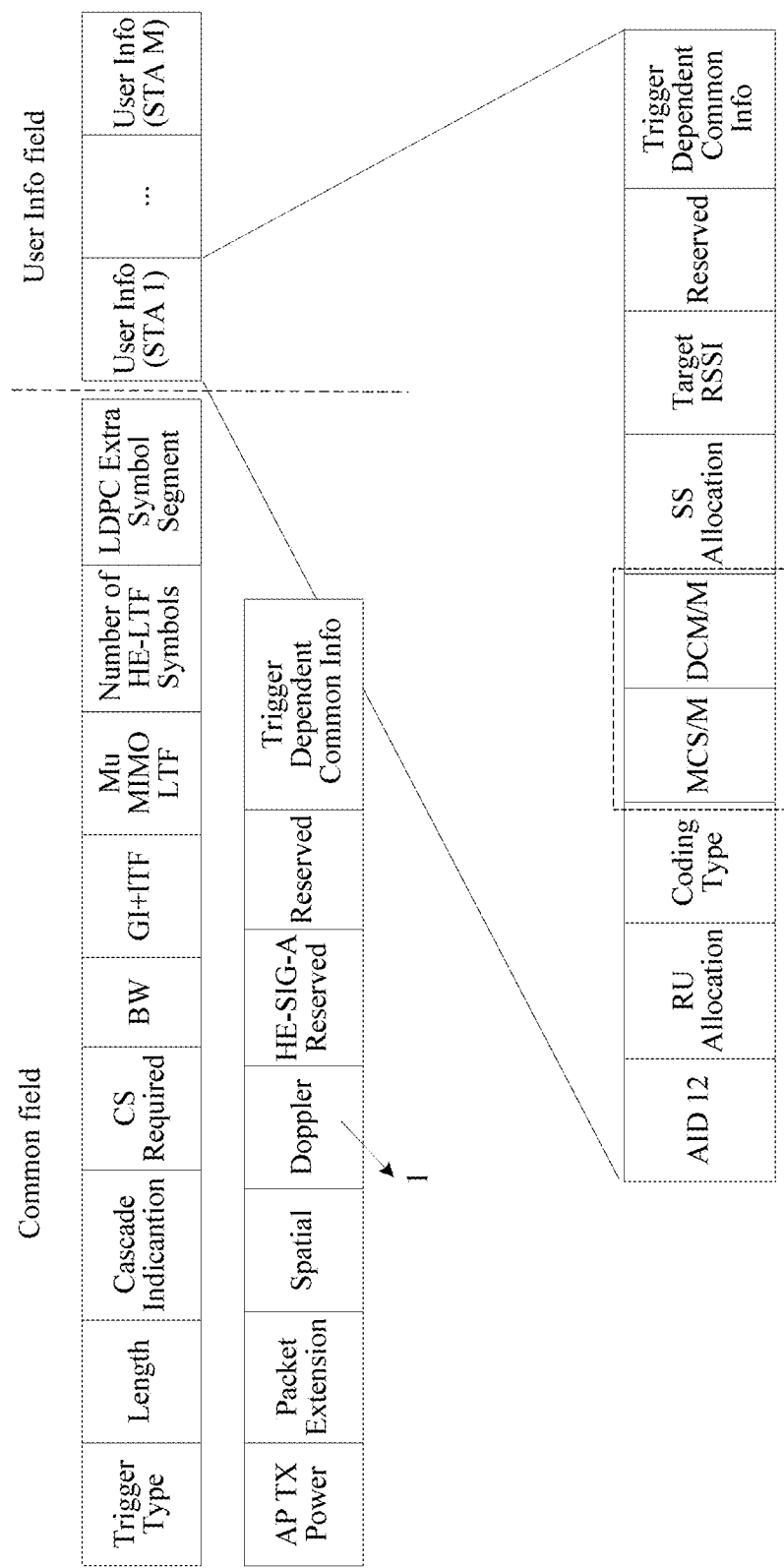
FIG. 21 is a schematic diagram of a tenth frame structure of a trigger frame according to an embodiment of the present invention.

Optionally, in an example of the present invention, referring to FIG. 21, the Doppler field in the trigger frame is set to 1, and the insertion frequency of the middle preamble in the data field in the TB PPDU is indicated by using the combination of the MCS field and the DCM field. For details, refer to related descriptions of Table 13, and details are not described herein again.

Figure 22:
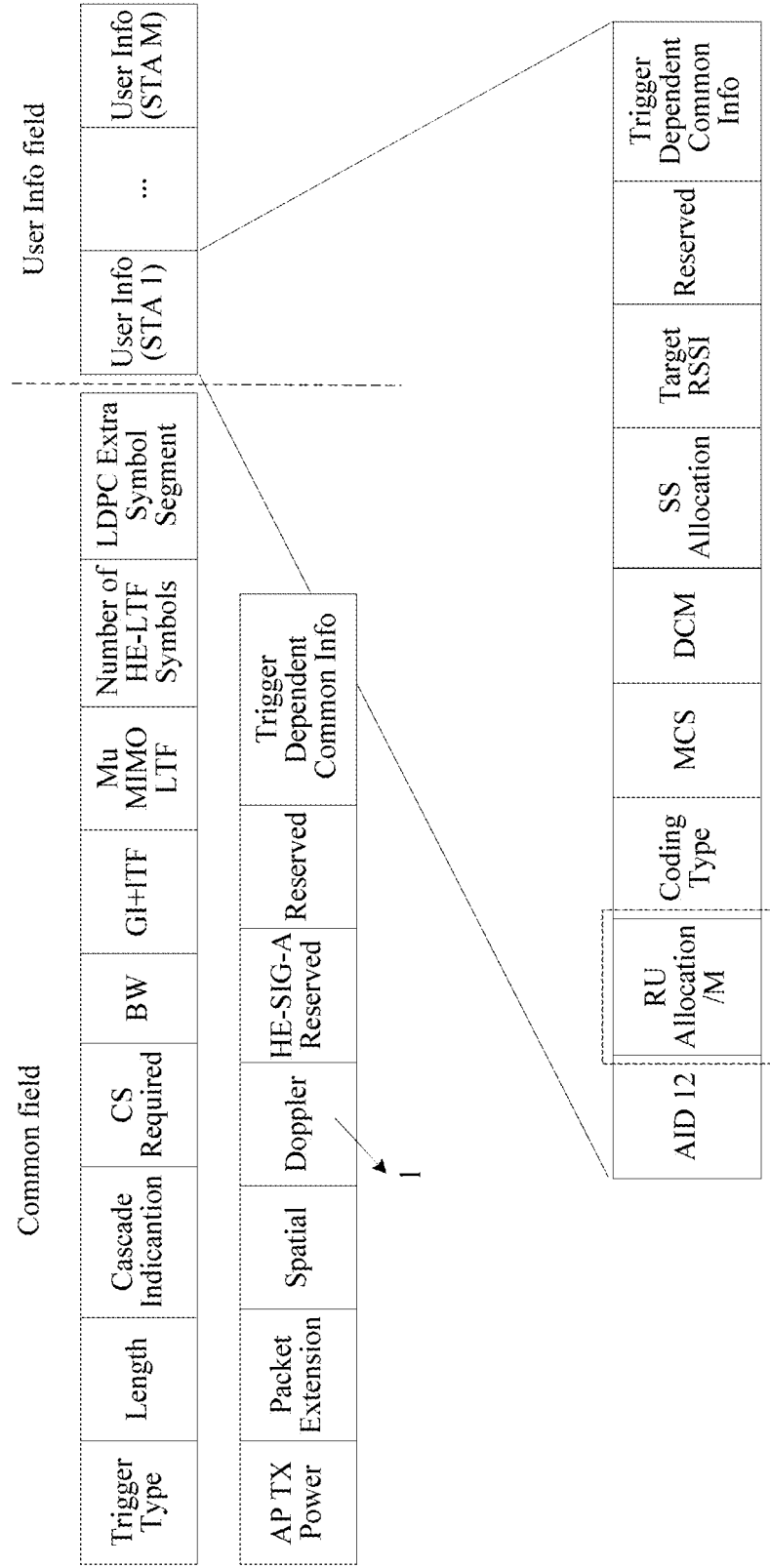
FIG. 22 is a schematic diagram of an eleventh frame structure of a trigger frame according to an embodiment of the present invention.

Optionally, in an example of the present invention, referring to FIG. 22, the Doppler field in the trigger frame is set to 1, and the insertion frequency of the middle preamble in the data field in the TB PPDU is indicated by using a reserved value of the RU allocation field. For details, refer to related descriptions of Table 19, and details are not described herein again.

Figure 23:
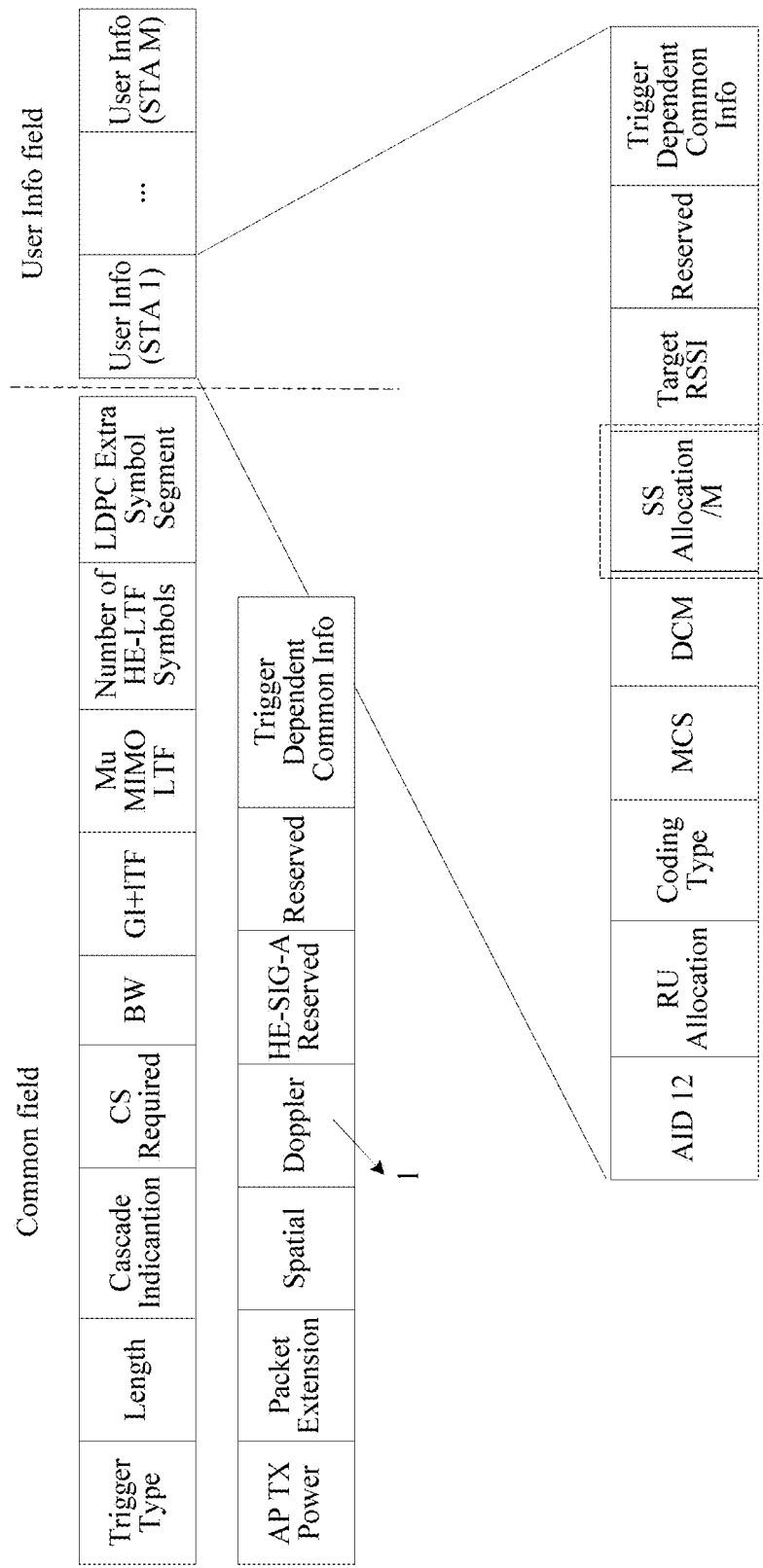
FIG. 23 is a schematic diagram of a twelfth frame structure of a trigger frame according to an embodiment of the present invention.

Optionally, in an example of the present invention, referring to FIG. 23, the Doppler field in the trigger frame is set to 1, and the insertion frequency of the middle preamble in the data field in the TB PPDU is implicitly indicated by using a parameter used to indicate an SS in the SS allocation field. For details, refer to related descriptions of Table 21, and details are not described herein again.

Optionally, in an example of the present invention, the Doppler field in the trigger frame is set to 1, and the insertion frequency of the middle preamble in the data field in the TB PPDU is implicitly indicated by using a parameter used to indicate an SS in the combination of the SS allocation field and the MCS field. The SS allocation field and the NSTS field are substantially the same. For details, refer to related descriptions of Table 17, and details are not described herein again.

Figure 24:
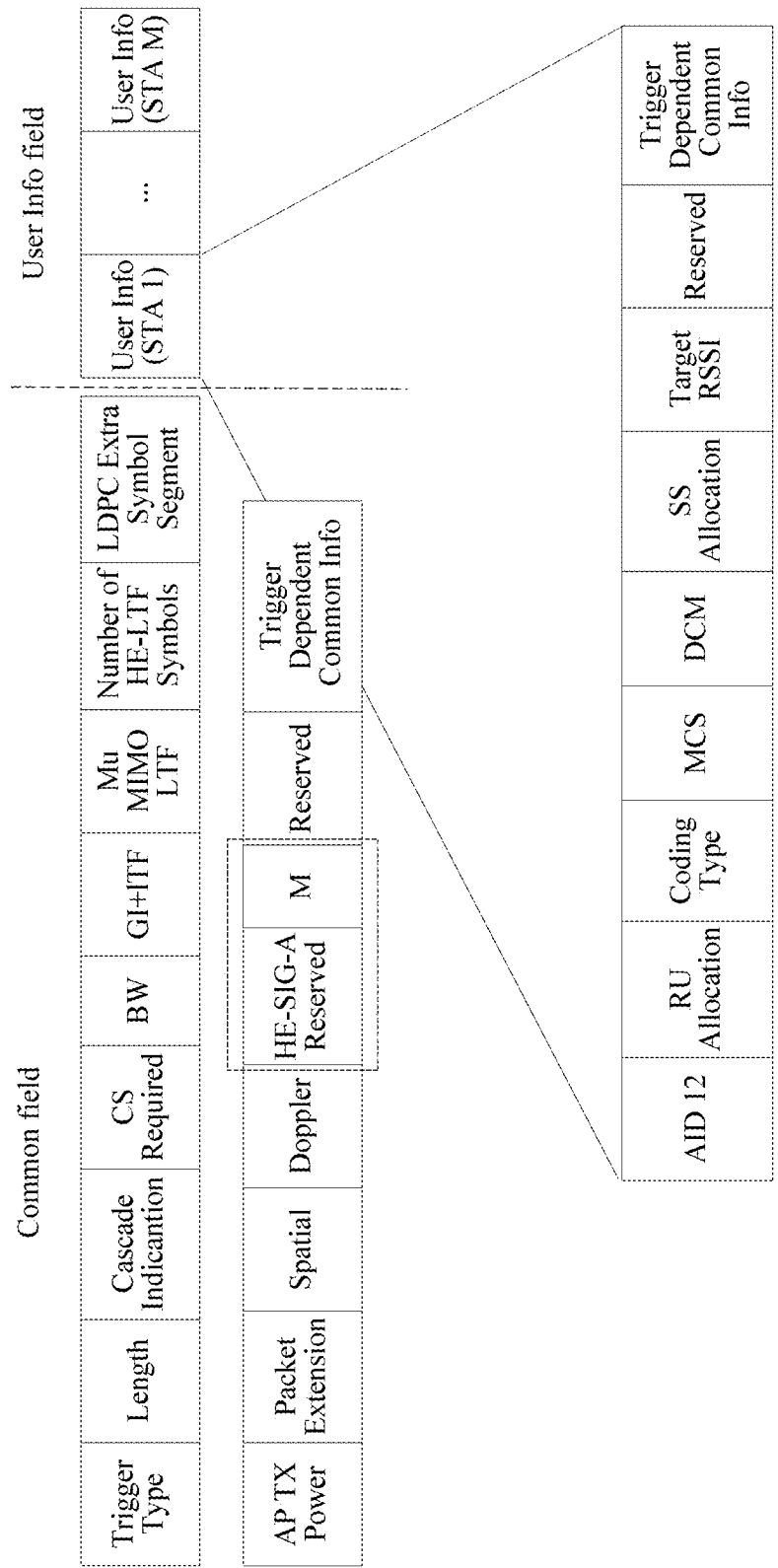
FIG. 24 is a schematic diagram of a thirteenth frame structure of a trigger frame according to an embodiment of the present invention.

Optionally, in an example of the present invention, referring to FIG. 24, the insertion frequency of the middle preamble in the data field in the TB PPDU is indicated by using one or more of reserved values of the HE-SIG-A field. For example, two bits 00 are used to indicate M=M1, 01 are used to indicate M=M2, 10 are used to indicate M=M3, and 11 are used to indicate that no midamble is inserted.

Figure 25:
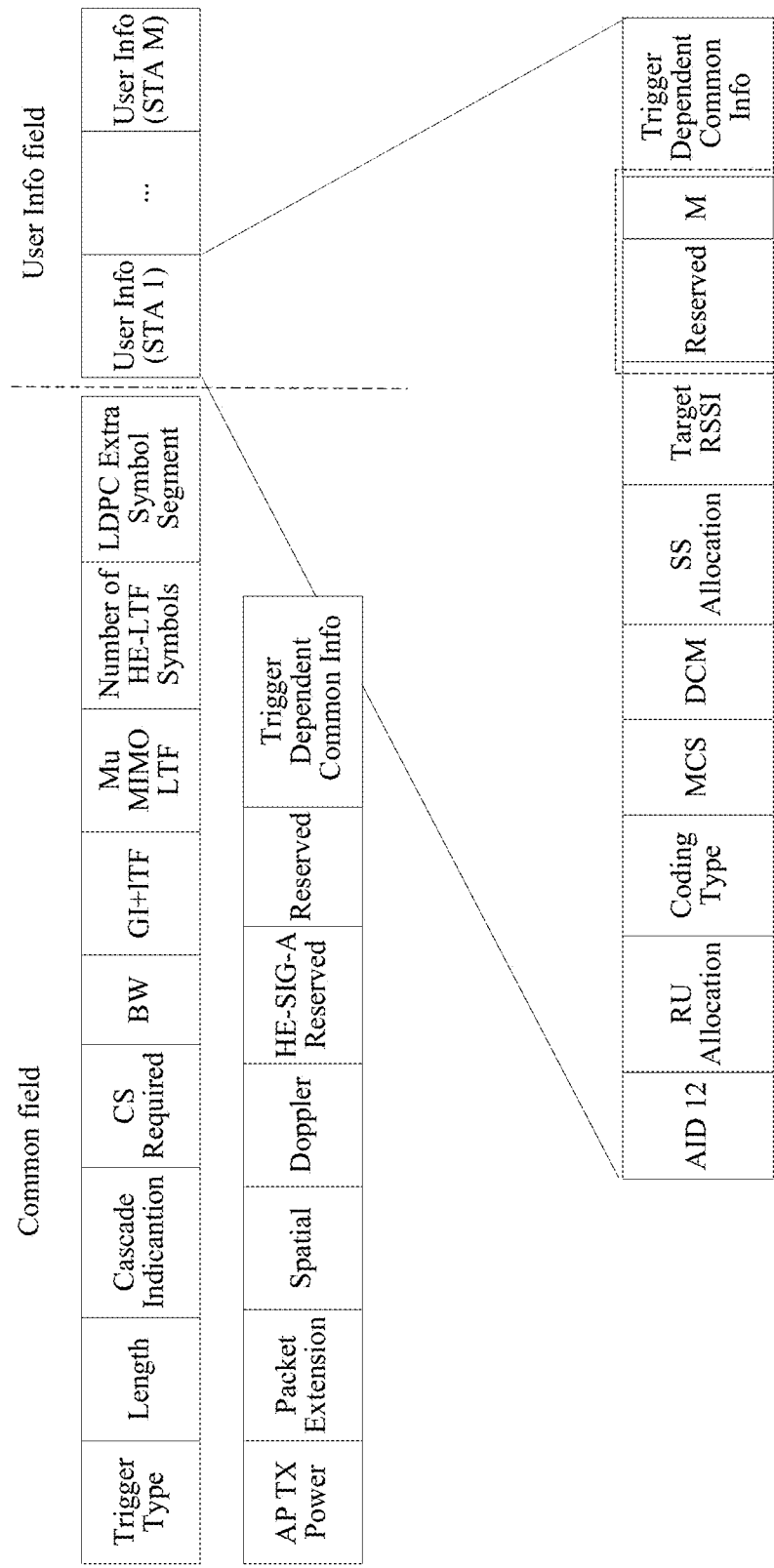
FIG. 25 is a schematic diagram of a fourteenth frame structure of a trigger frame according to an embodiment of the present invention.

Optionally, in an example of the present invention, referring to FIG. 25, the insertion frequency of the middle preamble in the data field in the TB PPDU is indicated by using a reserved value of the Reserved field (one bit) in a User Info field. For example, when the value of reserved field is equal to 1, it indicates M=M1. When the value of reserved field is equal to 0, it indicates M=M2.

According to the data processing method provided in this embodiment of the present invention, the insertion frequency of the middle preamble in the data field is indicated by using a specified field in the trigger frame. Based on the trigger frame, generation of the TB PPDU may be triggered and the insertion frequency of the middle preamble in the data field in the TB PPDU may be indicated. In this way, in different scenarios, the middle preamble may be inserted into the data field at different frequency, thereby reducing overheads of an inserted pilot and improving data transmission performance in a TB PPDU transmission process.

The foregoing describes the solutions provided in the embodiments of the present invention mainly from the perspective of interaction between the STA and the AP. It may be understood that to implement the foregoing functions, the STA/AP or the like includes corresponding hardware structures and/or software modules for implementing the various functions. A person of ordinary skill in the art should be easily aware that, with reference to the units and algorithm steps in the examples described in the embodiments disclosed in this specification, the present invention may be implemented by hardware or a combination of hardware and computer software. Whether a function is performed by hardware or computer software driving hardware depends on particular applications and design constraint conditions of the technical solutions. A person skilled in the art may use different methods to implement the described functions for each particular application, but it should not be considered that the implementation goes beyond the scope of the present invention.

In the embodiments of the present invention, functional unit division may be performed on the STA and the AP according to the examples of the foregoing method. For example, various functional units may be divided according to the corresponding functions, or two or more functions may be integrated into one processing unit. The integrated unit may be implemented in a form of hardware, or may be implemented in a form of a software functional unit. It should be noted that the unit division in the embodiments of the present invention is an example, and is merely logical function division. There may be another division manner in an actual implementation.

Figure 26:
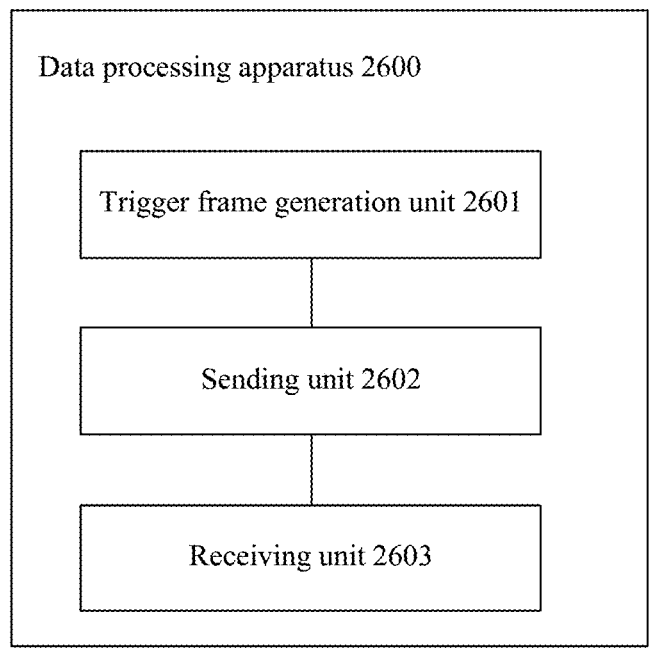
FIG. 26 is a structural diagram of a data processing apparatus according to an embodiment of the present invention.

When an integrated unit is used, FIG. 26 is a possible schematic structural diagram of a data processing apparatus in the foregoing embodiments. As shown in FIG. 26, a data processing apparatus 2600 may include a trigger frame generation unit 2601 and a sending unit 2602.

The trigger frame generation unit 2601 is configured to generate a trigger frame. The trigger frame is used to instruct to generate and send a physical layer protocol data unit PPDU, the PPDU includes a data field and a middle preamble field, and the trigger frame includes information used to indicate an insertion frequency of the middle preamble in the data field in the PPDU. The sending unit 2602 is configured to send the trigger frame.

The data processing apparatus 2600 in this embodiment has a function of the AP in FIG. 1i, and may implement an action completed by the AP in FIG. 11, so as to achieve a technical effect of the corresponding data processing method. For details, refer to related descriptions of FIG. 11. For brevity of description, details are not described herein again.

Figure 27:
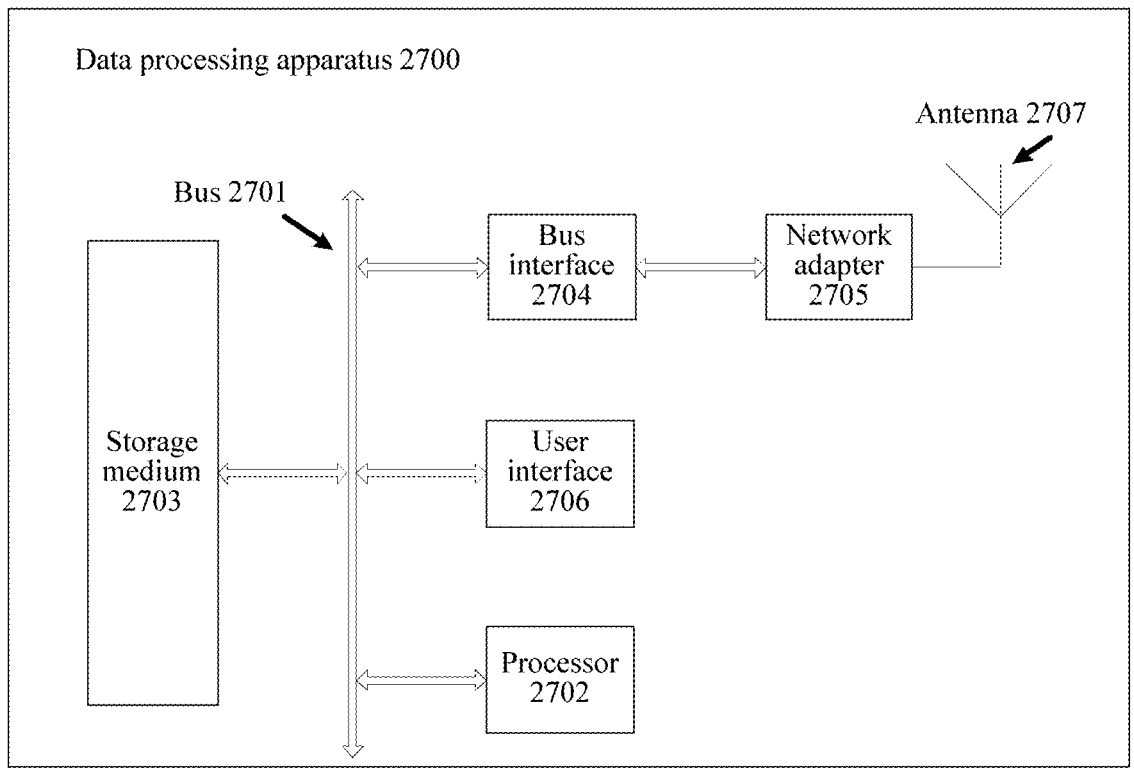
FIG. 27 is a structural diagram of hardware of a data processing apparatus according to an embodiment of the present invention.

FIG. 27 is a schematic structural diagram of a data processing apparatus (for example, a communications apparatus such as an access point, a base station, a station, or a terminal, or a chip in the foregoing communications apparatus) according to an implementation of the present invention. As shown in FIG. 27, a data processing apparatus 2700 may be implemented by using a bus 2701 as a general bus system structure. Depending on specific application and an overall design constraint condition of the data processing apparatus 2700, the bus 2701 may include any quantity of interconnection buses and bridges. The bus 2701 connects various circuits together. The circuits include a processor 2702, a storage medium 2703, and a bus interface 2704. Optionally, the data processing apparatus 2700 connects a network adapter 2705 and the like by using the bus interface 2704 and the bus 2701. The network adapter 2705 may be configured to: implement a signal processing function of a physical layer in a wireless communications network, and send and receive a radio frequency signal by using an antenna 2707. A user interface 2706 may connect to a user terminal, such as a keyboard, a display, a mouse, or a joystick. The bus 2701 may also connect other various circuits, such as a timing source, a peripheral device, a voltage regulator, or a power management circuit. The circuits are well-known in the art, and are not described in detail.

Alternatively, the data processing apparatus 2700 may also be configured as a general-purpose processing system, for example, known as a chip. The general-purpose processing system includes one or more microprocessors providing a processor function and a peripheral memory providing at least a part of the storage medium 2703. All the circuits are connected to other supporting circuits by using a peripheral bus system structure.

Alternatively, the data processing apparatus 2700 may be implemented by an ASIC (application-specific integrated circuit) having the processor 2702, the bus interface 2704, and the user interface 2706 and at least a part of the storage medium 2703 that is integrated into a single chip. Alternatively, the data processing apparatus 2700 may be implemented by one or more FPGAs (field programmable gate array), PLDs (programmable logic device), controllers, status machines, gate logics, discrete hardware components, any other suitable circuits, or any combination of circuits that can implement various functions described in the present invention.

The processor 2702 is responsible for bus management and general processing (including executing software stored in the storage medium 2703). The processor 2702 may be implemented by one or more general-purpose processors and/or special-purpose processors. Examples of the processor include a microprocessor, a microcontroller, a DSP processor, and another circuit that can execute the software. Software shall be construed broadly to mean instructions, data, or any combination thereof, whether referred to as software, firmware, middleware, microcode, hardware description language, or otherwise.

In the following figure, the storage medium 2703 is separate from the processor 2702. However, a person skilled in the art will readily appreciate that the storage medium 2703 or any part of the storage medium 2703 may be located outside the data processing apparatus 2700. For example, the storage medium 2703 may include a transmission line, a carrier waveform modulated by using data, and/or a computer product separate from a wireless node. The media may be accessed by the processor 2702 through the bus interface 2704. Alternatively, the storage medium 2703 or any part of the storage medium 2703 may be integrated into the processor 2702. For example, the storage medium 2703 may be a cache and/or a general-purpose register.

The processor 2702 may perform the following step: generating a trigger frame. The trigger frame is used to instruct to generate and send a physical layer protocol data unit PPDU, the PPDU includes a data field and a middle preamble field, and the trigger frame includes information used to indicate an insertion frequency of the middle preamble in the data field in the PPDU.

The antenna 2707 may perform the following step: sending the trigger frame.

Alternatively, all or some of the procedures or functions may be implemented by using software, hardware, firmware, or any combination thereof. When software is used for implementation, all or some of the procedures or functions may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Figure 28:
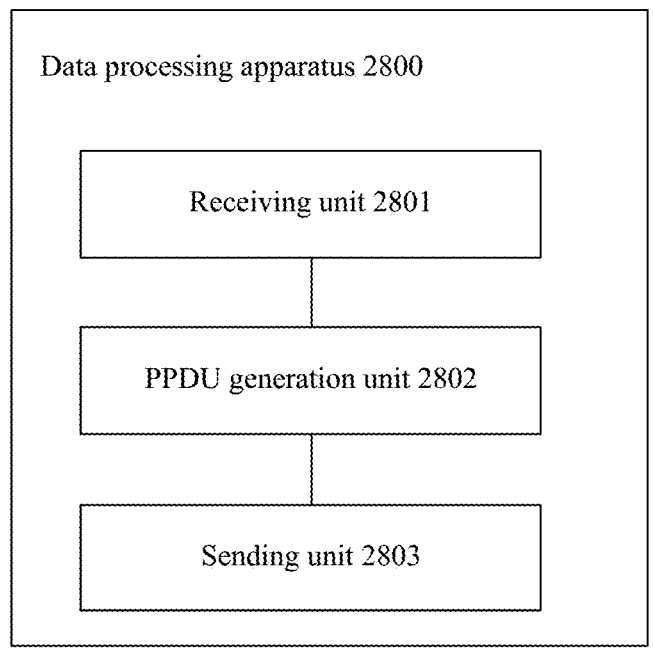
FIG. 28 is a structural diagram of another data processing apparatus according to an embodiment of the present invention.

When an integrated unit is used, FIG. 28 is a possible schematic structural diagram of a data processing apparatus in the foregoing embodiments. As shown in FIG. 28, a data processing apparatus 2800 may include a receiving unit 2801, a PPDU generation unit 2802, and a sending unit 2803.

The receiving unit 2801 is configured to receive a trigger frame. The trigger frame is used to instruct to generate and send a physical layer protocol data unit PPDU, the trigger frame includes information used to indicate an insertion frequency of a middle preamble in a data field in the PPDU, and the PPDU includes the data field and the middle preamble field. The PPDU generation unit 2802 is configured to generate the PPDU based on the trigger frame. The sending unit 2803 is configured to send the PPDU.

The data processing apparatus 2800 in this embodiment has a function of the STA in FIG. 10, and may implement an action completed by the STA in FIG. 11, so as to achieve a technical effect of the corresponding data processing method. For details, refer to related descriptions of FIG. 11. For brevity of description, details are not described herein again.

Figure 29:
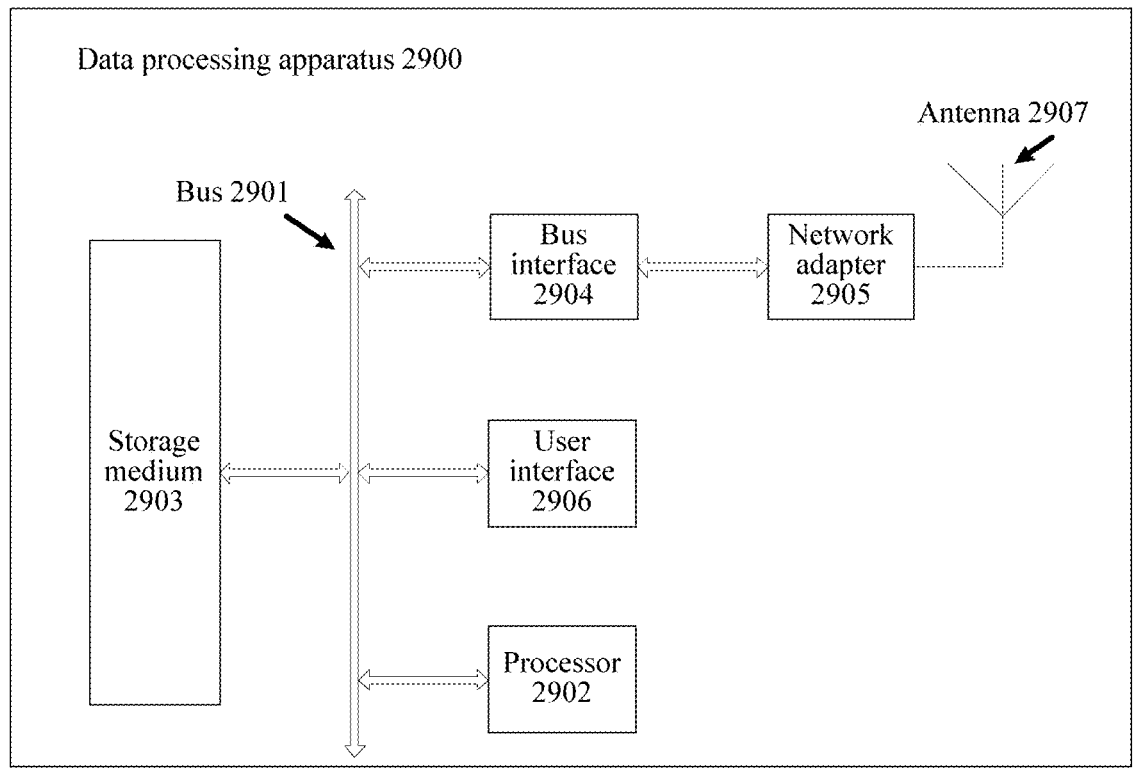
FIG. 29 is a structural diagram of hardware of another data processing apparatus according to an embodiment of the present invention.

FIG. 29 is a schematic structural diagram of a data processing apparatus (for example, a communications apparatus such as an access point, a base station, a station, or a terminal, or a chip in the foregoing communications apparatus) according to an implementation of the present invention. As shown in FIG. 29, a data processing apparatus 2900 may be implemented by using a bus 2901 as a general bus system structure. Depending on specific application and an overall design constraint condition of the data processing apparatus 2900, the bus 2901 may include any quantity of interconnection buses and bridges. The bus 2901 connects various circuits together. The circuits include a processor 2902, a storage medium 2903, and a bus interface 2904. Optionally, the data processing apparatus 2900 connects a network adapter 2905 and the like by using the bus interface 2904 and the bus 2901. The network adapter 2905 may be configured to: implement a signal processing function of a physical layer in a wireless communications network, and send and receive a radio frequency signal by using an antenna 2907. A user interface 2906 may connect to a user terminal, such as a keyboard, a display, a mouse, or a joystick. The bus 2901 may also connect other various circuits, such as a timing source, a peripheral device, a voltage regulator, or a power management circuit. The circuits are well-known in the art, and are not described in detail.

Alternatively, the data processing apparatus 2900 may also be configured as a general-purpose processing system, for example, known as a chip. The general-purpose processing system includes one or more microprocessors providing a processor function and a peripheral memory providing at least a part of the storage medium 2903. All the circuits are connected to other supporting circuits by using a peripheral bus system structure.

Alternatively, the data processing apparatus 2900 may be implemented by an ASIC (application-specific integrated circuit) having the processor 2902, the bus interface 2904, and the user interface 2906 and at least a part of the storage medium 2903 that is integrated into a single chip. Alternatively, the data processing apparatus 2900 may be implemented by one or more FPGAs (field programmable gate array), PLDs (programmable logic device), controllers, status machines, gate logics, discrete hardware components, any other suitable circuits, or any combination of circuits that can implement various functions described in the present invention.

The processor 2902 is responsible for bus management and general processing (including executing software stored in the storage medium 2903). The processor 2902 may be implemented by one or more general-purpose processors and/or special-purpose processors. Examples of the processor include a microprocessor, a microcontroller, a DSP processor, and another circuit that can execute the software. Software shall be construed broadly to mean instructions, data, or any combination thereof, whether referred to as software, firmware, middleware, microcode, hardware description language, or otherwise.

In the following figure, the storage medium 2903 is separate from the processor 2902. However, a person skilled in the art will readily appreciate that the storage medium 2903 or any part of the storage medium 2903 may be located outside the data processing apparatus 2900. For example, the storage medium 2903 may include a transmission line, a carrier waveform modulated by using data, and/or a computer product separate from a wireless node. The media may be accessed by the processor 2902 through the bus interface 2904. Alternatively, the storage medium 2903 or any part of the storage medium 2903 may be integrated into the processor 2902. For example, the storage medium 2903 may be a cache and/or a general-purpose register.

The antenna 2907 may perform the following step: receiving a trigger frame. The trigger frame is used to instruct to generate and send a physical layer protocol data unit PPDU, the trigger frame includes information used to indicate an insertion frequency of a middle preamble in a data field in the PPDU, and the PPDU includes the data field and the middle preamble field.

The processor 2902 may perform the following step: generating the PPDU based on the trigger frame.

The antenna 2907 may perform the following step: sending the PPDU.

Alternatively, all or some of the procedures or functions may be implemented by using software, hardware, firmware, or any combination thereof. When software is used for implementation, all or some of the procedures or functions may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

An embodiment of the present invention provides a data processing method. Transmission related to a PPDU may be applicable to a Doppler scenario or a high-speed movement scenario (for example, the STA transmits data to the AP in FIG. 1) occurred during uplink data transmission. In other words, a MAC frame is needed to trigger and instruct TB PPDU transmission.

Figures 30, 31, 32:
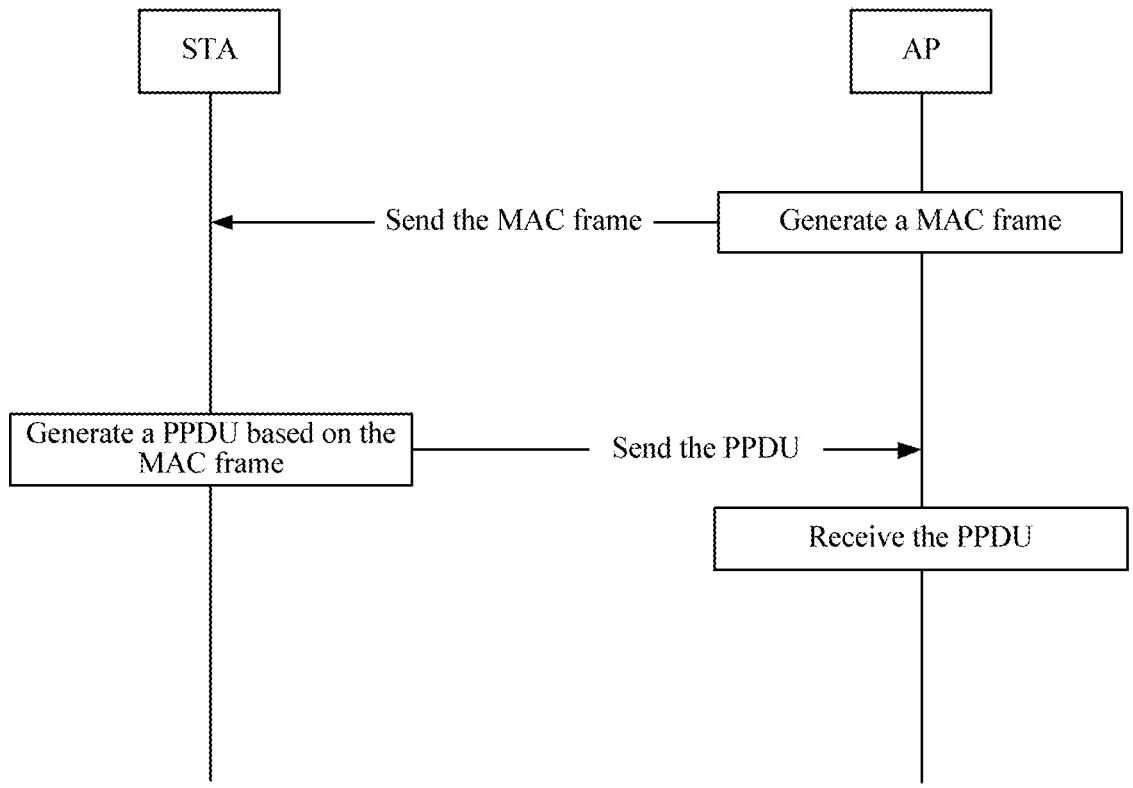
FIG. 30 is an interaction diagram of a data processing method according to an embodiment of the present invention.
FIG. 31 is a schematic structural diagram of an HTC field in a MAC frame in the prior art.
FIG. 32 is a first schematic structural diagram of an HTC field in a MAC frame according to an embodiment of the present invention.

FIG. 30 is an interaction diagram of the data processing method according to this embodiment of the present invention. The method is applicable to the Doppler scenario or the high-speed movement scenario. An AP generates a Media Access Control MAC frame. The MAC frame is used to instruct to generate and send a physical layer protocol data unit PPDU. The PPDU includes a data field and a middle preamble field, and the MAC frame includes information used to indicate an insertion frequency of the middle preamble in the data field in the PPDU. The AP sends the MAC frame to the STA. The AP receives the PPDU sent by the STA.

For a process of interaction between the AP and the STA, refer to descriptions of FIG. 11, and details are not described herein again.

The information used to indicate the insertion frequency of the middle preamble in the data field in the PPDU is added in a high throughput control (HTC) field in the MAC frame. The HTC field includes the following fields. For details, refer to FIG. 31.

Optionally, in an example of the present invention, referring to FIG. 32, the insertion frequency of the middle preamble in the data field in the TB PPDU is indicated by using a reserved value of an RU allocation field. For details, refer to related descriptions of Table 18, and details are not described herein again.

Figure 33:
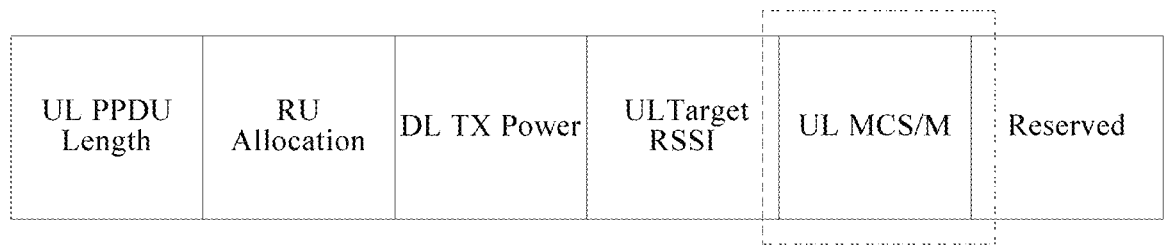
FIG. 33 is a second schematic structural diagram of an HTC field in a MAC frame according to an embodiment of the present invention.

Optionally, in an example of the present invention, referring to FIG. 33, the insertion frequency of the middle preamble in the data field in the TB PPDU is indicated by using one or more of reserved values of a UL MCS field. For details, refer to related descriptions of Table 10, and details are not described herein again.

Figure 34:
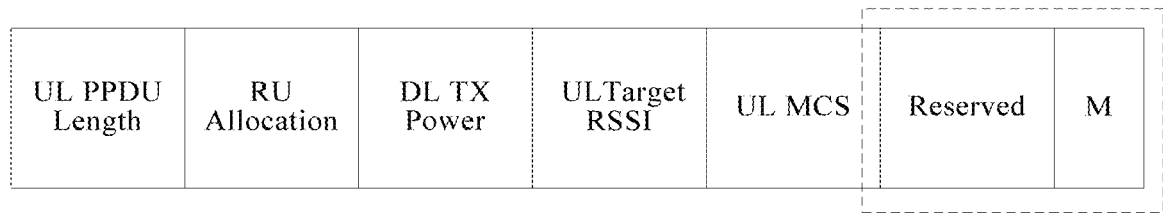
FIG. 34 is a third schematic structural diagram of an HTC field in a MAC frame according to an embodiment of the present invention.

Optionally, in an example of the present invention, referring to FIG. 34, the insertion frequency of the middle preamble in the data field in the TB PPDU is indicated by using one or more of reserved values of a Reserved field. For details, refer to related descriptions of FIG. 17, and details are not described herein again.

According to the data processing method provided in this embodiment of the present invention, the insertion frequency of the middle preamble is indicated by using a specified field in the MAC frame. Based on the MAC frame, the TB PPDU may be triggered and the insertion frequency of the middle preamble in the data field in the TB PPDU may be indicated. In this way, in different scenarios, the middle preamble may be inserted into the data field at different frequency, thereby reducing overheads of an inserted pilot and improving data transmission performance in a PPDU transmission process.

The foregoing describes the solutions provided in the embodiments of the present invention mainly from the perspective of interaction between the STA and the AP. It may be understood that to implement the foregoing functions, the STA/AP or the like includes corresponding hardware structures and/or software modules for implementing the various functions. A person of ordinary skill in the art should be easily aware that, with reference to the units and algorithm steps in the examples described in the embodiments disclosed in this specification, the present invention may be implemented by hardware or a combination of hardware and computer software. Whether a function is performed by hardware or computer software driving hardware depends on particular applications and design constraint conditions of the technical solutions. A person skilled in the art may use different methods to implement the described functions for each particular application, but it should not be considered that the implementation goes beyond the scope of the present invention.

In the embodiments of the present invention, functional unit division may be performed on the STA and the AP according to the examples of the foregoing method. For example, various functional units may be divided according to the corresponding functions, or two or more functions may be integrated into one processing unit. The integrated unit may be implemented in a form of hardware, or may be implemented in a form of a software functional unit. It should be noted that the unit division in the embodiments of the present invention is an example, and is merely logical function division. There may be another division manner in an actual implementation.

Figure 35:
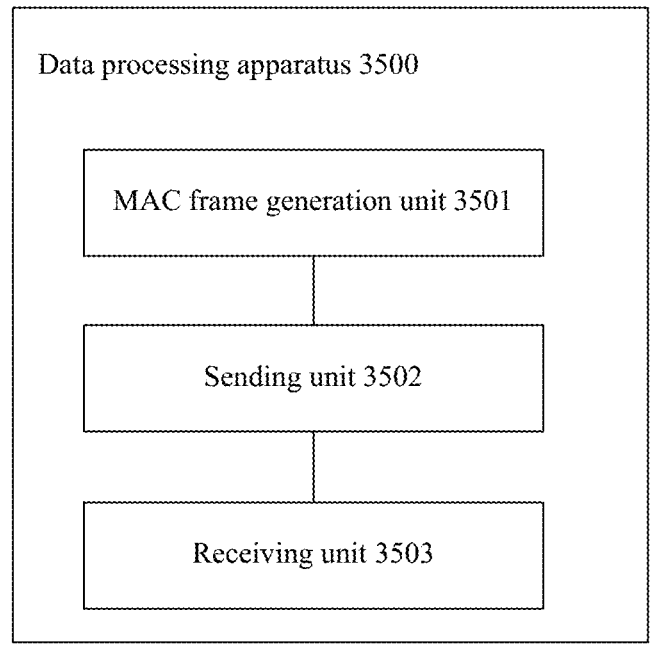
FIG. 35 is a structural diagram of a data processing apparatus according to an embodiment of the present invention.

When an integrated unit is used, FIG. 35 is a possible schematic structural diagram of a data processing apparatus in the foregoing embodiments. As shown in FIG. 35, a data processing apparatus 3500 may include a MAC frame generation unit 3501 and a sending unit 3502.

The MAC frame generation unit 3501 is configured to generate a Media Access Control MAC frame. The MAC frame is used to instruct to generate and send a physical layer protocol data unit PPDU, the PPDU includes a data field and a middle preamble field, and the MAC frame includes information used to indicate an insertion frequency of the middle preamble in the data field in the PPDU. The sending unit 3502 is configured to send the MAC frame.

The data processing apparatus 3500 in this embodiment has a function of the AP in FIG. 30, and may implement an action completed by the AP in FIG. 30, so as to achieve a technical effect of the corresponding data processing method. For details, refer to related descriptions of FIG. 30. For brevity of description, details are not described herein again.

Figure 36:
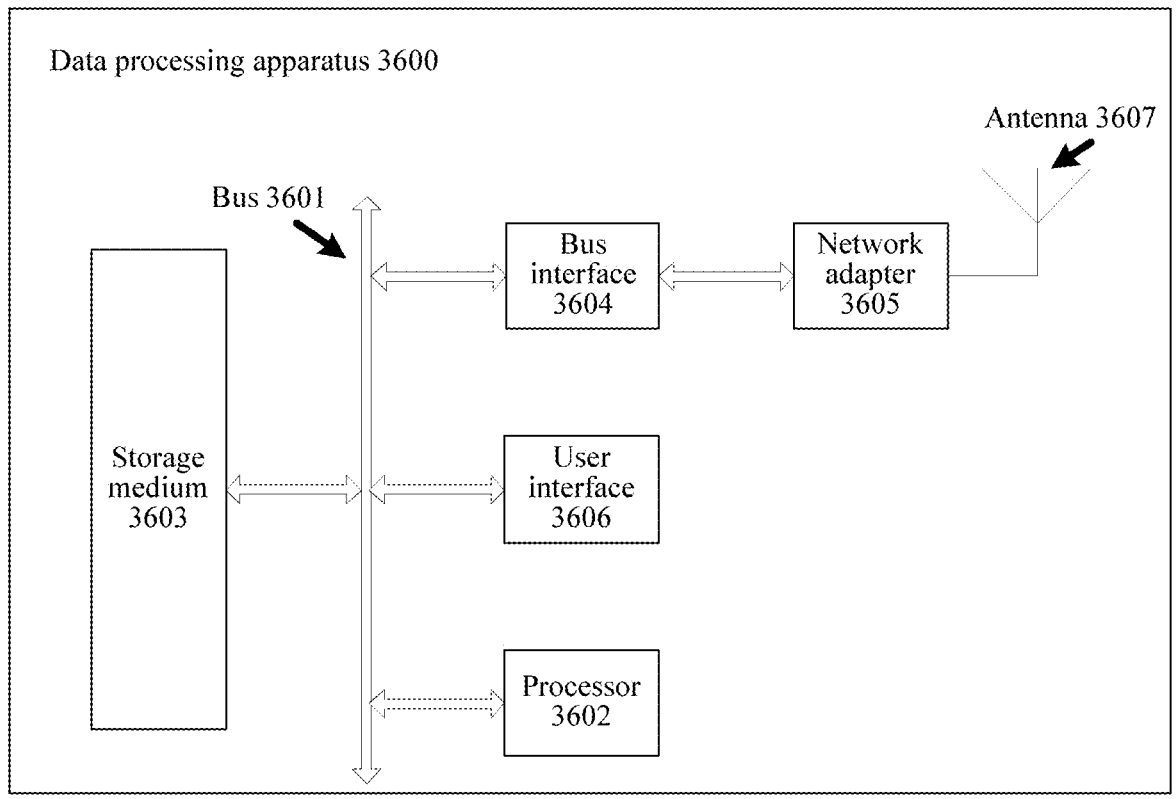
FIG. 36 is a structural diagram of hardware of a data processing apparatus according to an embodiment of the present invention.

FIG. 36 is a schematic structural diagram of a data processing apparatus (for example, a communications apparatus such as an access point, a base station, a station, or a terminal, or a chip in the foregoing communications apparatus) according to an implementation of the present invention. As shown in FIG. 36, a data processing apparatus 3600 may be implemented by using a bus 3601 as a general bus system structure. Depending on specific application and an overall design constraint condition of the data processing apparatus 3600, the bus 3601 may include any quantity of interconnection buses and bridges. The bus 3601 connects various circuits together. The circuits include a processor 3602, a storage medium 3603, and a bus interface 3604. Optionally, the data processing apparatus 3600 connects a network adapter 3605 and the like by using the bus interface 3604 and the bus 3601. The network adapter 3605 may be configured to: implement a signal processing function of a physical layer in a wireless communications network, and send and receive a radio frequency signal by using an antenna 3607. A user interface 3606 may connect to a user terminal, such as a keyboard, a display, a mouse, or a joystick. The bus 3601 may also connect other various circuits, such as a timing source, a peripheral device, a voltage regulator, or a power management circuit. The circuits are well-known in the art, and are not described in detail.

Alternatively, the data processing apparatus 3600 may also be configured as a general-purpose processing system, for example, known as a chip. The general-purpose processing system includes one or more microprocessors providing a processor function and a peripheral memory providing at least a part of the storage medium 3603. All the circuits are connected to other supporting circuits by using a peripheral bus system structure.

Alternatively, the data processing apparatus 3600 may be implemented by an ASIC (application-specific integrated circuit) having the processor 3602, the bus interface 3604, and the user interface 3606 and at least a part of the storage medium 3603 that is integrated into a single chip. Alternatively, the data processing apparatus 3600 may be implemented by one or more FPGAs (field programmable gate array), PLDs (programmable logic device), controllers, status machines, gate logics, discrete hardware components, any other suitable circuits, or any combination of circuits that can implement various functions described in the present invention.

The processor 3602 is responsible for bus management and general processing (including executing software stored in the storage medium 3603). The processor 3602 may be implemented by one or more general-purpose processors and/or special-purpose processors. Examples of the processor include a microprocessor, a microcontroller, a DSP processor, and another circuit that can execute the software. Software shall be construed broadly to mean instructions, data, or any combination thereof, whether referred to as software, firmware, middleware, microcode, hardware description language, or otherwise.

In the following figure, the storage medium 3603 is separate from the processor 3602. However, a person skilled in the art will readily appreciate that the storage medium 3603 or any part of the storage medium 3603 may be located outside the data processing apparatus 3600. For example, the storage medium 3603 may include a transmission line, a carrier waveform modulated by using data, and/or a computer product separate from a wireless node. The media may be accessed by the processor 3602 through the bus interface 3604. Alternatively, the storage medium 3603 or any part of the storage medium 3603 may be integrated into the processor 3602. For example, the storage medium 3603 may be a cache and/or a general-purpose register.

The processor 3602 may perform the following step: generating a Media Access Control MAC frame. The MAC frame is used to instruct to generate and send a physical layer protocol data unit PPDU, the PPDU includes a data field and a middle preamble field, and the MAC frame includes information used to indicate an insertion frequency of the middle preamble in the data field in the PPDU.

The antenna 3607 may perform the following step: sending the MAC frame.

Alternatively, all or some of the procedures or functions may be implemented by using software, hardware, firmware, or any combination thereof. When software is used for implementation, all or some of the procedures or functions may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Figure 37:
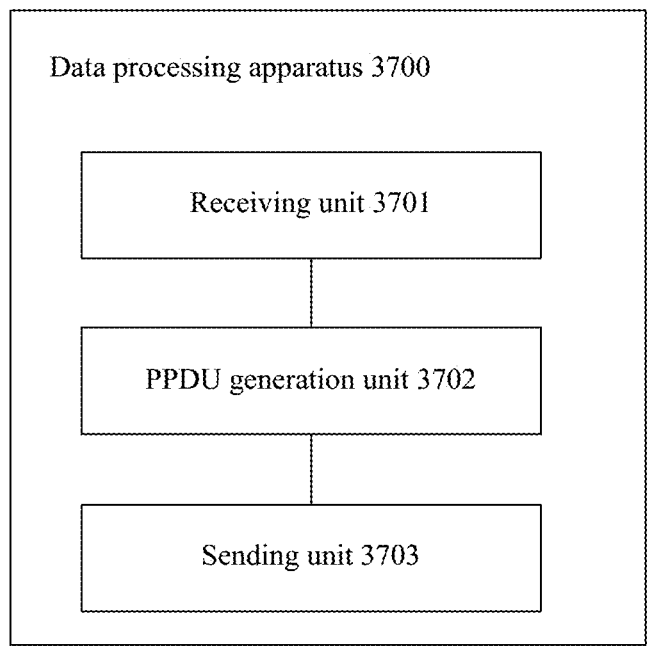
FIG. 37 is a structural diagram of another data processing apparatus according to an embodiment of the present invention.

When an integrated unit is used, FIG. 37 is a possible schematic structural diagram of a data processing apparatus in the foregoing embodiments. As shown in FIG. 37, a data processing apparatus 3700 may include a receiving unit 3701, a PPDU generation unit 3702, and a sending unit 3703.

The receiving unit 3701 is configured to receive a Media Access Control MAC frame. The MAC frame is used to instruct to generate and send a physical layer protocol data unit PPDU, the PPDU includes a data field and a middle preamble field, and the MAC frame includes information used to indicate an insertion frequency of the middle preamble in the data field in the PPDU. The PPDU generation unit 3702 is configured to generate the PPDU based on the MAC frame. The sending unit 3703 is configured to send the PPDU.

The data processing apparatus 3700 in this embodiment has a function of the STA in FIG. 30, and may implement an action completed by the STA in FIG. 30, so as to achieve a technical effect of the corresponding data processing method. For details, refer to related descriptions of FIG. 30. For brevity of description, details are not described herein again.

Figure 38:
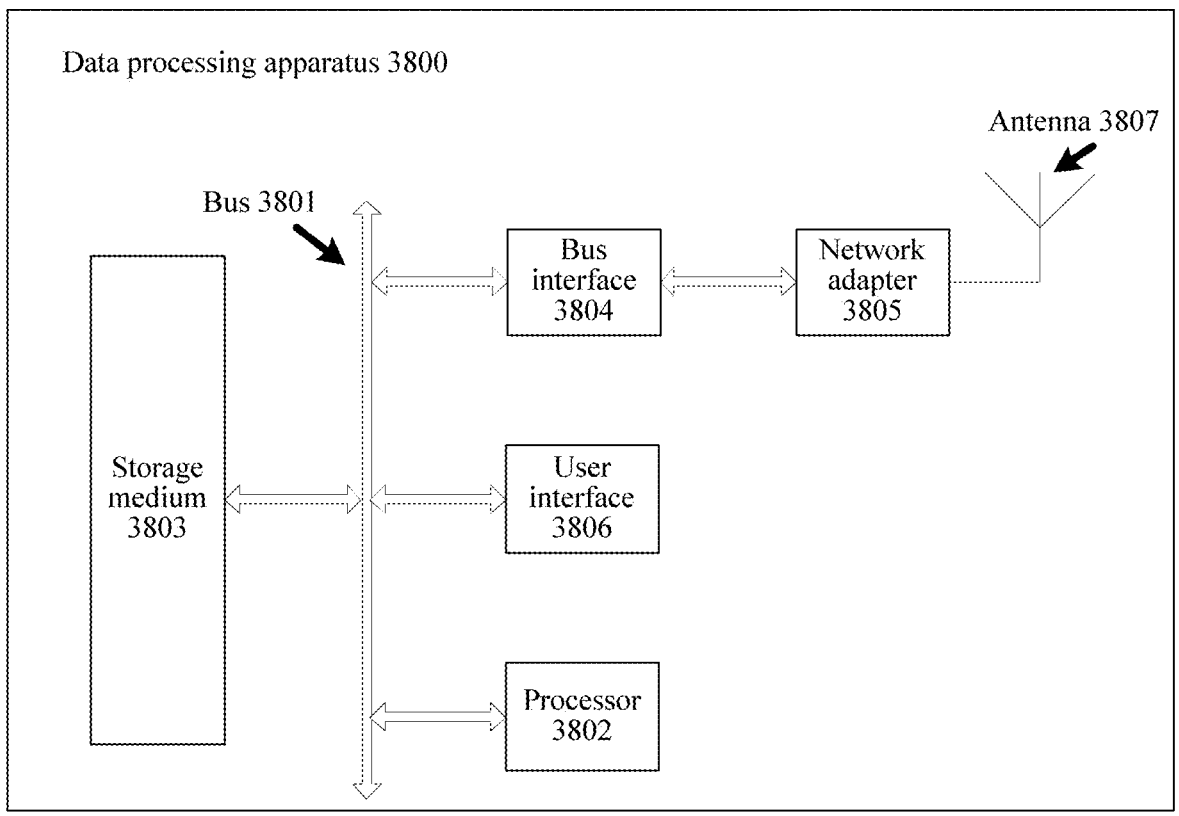
FIG. 38 is a structural diagram of hardware of another data processing apparatus according to an embodiment of the present invention.

FIG. 38 is a schematic structural diagram of a data processing apparatus (for example, a communications apparatus such as an access point, a base station, a station, or a terminal, or a chip in the foregoing communications apparatus) according to an implementation of the present invention. As shown in FIG. 38, a data processing apparatus 3800 may be implemented by using a bus 3801 as a general bus system structure. Depending on specific application and an overall design constraint condition of the data processing apparatus 3800, the bus 3801 may include any quantity of interconnection buses and bridges. The bus 3801 connects various circuits together. The circuits include a processor 3802, a storage medium 3803, and a bus interface 3804. Optionally, the data processing apparatus 3800 connects a network adapter 3805 and the like by using the bus interface 3804 and the bus 3801. The network adapter 3805 may be configured to: implement a signal processing function of a physical layer in a wireless communications network, and send and receive a radio frequency signal by using an antenna 3807. A user interface 3806 may connect to a user terminal, such as a keyboard, a display, a mouse, or a joystick. The bus 3801 may also connect other various circuits, such as a timing source, a peripheral device, a voltage regulator, or a power management circuit. The circuits are well-known in the art, and are not described in detail.

Alternatively, the data processing apparatus 3800 may also be configured as a general-purpose processing system, for example, known as a chip. The general-purpose processing system includes one or more microprocessors providing a processor function and a peripheral memory providing at least a part of the storage medium 3803. All the circuits are connected to other supporting circuits by using a peripheral bus system structure.

Alternatively, the data processing apparatus 3800 may be implemented by an ASIC (application-specific integrated circuit) having the processor 3802, the bus interface 3804, and the user interface 3806 and at least a part of the storage medium 3803 that is integrated into a single chip. Alternatively, the data processing apparatus 3800 may be implemented by one or more FPGAs (field programmable gate array), PLDs (programmable logic device), controllers, status machines, gate logics, discrete hardware components, any other suitable circuits, or any combination of circuits that can implement various functions described in the present invention.

The processor 3802 is responsible for bus management and general processing (including executing software stored in the storage medium 3803). The processor 3802 may be implemented by one or more general-purpose processors and/or special-purpose processors. Examples of the processor include a microprocessor, a microcontroller, a DSP processor, and another circuit that can execute the software. Software shall be construed broadly to mean instructions, data, or any combination thereof, whether referred to as software, firmware, middleware, microcode, hardware description language, or otherwise.

In the following figure, the storage medium 3803 is separate from the processor 3802. However, a person skilled in the art will readily appreciate that the storage medium 3803 or any part of the storage medium 3803 may be located outside the data processing apparatus 3800. For example, the storage medium 3803 may include a transmission line, a carrier waveform modulated by using data, and/or a computer product separate from a wireless node. The media may be accessed by the processor 3802 through the bus interface 3804. Alternatively, the storage medium 3803 or any part of the storage medium 3803 may be integrated into the processor 3802. For example, the storage medium 3803 may be a cache and/or a general-purpose register.

The antenna 3807 may perform the following step: receiving a Media Access Control MAC frame. The MAC frame is used to instruct to generate and send a physical layer protocol data unit PPDU, the PPDU includes a data field and a middle preamble field, and the MAC frame includes information used to indicate an insertion frequency of the middle preamble in the data field in the PPDU.

The processor 3802 may perform the following step: generating the PPDU based on the MAC frame.

The antenna 3807 may perform the following step: sending the PPDU.

Alternatively, all or some of the procedures or functions may be implemented by using software, hardware, firmware, or any combination thereof. When software is used for implementation, all or some of the procedures or functions may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has described compositions and steps of each example in general according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The steps in the method or algorithm described in the embodiments disclosed in this specification may be implemented by hardware, software module executed by the processor, or combination of hardware and software. The software module may reside in a random-access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the principle of the present invention should fall within the protection scope of the present invention.

An embodiment of the present invention discloses A1. A data processing method, including: generating a physical layer protocol data unit PPDU, where the PPDU includes a preamble field, a data field, and a middle preamble field, and the preamble in the PPDU includes information used to indicate an insertion frequency of the middle preamble in the data field in the PPDU; and sending the PPDU.

A2. According to the method described in A1, the information used to indicate the insertion frequency of the middle preamble in the data field in the PPDU is added in one of the following fields: an SR field used to indicate a parameter related to spatial reuse in a high efficient signal field A HE-SIG-A, an MCS field used to indicate a modulation and coding scheme in the HE-SIG-A, an MCS field in a high efficient signal field B HE-SIG-B, a SIGB MCS field used to indicate a high efficient signal field B modulation and coding scheme in the HE-SIG-A, a combination of an MCS field and a DCM field in the HE-SIG-A, a combination of an MCS field and a DCM field in the HE-SIG-B, a combination of a SIGB MCS field and a SIGB DCM field in the HE-SIG-A, an NSTS field used to indicate a quantity of space time streams of a single user in the HE-SIG-B, a combination of an MCS field and an NSTS field, or an RU allocation field used to indicate a resource unit in the HE-SIG-B.

A3. According to the method described in A2, the insertion frequency of the middle preamble is indicated by using one or more of reserved values of the SR field.

A4. According to the method described in A2, the insertion frequency of the middle preamble is indicated by using one or more of reserved values of the MCS field or the SIGB MCS field.

A5. According to the method described in A2, the insertion frequency of the middle preamble is implicitly indicated by using a parameter used to indicate an MCS in the MCS field.

A6. According to the method described in A2, the insertion frequency of the middle preamble is indicated by using the combination of the MCS field and the DCM field.

A7. According to the method described in A2, the insertion frequency of the middle preamble is indicated by using the combination of the SIGB MCS field and the SIGB DCM field.

A8. According to the method described in A2, the insertion frequency of the middle preamble is implicitly indicated by using a parameter used to indicate an NSTS in the NSTS field.

A9. According to the method described in A2, the insertion frequency of the middle preamble is indicated by using the combination of the MCS field and the NSTS field.

A10. According to the method described in A2, the insertion frequency of the middle preamble is indicated by using a reserved value of the RU allocation field.

An embodiment of the present invention further discloses Bit A data processing method, including: generating a trigger frame, where the trigger frame is used to instruct to generate and send a physical layer protocol data unit PPDU, the PPDU includes a data field and a middle preamble field, and the trigger frame includes information used to indicate an insertion frequency of the middle preamble in the data field in the PPDU, and the PPDU includes the data field and the middle preamble field; and sending the trigger frame.

B12. According to the method described in B11, the information used to indicate the insertion frequency of the middle preamble in the data field in the PPDU is added in one of the following fields: a Trigger Type field used to indicate a trigger frame type, a Doppler field used to indicate whether a Doppler mode is used for a data packet, a high efficient signal field A HE-SIG-A, a Trigger Dependent Common Info field for indicating common information based on a trigger frame type, an MCS field used to indicate a modulation and coding scheme, a combination of an MCS field and a DCM field, an RU allocation field used to indicate a resource unit, an SS allocation field used to indicate a quantity of space time streams, or a combination of an SS allocation field and an MCS field in the trigger frame.

B13. According to the method described in B12, one or more of reserved values of the Trigger Type field in the trigger frame are set to indicate that the trigger frame is a Doppler trigger frame, and to indicate that the trigger-based PPDU uses a middle preamble midamble structure, and the insertion frequency of the middle preamble is indicated by using one or more of reserved values of the HE-SIG-A field.

B14. According to the method described in B12, one or more of reserved values of the Trigger Type field in the trigger frame are set to indicate that the trigger frame is a Doppler trigger frame, a midamble frequency indication field is added to the Trigger Dependent Common Info field, and the insertion frequency of the middle preamble is indicated by using the midamble frequency indication field.

B15. According to the method described in B12, one or more of reserved values of the Trigger Type field in the trigger frame are set to indicate that the trigger frame is a Doppler trigger frame, and the insertion frequency of the middle preamble is indicated by using one or more of reserved values of the MCS field.

B16. According to the method described in B12, one or more of reserved values of the Trigger Type field in the trigger frame are set to indicate that the trigger frame is a Doppler trigger frame, and the insertion frequency of the middle preamble is indicated by using the combination of the MCS field and the DCM field.

B17. According to the method described in B12, one or more of reserved values of the Trigger Type field in the trigger frame are set to indicate that the trigger frame is a Doppler trigger frame, and the insertion frequency of the middle preamble is indicated by using a reserved value of the RU allocation field.

B18. According to the method described in B12, one or more of reserved values of the Trigger Type field in the trigger frame are set to indicate that the trigger frame is a Doppler trigger frame, and the insertion frequency of the middle preamble is implicitly indicated by using a parameter used to indicate an SS in the SS allocation field.

B19. According to the method described in B12, one or more of reserved values of the Trigger Type field in the trigger frame are set to indicate that the trigger frame is a Doppler trigger frame, and the insertion frequency of the middle preamble is implicitly indicated by using a parameter used to indicate an SS in the combination of the SS allocation field and the MCS field.

B20. According to the method described in B12, the indicating the insertion frequency of the middle preamble in a data field by using a specified field in the trigger frame further includes: setting the Doppler field in the trigger frame to 1 to indicate that the TB PPDU uses a midamble structure, and indicating the insertion frequency of the middle preamble by using one or more of reserved values of the HE-SIG-A field.

B21. According to the method described in B12, the Doppler field in the trigger frame is set to 1, a midamble frequency indication field is added to the Trigger Dependent Common Info field, and the insertion frequency of the middle preamble is indicated by using the midamble frequency indication field.

B22. According to the method described in B12, the Doppler field in the trigger frame is set to 1, and the insertion frequency of the middle preamble is indicated by using one or more of reserved values of the MCS field.

B23. According to the method described in B12, the Doppler field in the trigger frame is set to 1, and the insertion frequency of the middle preamble is indicated by using the combination of the MCS field and the DCM field.

B24. According to the method described in B12, the Doppler field in the trigger frame is set to 1, and the insertion frequency of the middle preamble is indicated by using a reserved value of the RU allocation field.

B25. According to the method described in B12, the Doppler field in the trigger frame is set to 1, and the insertion frequency of the middle preamble is implicitly indicated by using a parameter used to indicate an SS in the SS allocation field.

B26. According to the method described in B12, the Doppler field in the trigger frame is set to 1, and the insertion frequency of the middle preamble is implicitly indicated by using a parameter used to indicate an SS in the combination of the SS allocation field and the MCS field.

B27. According to the method described in B11, the insertion frequency of the middle preamble is indicated by using one or more of reserved values of the HE-SIG-A field.

B28. According to the method described in B11, the insertion frequency of the middle preamble is indicated by using a reserved value of the Reserved field.

An embodiment of the present invention further discloses C29. A data processing method, including: generating a Media Access Control MAC frame, where the MAC frame is used to instruct to generate and send a physical layer protocol data unit PPDU, the PPDU includes a data field and a middle preamble field, and the MAC frame includes information used to indicate an insertion frequency of the middle preamble in the data field in the PPDU; and sending the MAC frame.

C30. According to the method described in C29, the information used to indicate the insertion frequency of the middle preamble in the data field in the PPDU is added in a high throughput control field HTC in the MAC frame, and the HTC field includes an RU allocation field used to indicate a resource unit, a UL MCS field used to indicate an uplink modulation and coding scheme, and a reserved value field Reserved.

C31. According to the method described in C30, the insertion frequency of the middle preamble is indicated by using a reserved value of the RU allocation field.

C32. According to the method described in C30, the insertion frequency of the middle preamble is indicated by using one or more of reserved values of the UL MCS field.

C33. According to the method described in C30, the insertion frequency of the middle preamble is indicated by using one or more of reserved values of the Reserved field.

An embodiment of the present invention further discloses D34. A data processing method, including: receiving a physical layer protocol data unit PPDU, where the PPDU includes a preamble field, a data field, and a middle preamble field, and the preamble in the PPDU includes information used to indicate an insertion frequency of the middle preamble in the data field in the PPDU.

D35. According to the method described in D34, the information used to indicate the insertion frequency of the middle preamble in the data field in the PPDU is added in one of the following fields: an SR field used to indicate a parameter related to spatial reuse in a high efficient signal field A HE-SIG-A, an MCS field used to indicate a modulation and coding scheme in the HE-SIG-A, an MCS field in a high efficient signal field B HE-SIG-B, a SIGB MCS field used to indicate a high efficient signal field B modulation and coding scheme in the HE-SIG-A, a combination of an MCS field and a DCM field in the HE-SIG-A, a combination of an MCS field and a DCM field in the HE-SIG-B, a combination of a SIGB MCS field and a SIGB DCM field in the HE-SIG-A, an NSTS field used to indicate a quantity of space time streams of a single user in the HE-SIG-B, a combination of an MCS field and an NSTS field, or an RU allocation field used to indicate a resource unit in the HE-SIG-B.

An embodiment of the present invention further discloses E36. A data processing method, including: receiving a trigger frame, where the trigger frame is used to instruct to generate and send a physical layer protocol data unit PPDU, the trigger frame includes information used to indicate an insertion frequency of a middle preamble in a data field in the PPDU, and the PPDU includes the data field and the middle preamble field; generating the PPDU based on the trigger frame; and sending the PPDU.

E37. According to the method described in E36, the information used to indicate the insertion frequency of the middle preamble in the data field in the PPDU is added in one of the following fields: a Trigger Type field used to indicate a trigger frame type, a Doppler field used to indicate whether a Doppler mode is used for a data packet, a high efficient signal field A HE-SIG-A, a Trigger Dependent Common Info field for indicating common information based on a trigger frame type, an MCS field used to indicate a modulation and coding scheme, a combination of an MCS field and a DCM field, an RU allocation field used to indicate a resource unit, an SS allocation field used to indicate a quantity of space time streams, or a combination of an SS allocation field and an MCS field in the trigger frame.

An embodiment of the present invention further discloses F38. A data processing method, including: receiving a Media Access Control MAC frame, where the MAC frame is used to instruct to generate and send a physical layer protocol data unit PPDU, the PPDU includes a data field and a middle preamble field, and the MAC frame includes information used to indicate an insertion frequency of the middle preamble in the data field in the PPDU; and generating and sending the PPDU based on the MAC frame.

F39. According to the method described in F38, the information used to indicate the insertion frequency of the middle preamble in the data field in the PPDU is added in a high throughput control field HTC in the MAC frame, and the HTC field includes an RU allocation field used to indicate a resource unit, a UL MCS field used to indicate an uplink modulation and coding scheme, and a reserved value field Reserved.

An embodiment of the present invention further discloses G40. A data processing apparatus, including: a PPDU generation unit, configured to generate a physical layer protocol data unit PPDU, where the PPDU includes a preamble field, a data field, and a middle preamble field, and the preamble in the PPDU includes information used to indicate an insertion frequency of the middle preamble in the data field in the PPDU; and a sending unit, configured to send the PPDU.

G41. According to the apparatus described in G40, the information used to indicate the insertion frequency of the middle preamble in the data field in the PPDU is added in one of the following fields: an SR field used to indicate a parameter related to spatial reuse in a high efficient signal field A HE-SIG-A, an MCS field used to indicate a modulation and coding scheme in the HE-SIG-A, an MCS field in a high efficient signal field B HE-SIG-B, a SIGB MCS field used to indicate a high efficient signal field B modulation and coding scheme in the HE-SIG-A, a combination of an MCS field and a DCM field in the HE-SIG-A, a combination of an MCS field and a DCM field in the HE-SIG-B, a combination of a SIGB MCS field and a SIGB DCM field in the HE-SIG-A, an NSTS field used to indicate a quantity of space time streams of a single user in the HE-SIG-B, a combination of an MCS field and an NSTS field, or an RU allocation field used to indicate a resource unit in the HE-SIG-B.

An embodiment of the present invention further discloses H42. A data processing apparatus, including: a trigger frame generation unit, configured to generate a trigger frame, where the trigger frame is used to instruct to generate and send a physical layer protocol data unit PPDU, the PPDU includes a data field and a middle preamble field, and the trigger frame includes information used to indicate an insertion frequency of the middle preamble in the data field in the PPDU; and a sending unit, configured to send the trigger frame.

H43. According to the apparatus described in H42, the information used to indicate the insertion frequency of the middle preamble in the data field in the PPDU is added in one of the following fields: a Trigger Type field used to indicate a trigger frame type, a Doppler field used to indicate whether a Doppler mode is used for a data packet, a high efficient signal field A HE-SIG-A, a Trigger Dependent Common Info field for indicating common information based on a trigger frame type, an MCS field used to indicate a modulation and coding scheme, a combination of an MCS field and a DCM field, an RU allocation field used to indicate a resource unit, an SS allocation field used to indicate a quantity of space time streams, or a combination of an SS allocation field and an MCS field in the trigger frame.

An embodiment of the present invention further discloses I44. A data processing apparatus, including: a MAC frame generation unit, configured to generate a Media Access Control MAC frame, where the MAC frame is used to instruct to generate and send a physical layer protocol data unit PPDU, the PPDU includes a data field and a middle preamble field, and the MAC frame includes information used to indicate an insertion frequency of the middle preamble in the data field in the PPDU; and a sending unit, configured to send the MAC frame.

I45. According to the apparatus described in I44, the information used to indicate the insertion frequency of the middle preamble in the data field in the PPDU is added in a high throughput control field HTC in the MAC frame, and the HTC field includes an RU allocation field used to indicate a resource unit, a UL MCS field used to indicate an uplink modulation and coding scheme, and a reserved value field Reserved.

An embodiment of the present invention further discloses J46. A data processing apparatus, including a receiving unit, configured to receive a physical layer protocol data unit PPDU, where the PPDU includes a preamble field, a data field, and a middle preamble field, and the preamble in the PPDU includes information used to indicate an insertion frequency of the middle preamble in the data field in the PPDU.

J47. According to the apparatus described in J46, the information used to indicate the insertion frequency of the middle preamble in the data field in the PPDU is added in one of the following fields: an SR field used to indicate a parameter related to spatial reuse in a high efficient signal field A HE-SIG-A, an MCS field used to indicate a modulation and coding scheme in the HE-SIG-A, an MCS field in a high efficient signal field B HE-SIG-B, a SIGB MCS field used to indicate a high efficient signal field B modulation and coding scheme in the HE-SIG-A, a combination of an MCS field and a DCM field in the HE-SIG-A, a combination of an MCS field and a DCM field in the HE-SIG-B, a combination of a SIGB MCS field and a SIGB DCM field in the HE-SIG-A, an NSTS field used to indicate a quantity of space time streams of a single user in the HE-SIG-B, a combination of an MCS field and an NSTS field, or an RU allocation field used to indicate a resource unit in the HE-SIG-B.

An embodiment of the present invention further discloses K48. A data processing apparatus, including: a receiving unit, configured to receive a trigger frame, where the trigger frame is used to instruct to generate and send a physical layer protocol data unit PPDU, the trigger frame includes information used to indicate an insertion frequency of a middle preamble in a data field in the PPDU, and the PPDU includes the data field and the middle preamble field; and a PPDU generation unit, configured to generate and send the PPDU based on the trigger frame.

K49. According to the apparatus described in K48, the information used to indicate the insertion frequency of the middle preamble in the data field in the PPDU is added in one of the following fields: a Trigger Type field used to indicate a trigger frame type, a Doppler field used to indicate whether a Doppler mode is used for a data packet, a high efficient signal field A HE-SIG-A, a Trigger Dependent Common Info field for indicating common information based on a trigger frame type, an MCS field used to indicate a modulation and coding scheme, a combination of an MCS field and a DCM field, an RU allocation field used to indicate a resource unit, an SS allocation field used to indicate a quantity of space time streams, or a combination of an SS allocation field and an MCS field in the trigger frame.

An embodiment of the present invention further discloses L50. A data processing apparatus, including: a receiving unit, configured to receive a Media Access Control MAC frame, where the MAC frame is used to instruct to generate and send a physical layer protocol data unit PPDU, the PPDU includes a data field and a middle preamble field, and the MAC frame includes information used to indicate an insertion frequency of the middle preamble in the data field in the PPDU; and a PPDU generation unit, configured to generate and send the PPDU based on the MAC frame.

L51. According to the apparatus described in L50, the information used to indicate the insertion frequency of the middle preamble in the data field in the PPDU is added in a high throughput control field HTC in the MAC frame, and the HTC field includes an RU allocation field used to indicate a resource unit, a UL MCS field used to indicate an uplink modulation and coding scheme, and a reserved value field Reserved.

What is claimed is:

1. A data processing method comprising:
generating, by a station (STA), a physical protocol data unit (PPDU), wherein the PPDU comprises a preamble field, a data field, and one or more middle preamble fields within the data field, wherein the preamble field comprises information used to indicate an insertion frequency of the one or more middle preamble fields, wherein each of the middle preamble fields includes one or more of a high efficiency long training field (HE-LTF) or a combination of high efficiency short training field (HE-STF) and HE-LTF; and
sending, by the STA, the PPDU.

2. The method according to claim 1, wherein a Number of Space Time Stream (NSTS) field in the preamble field is used to indicate the insertion frequency of the one or more middle preamble fields.

3. The method according to claim 2, the NSTS field value 0 indicates that a quantity of space time stream is equal to 1 and the insertion frequency of the one or more middle preamble fields is M1.

4. The method according to claim 2, the NSTS field value 3 indicates that a quantity of space time stream is equal to 1 and the insertion frequency of the one or more middle preamble fields is M2.

5. The method according to claim 1, wherein each of the middle preamble fields comprises only a high efficient long training field (HE-LTF).

6. A data processing method comprising:
generating, by an access point (AP), a trigger frame, wherein the trigger frame is used to trigger a trigger-based physical protocol data unit (TB PPDU), wherein the trigger frame comprising information used to indicate one or more middle preambles within a data field in the TB PPDU and information used to indicate an insertion frequency of the one or more middle preambles, wherein each of the middle preamble fields includes one or more of a high efficiency long training field (HE-LTF) or a combination of high efficiency short training field (HE-STF) and HE-LTF; and
sending, by the AP, the trigger frame.

7. The method according to claim 6, wherein the information used to indicate the one or more middle preambles is carried in a Doppler field.

8. The method according to claim 6, wherein each of the middle preambles comprises only a high efficient long training field (HE-LTF).

9. A data processing method comprising:
receiving, by an access point (AP), a physical protocol data unit (PPDU), wherein the PPDU comprises a preamble field, a data field, and one or more middle preamble fields within the data field, wherein the preamble field in the PPDU comprises information used to indicate an insertion frequency of the one or more middle preamble fields, wherein each of the middle preamble fields includes one or more of a high efficiency long training field (HE-LTF) or a combination of high efficiency short training field (HE-STF) and HE-LTF;
obtaining, by the AP, the information used to indicate the insertion frequency of the one or more middle preamble fields; and
receiving, by the AP, the data field based on the information.

10. The method according to claim 9, wherein a Number of Space Time Stream (NSTS) field in the preamble field is used to indicate the insertion frequency of the one or more middle preamble fields.

11. The method according to claim 10, the NSTS field value 0 indicates that a quantity of space time stream is equal to 1 and the insertion frequency of the one or more middle preamble fields is M1.

12. The method according to claim 11, wherein receiving, by the AP, the data field based on the information comprises:
determining that the insertion frequency of the one or more middle preamble fields is a number M1;
receiving data of M1 symbols in the data field based on a high efficient short training field (HE-STF) and a high efficient long training field (HE-LTF) in the last part of the preamble field; and
re-estimating a channel based on a middle preamble field of the one or more middle preamble fields, and receiving data of M1 symbols that follow the middle preamble field.

13. The method according to claim 10, the NSTS field value 3 indicates that a quantity of space time stream is equal to 1 and the insertion frequency of the one or more middle preamble fields is M2.

14. The method according to claim 13, wherein receiving, by the AP, the data field based on the information comprises:
determining that the insertion frequency of the one or more middle preamble fields is M2;
receiving data of M2 symbols in the data field based on a high efficient short training field (HE-STF) and a high efficient long training field (HE-LTF) in the last part of the preamble field; and
re-estimating a channel based on a middle preamble field of the one or more middle preamble fields, and receiving data of M2 symbols that follow the middle preamble field.

15. The method according to claim 9, wherein each of the middle preamble fields comprise only a high efficient long training field (HE-LTF).

16. A data processing method comprising:
receiving, by a station(STA), a trigger frame, wherein the trigger frame is used to trigger a trigger-based physical protocol data unit (TB PPDU), wherein the trigger frame comprises information used to indicate one or more middle preambles within a data field in the TB PPDU and information used to indicate an insertion frequency of the one or more middle preambles, wherein each of the middle preamble fields includes one or more of a high efficiency long training field (HE-LTF) or a combination of high efficiency short training field (HE-STF) and HE-LTF; and generating and sending, by the STA, respectively, the TB PPDU, the TB PPDU comprising a preamble field, a data field, and the one or more middle preambles within the data field, wherein the one or more middle preambles are inserted within the data field based on the information used to indicate an insertion frequency of the one or more middle preambles in a data field in the TB PPDU.

17. The method according to claim 16, information used to indicate the one or more middle preambles is carried in a Doppler field.

18. The method according to claim 16, wherein each of the middle preambles comprises only a high efficient long training field (HE-LTF).

\* \* \* \* \*